United States Patent
Rosen et al.

(10) Patent No.: US 11,244,563 B2
(45) Date of Patent: *Feb. 8, 2022

(54) FLOW MANAGEMENT LIGHT

(71) Applicant: Resilience Magnum IP, LLC, Cleveland, OH (US)

(72) Inventors: Steven Rosen, Hunting Valley, OH (US); Ronald Cozean, Madison, CT (US); Eric Allen, Long Beach, CA (US); David Edward Mordetzky, Oak Park, CA (US); Megan Horvath, Cleveland, OH (US); Anthony John Pyros, Cleveland, OH (US); John Elwood, Santa Ana, CA (US); Michael Chang, Long Beach, CA (US); Elie Attarian, Chatsworth, CA (US)

(73) Assignee: Resilience Magnum IP, LLC, Cleveland, OH (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/044,027

(22) Filed: Jul. 24, 2018

(65) Prior Publication Data

US 2019/0103021 A1    Apr. 4, 2019

Related U.S. Application Data

(60) Provisional application No. 62/568,294, filed on Oct. 4, 2017, provisional application No. 62/584,614, filed on Nov. 10, 2017.

(51) Int. Cl.
*G08G 1/087* (2006.01)
*G08G 1/095* (2006.01)
(Continued)

(52) U.S. Cl.
CPC .............. *G08G 1/087* (2013.01); *G01S 17/58* (2013.01); *G08B 7/062* (2013.01); *G08B 25/10* (2013.01);
(Continued)

(58) Field of Classification Search
CPC .......... G08G 1/087; G08G 1/017; G08G 1/08; G08G 1/095; G08G 1/0112; G08G 1/0133;
(Continued)

(56) References Cited

U.S. PATENT DOCUMENTS 6,147,624 A    11/2000  Clapper
6,236,303 B1    5/2001  Wagner et al.
(Continued)

FOREIGN PATENT DOCUMENTS

CN    105371177 A    3/2016

OTHER PUBLICATIONS

Wang et al (Machine Translation of Chinese Patent 105959380). (Year: 2016).*
(Continued)

*Primary Examiner* — Alan D Hutchinson
(74) *Attorney, Agent, or Firm* — Amin, Turocy & Watson, LLP

(57) ABSTRACT

Techniques for creating, configuring, and employing flow management lights are presented. Such light(s) can comprise or be associated with a flow management component (FMC) that can employ sensors to monitor environmental conditions in a defined area of people or vehicle traffic, and can enhance its function to manage flow and security of the people or vehicle traffic. Such light(s) can be installed in a defined area. FMC can monitor and determine a context associated with the defined area, and can adjust light output or another parameter(s) of one or more lights based on the (Continued)

determined context. Over time, FMC can learn contexts of people or vehicle traffic at various times and adjust operations accordingly for the particular context at a specific time. FMC can control operations of such light(s) in relation to enhancing security and safety of people or traffic, business and sales operations, and other objectives.

21 Claims, 18 Drawing Sheets

(51) Int. Cl.
| | |
|---|---|
| G08G 1/01 | (2006.01) |
| G01S 17/58 | (2006.01) |
| G08B 7/06 | (2006.01) |
| G08G 1/017 | (2006.01) |
| G08G 1/08 | (2006.01) |
| G08B 25/10 | (2006.01) |
| G01S 13/91 | (2006.01) |

(52) U.S. Cl.
CPC ........... *G08G 1/017* (2013.01); *G08G 1/0112* (2013.01); *G08G 1/0116* (2013.01); *G08G 1/0133* (2013.01); *G08G 1/0145* (2013.01); *G08G 1/08* (2013.01); *G08G 1/095* (2013.01); *G01S 13/91* (2013.01)

(58) Field of Classification Search
CPC .... G08G 1/0145; G08G 1/0116; G08B 7/062; G08B 25/10; G01S 17/58; G01S 13/91
See application file for complete search history.

(56) References Cited

U.S. PATENT DOCUMENTS

| | | | |
|---|---|---|---|
| 6,528,954 | B1 | 3/2003 | Lys |
| 6,946,974 | B1 | 9/2005 | Racunas, Jr. |
| 7,026,954 | B2 | 4/2006 | Slemmer et al. |
| 7,111,952 | B2 | 9/2006 | Veskovic |
| 7,824,065 | B2 | 11/2010 | Maxik |
| 8,280,558 | B2 | 10/2012 | Picco |
| 8,283,812 | B2 | 10/2012 | Azancot et al. |
| 8,362,713 | B2 | 1/2013 | Recker et al. |
| 8,545,033 | B2 | 10/2013 | Gielen |
| 8,600,786 | B2 | 12/2013 | Stefik et al. |
| 8,674,616 | B2 | 3/2014 | Holman et al. |
| 8,950,461 | B2 | 2/2015 | Adams et al. |
| 9,367,050 | B2 | 6/2016 | Jain et al. |
| 9,560,388 | B2 | 1/2017 | Ogle et al. |
| 9,594,956 | B2 | 3/2017 | Cohen et al. |
| 9,595,193 | B1* | 3/2017 | Duale ............... B60R 11/04 |
| 9,601,018 | B2 | 3/2017 | Cogill et al. |
| 9,644,799 | B2 | 5/2017 | Crayford et al. |
| 9,700,641 | B2 | 7/2017 | Hawkins et al. |
| 9,893,551 | B2 | 2/2018 | Cheatham, III et al. |
| 9,938,765 | B2 | 4/2018 | Berman et al. |
| 10,210,355 | B1 | 2/2019 | Lai |
| 10,251,242 | B1 | 4/2019 | Rosen et al. |
| 10,677,402 | B2 | 6/2020 | Rosen et al. |
| 10,867,486 | B2 | 12/2020 | Rosen et al. |
| 2002/0171562 | A1 | 11/2002 | Muraki |
| 2004/0022058 | A1 | 2/2004 | Birrell |
| 2005/0128751 | A1 | 6/2005 | Roberge et al. |
| 2005/0248299 | A1 | 11/2005 | Chemel et al. |
| 2006/0044798 | A1 | 3/2006 | Pazula |
| 2006/0197684 | A1* | 9/2006 | Tremblay ............... G08G 1/096 340/909 |
| 2008/0191009 | A1 | 8/2008 | Gressel et al. |
| 2009/0059603 | A1 | 3/2009 | Recker et al. |
| 2009/0303079 | A1 | 12/2009 | Khim |
| 2010/0007525 | A1 | 1/2010 | Shanbhag et al. |
| 2010/0060485 | A1 | 3/2010 | Kim |
| 2010/0309024 | A1 | 12/2010 | Mimeault |
| 2011/0006893 | A1 | 1/2011 | Finch et al. |
| 2011/0193872 | A1 | 8/2011 | Biernath et al. |
| 2012/0011033 | A1 | 1/2012 | Salgia |
| 2012/0066144 | A1 | 3/2012 | Berkvens et al. |
| 2012/0092192 | A1 | 4/2012 | Wong |
| 2012/0098655 | A1 | 4/2012 | Preta et al. |
| 2013/0002587 | A1 | 1/2013 | Biggs et al. |
| 2013/0073350 | A1 | 3/2013 | Blustein |
| 2013/0113936 | A1 | 5/2013 | Cohen et al. |
| 2013/0300911 | A1 | 11/2013 | Beckman |
| 2014/0049963 | A1 | 2/2014 | McGuire |
| 2014/0049972 | A1 | 2/2014 | McGuire |
| 2014/0055990 | A1 | 2/2014 | Reed |
| 2014/0217914 | A1 | 8/2014 | Maxik |
| 2014/0262057 | A1 | 9/2014 | Chambers et al. |
| 2015/0195100 | A1 | 7/2015 | Imes et al. |
| 2015/0286938 | A1 | 10/2015 | Blair et al. |
| 2016/0047164 | A1 | 2/2016 | Lundy et al. |
| 2016/0085884 | A1 | 3/2016 | Schafer et al. |
| 2016/0135271 | A1 | 3/2016 | Alexander |
| 2016/0104325 | A1 | 4/2016 | Lu |
| 2016/0216443 | A1 | 7/2016 | Morgan et al. |
| 2016/0359325 | A1 | 12/2016 | Kawata et al. |
| 2017/0073074 | A1 | 3/2017 | Gagnon et al. |
| 2017/0094756 | A1 | 3/2017 | Saffari |
| 2017/0192406 | A1 | 7/2017 | Ashdown et al. |
| 2017/0247289 | A1 | 8/2017 | Waldschmidt et al. |
| 2017/0322350 | A1 | 11/2017 | Montagne |
| 2018/0096634 | A1 | 4/2018 | Walker et al. |
| 2018/0154032 | A1 | 6/2018 | Dombrovsky |
| 2018/0156429 | A1 | 6/2018 | Carlet et al. |
| 2018/0163934 | A1 | 6/2018 | Miller |
| 2018/0167516 | A1 | 6/2018 | Warrick |
| 2018/0211503 | A1 | 7/2018 | Baliga et al. |
| 2018/0216791 | A1 | 8/2018 | Leung et al. |
| 2018/0224596 | A1 | 8/2018 | Creasman et al. |
| 2018/0259141 | A1 | 9/2018 | Yamaguchi et al. |
| 2018/0313660 | A1 | 11/2018 | Eyster et al. |
| 2019/0069379 | A1 | 2/2019 | Kastee et al. |
| 2019/0104181 | A1 | 4/2019 | Rosen et al. |

OTHER PUBLICATIONS

Non-Final Office Action received for U.S. Appl. No. 16/739,627 dated Feb. 7, 2020, 19 pages.
Non-Final Office Action received for U.S. Appl. No. 16/544,023 dated Apr. 9, 2020, 28 pages.
Non-Final Office Action received for U.S. Appl. No. 16/043,997 dated Apr. 8, 2020, 46 pages.
Non-Final Office Action received for U.S. Appl. No. 16/043,974 dated May 2, 2019, 28 pages.
Non-Final Office Action received for U.S. Appl. No. 16/044,047 dated Dec. 26, 2018, 22 pages.
Notice of Allowance received for U.S. Appl. No. 16/044,073 dated Nov. 8, 2018, 20 pages.
Non-Final Office Action received for U.S. Appl. No. 16/043,798 dated Jun. 27, 2019, 15 pages.
Non-Final Office Action received for U.S. Appl. No. 16/130,720 dated Jul. 25, 2019, 37 pages.
Non-Final Office Action received for U.S. Appl. No. 16/270,646 dated Aug. 21, 2019, 29 pages.
Non-Final Office Action received for U.S. Appl. No. 16/821,007 dated May 1, 2020, 36 pages.
Notice of Allowance received for U.S. Appl. No. 16/043,949 dated May 21, 2020, 49 pages.
Non-Final Office Action received for U.S. Appl. No. 16/043,875 dated May 27, 2020, 15 pages.
Non-Final Office Action received for U.S. Appl. No. 16/043,875 dated Jul. 8, 2020, 36 pages.
Notice of Allowance received for U.S. Appl. No. 16/043,997 dated Aug. 7, 2020, 46 pages.
Non-Final Office Action received for U.S. Appl. No. 16/856,434 dated Sep. 1, 2020, 50 pages.
Final Office Action received for U.S. Appl. No. 16/682,085 dated Oct. 28, 2020, 27 pages.

(56) References Cited

OTHER PUBLICATIONS

Final Office Action received for U.S. Appl. No. 16/043,875 dated Jan. 25, 2020, 13 pages.
Non-Final Office Action received for U.S. Appl. No. 16/739,627 dated Apr. 26, 2021, 31 pages.
Non-Final Office Action received for U.S. Appl. No. 16/043,875 dated May 26, 2021, 45 pages.
Non-Final Office Action received for U.S. Appl. No. 17/062,929 dated May 5, 2021, 38 pages.
Final Office Action received for U.S. Appl. No. 16/739,627 dated Sep. 30, 2021, 33 pages.
Non-Final Office Action received for U.S. Appl. No. 17/099,898 dated Sep. 24, 2021, 68 pages.
Non-Final Office Action received for U.S. Appl. No. 17/099,928 dated Jun. 24, 2021, 53 pages.
Notice of Allowance received for U.S. Appl. No. 17/005,534 dated Aug. 4, 2021, 50 pages.
Notice of Allowance received for U.S. Appl. No. 17/062,929 dated Aug. 9, 2021, 27 pages.

* cited by examiner

FLOW MANAGEMENT LIGHT

CROSS-REFERENCE TO RELATED APPLICATIONS

This application claims priority to U.S. Provisional Patent Application Ser. No. 62/584,614 filed on Nov. 10, 2017, entitled "FLOW MANAGEMENT LIGHT" and U.S. Provisional Patent Application Ser. No. 62/568,294 filed on Oct. 4, 2017, entitled "SELF AWARE LIGHTS THAT SELF-CONFIGURE." The entireties of the aforementioned applications are incorporated by reference herein.

BACKGROUND

Conventional smart lights have limited capabilities focused primarily on changing lighting colors based on a user's configuration. Furthermore, such conventional smart lights typically can require extensive manual user configuration using applications (e.g. mobile phone apps, computer programs, etc.) that are not intuitive and can involve an undesirable amount of learning on the part of the user.

The above-described description is merely intended to provide a contextual overview relating to lighting devices, and is not intended to be exhaustive.

SUMMARY

The following presents a summary to provide a basic understanding of one or more embodiments of the disclosed subject matter. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus, and/or computer program products that can facilitate a self-aware light that can perform flow management are described.

According to one or more embodiments, a system is provided. The system can comprise a light component of a flow management light device, wherein the light component is configured to provide illumination in an area associated with the flow management light device, a memory that stores machine-executable components, and a processor that executes the machine-executable components stored in the memory, wherein the machine-executable components. The machine-executable components can comprise: a flow management component of the flow management light device, wherein the flow management component is configured to determine a light profile for the flow management light device based at least in part on characteristics of the flow management light device and environmental conditions associated with the area associated with the flow management light device, and wherein the flow management component is further configured to control operation of the light component and instruments of an instrument component of the flow management light device based at least in part on the light profile.

In accordance with one or more other embodiments, a method is provided. The method can comprise determining, by a system comprising a processor, a light profile for a flow management light based at least in part on attributes of the flow management light and conditions associated with an area associated with the flow management light. The method also can comprise controlling, by the system, operation of a light component and an instrument component of the flow management light based at least in part on the light profile.

In yet one or more other embodiments, a device is presented. The device can comprise: a light component configured to provide illumination in an area associated with the device; a sensor component configured to comprise one or more sensors configured to sense conditions associated with the area and generate sensor data based at least in part on the sensing of the conditions; an instrument component configured to comprise instruments configured to perform respective tasks; a memory that stores machine-executable components; and a processor that executes the machine-executable components stored in the memory. The machine-executable components can comprise a flow management component configured to generate a light profile for the flow management light device based at least in part on characteristics of the device and the sensor data relating to the conditions associated with the area, and wherein the flow management component is further configured to manage operation of the light component and the instruments based at least in part on the light profile.

DETAILED DESCRIPTION

Figure 1:
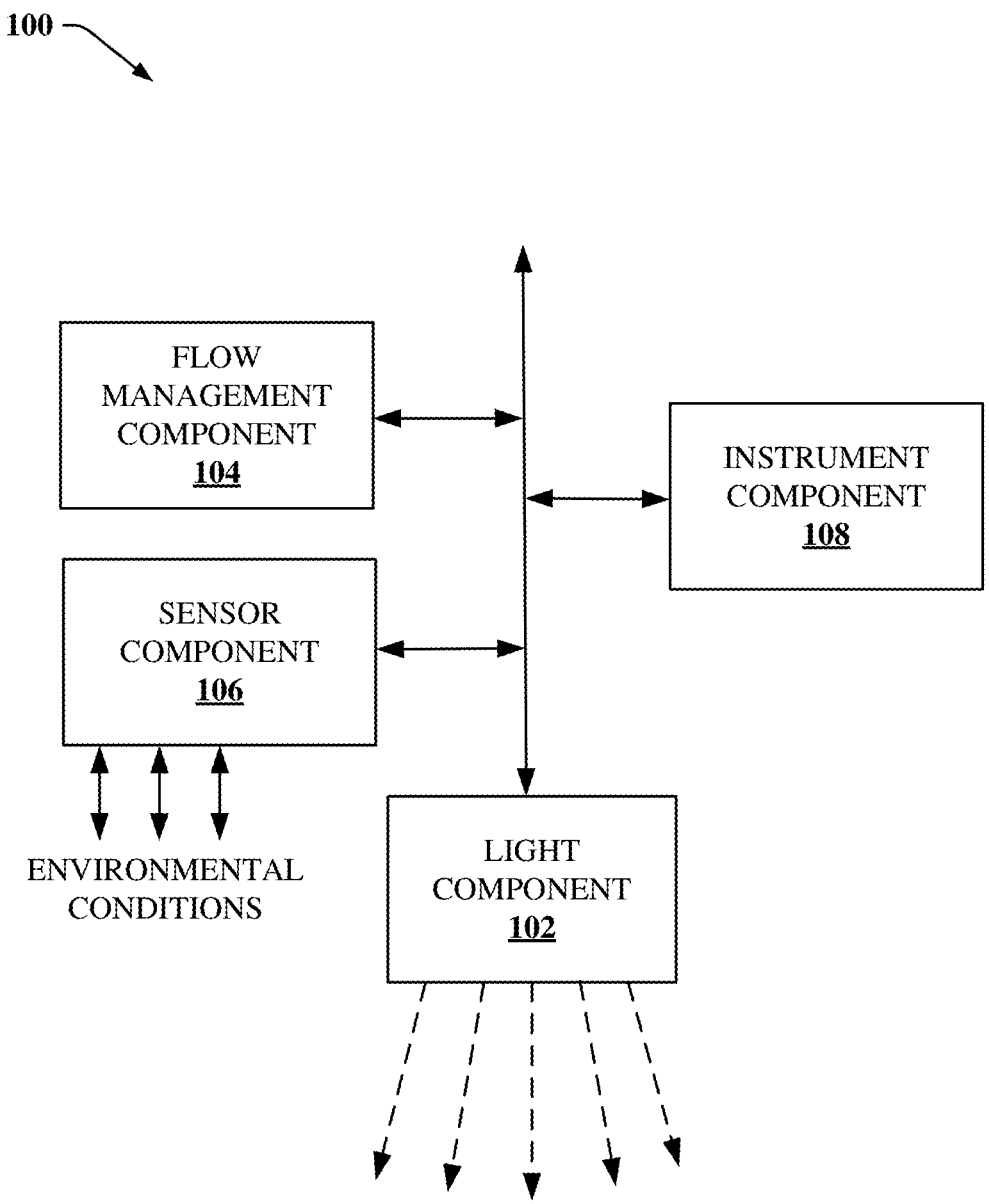
FIG. 1 illustrates a block diagram of an example system for a flow management light, in accordance with various aspects and embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Conventional smart lights have limited capabilities focused primarily on changing lighting colors based on a user's configuration. Furthermore, such conventional smart lights typically can require extensive manual user configuration using applications (e.g. mobile phone apps, computer programs, etc.) that are not intuitive and can involve an undesirable amount of learning on the part of the user.

Further, areas where people and/or vehicle traffic traverse usually have lighting to enhance the visibility of the people and/or vehicles at night, or to make the environment more secure from predators. It can be desirable to provide lights for these locations that can provide functionality beyond mere lighting to enhance flow and security of the people and/or vehicle traffic in those areas.

In accordance with various aspects and embodiments, techniques for creating, configuring, and employing flow management lights are presented. A flow management light(s) can comprise or be associated with a flow management component that can employ one or more sensors to monitor environmental conditions in a defined area of people or vehicle traffic, and can enhance the function of the flow management light(s) to manage flow and security of the people or vehicle traffic.

In some aspects, a flow management light can be or can comprise a self-aware light that can include one or more components (e.g., flow manager component, sensor component, instrument component, . . . ), and can communicate with one or more other flow management lights (e.g., self-aware flow management lights) and/or other devices to facilitate desirable (e g, enhanced, improved, optimized, acceptable) function and operation of such flow management lights to manage flow and security of the people or vehicle traffic and/or perform other desired operations. A flow management light can understand its environment and device ecosystem using the sensors and instruments, and can perform (e.g., automatically perform) a self-configuration to enhance (e.g., optimize or improve) its functionality for the environment and device ecosystem. It is to be appreciated and understood that, in some embodiments, a flow management light can be a retrofit light bulb with instruments (e.g., flow management component, sensor(s)) integrated therein. In certain embodiments, a flow management light can have all or a portion of the instruments integrated into a light fixture (e.g., socket, holder, ballast) associated with the flow management light.

One or more flow management lights can be installed in a defined area. The flow management component (e.g., employing the sensor component) of or associated with a flow management light can monitor and determine (e.g., automatically determine) a context associated with the defined area, and can control (e.g., automatically control, adjust, or modify) light output or another parameter(s) of one or more flow management lights based at least in part on the determined context. Over time, the flow management component can learn (e.g., automatically learn) contexts of people or vehicle traffic at various times and control operations accordingly for the particular context at a specific time. The flow management component can control (e.g., automatically control, adjust, or modify) operations of the flow management light(s) in relation to, for example, enhancing security and safety of people or traffic, emergency situations, business and sales operations, horticulture systems, and one or more other desired situations, systems, or objectives (e.g. goal, intention, purpose, action, operation, configuration, etc.). These and other features of or associated with the flow management lights can reduce, minimize, or eliminate the need for a user to perform manual configuration of the lights or other parameters associated with the flow management lights.

With regard to the example aspects and embodiments disclosed herein, there can be coordination amongst a set of flow management lights to achieve a desired objective (e.g. goal, intention, purpose, action, operation, configuration, etc.), whether explicitly stated or not. Further, although the terms "flow management light," "self-aware flow management light," and "self-aware light" are used herein, in accordance with various embodiments, the example implementations of flow management lights (e.g., self-aware flow management light) disclosed herein can include one or more flow management lights operating independently or in a distributed fashion, as applicable. All such embodiments are envisaged by and part of the disclosed subject matter.

These and other aspects and embodiments of the disclosed subject matter will now be described with respect to the drawings.

FIG. 1 illustrates a block diagram of an example system 100 for a flow management light, in accordance with various aspects and embodiments of the disclosed subject matter. The disclosed subject matter is directed to machine (e.g., computer) processing systems, machine-implemented methods, apparatus, and/or machine program products that can facilitate efficiently, effectively, and automatically (e.g., with little or no direct involvement from a user) employing flow management lights (e.g., self-aware flow management lights) that can perform (e.g., automatically perform) self-configuration (e.g., self-configuration of parameters). For example, when installed in a desired place, the system 100 (e.g., the flow management light of the system 100) can employ sensors, tools, and communication components (e.g., communication devices) to facilitate determining the place of the system 100 in the environment and device ecosystem and perform (e.g., automatically perform) a configuration (e.g., an auto-configuration) of the system 100 (e.g., the components of the system 100). In an example, the system 100 (e.g., the flow management light of the system 100) can employ one or more sensors that can provide information (e.g., sensor information) that can facilitate understanding the physical environment in which the system 100 is installed, and facilitate determining how the system 100 fits into and/or can desirably interact with the physical environment. In another example, the system 100 (e.g., the flow management light of the system 100) can communicate via one or more communication networks to facilitate identifying and communicating with one or more other systems (e.g., flow management lights of other systems) and/or other devices in the device ecosystem, and facilitate determining how the system 100 fits into and/or can desirably interact with the device ecosystem. As more fully disclosed herein, based at least in part on such determinations, the system 100 can generate a light profile for the flow management light and can perform (e.g., automatically perform) a configuration (e.g., an auto-configuration) of the flow management light according to (e.g., conforming to) the light profile. It is to be appreciated and understood that a user interface (not shown) can be provided that can allow a user to manually adjust the light profile and/or configuration generated by the system 100.

To facilitate self-configuration, the flow management lights described herein can be in communication with each other, and/or can communicate with another device(s). The flow management lights (e.g., of or associated with the system 100) can coordinate amongst themselves to make decisions regarding actions to be taken by the flow management lights. In some implementations, the flow management lights can receive instructions from another device, such as a device of a control system, regarding actions to be taken by the flow management lights. The flow management lights also can receive instructions from a user (e.g., an operator) regarding actions to be taken by the flow management lights or devices (e.g., drone devices) associated with the flow management lights. A flow management light of the system 100 can autonomously make decisions regarding actions to be taken by the flow management light. It is to be appreciated and understood that flow management lights can employ any of the decision-making methods disclosed herein, alone or in combination, regarding actions to be taken by the flow management lights of or associated with the system 100.

The system 100 can comprise a light component 102 of the flow management light, wherein the light component 102 can emit light to an area in proximity to the location of the light component 102. The light component 102 can comprise one or more light elements that can produce and emit respective portions of the light emitted by the light component 102, for example, in response to power received from a power source(s) (e.g., an electric grid system, a battery, a solar power cell system). The light component 102 can emit light of one or more colors, emit light at one or more illumination levels, and/or emit light in one or more directions.

The system 100 also can comprise a flow management component 104 that can be associated with (e.g., connected to) the light component 102 to facilitate controlling operation of the flow management light, including the light component 102 of the flow management light, and/or other flow management lights associated with the flow management light, in accordance with the light profile and/or environment profile associated with the flow management light of the system 100 and generated by the flow management component 104. For example, the flow management component 104 can control switching the light component 102 between an on state (e.g., illuminated state) or off state (e.g., no light illumination), control (e.g., adjust) an illumination level of the light component 102 and/or control which light elements of the light component 102 are illuminated to facilitate controlling the illumination level of the light component 102, control a color of the light emitted by the light component 102, control a direction of emission of light by the light component 102, control display of visual information or indicators by the flow management light, control emission of audio information or indicators of the flow management light, control communication of information, notification, or indicators from the flow management light to another device (e.g., another flow management light, a device associated with law enforcement or an emergency response entity, etc.), and/or control other elements, features, or parameters of the flow management light, as more fully described herein.

The system 100 also can include a sensor component 106 that can comprise or employ one or more sensors that can sense respective conditions associated with the environment(s) (e.g., physical environment, logical environment, communication network environment) in which the flow management light of the system 100 is situated or with which the flow management light is associated. The one or more sensors of the sensor component 106 can comprise, for example, a radio frequency identification (RFID) reader, a navigation device, a camera, a video camera, a three-dimensional camera, a global positioning system (GPS) device, a motion sensor, a radar sensor or device, a temperature or heat sensor, a weather sensor, a humidity sensor, a barometer, a Doppler radar, a light sensor, a thermal imaging sensor or device, an infrared camera, an audio sensor, an ultrasound imaging sensor or device, a light detection and ranging (LIDAR) sensor, a sound navigation and ranging (SONAR) sensor or device, a microwave sensor, a smoke detector, a chemical sensor, a radiation sensor, an electromagnetic field sensor, a pressure sensor, a spectrum analyzer, a scent sensor, a moisture sensor, a biohazard sensor, a touch sensor, a gyroscope, an accelerometer, an altimeter, a microscope, a magnetometer, a sensor or device capable of seeing through or inside of objects, or any other desired (e.g., suitable) sensors.

An RFID reader can sense and/or identify RFID tags in proximity to the flow management light (e.g., in proximity to the RFID reader of the flow management light). A navigation device can facilitate generating directions in connection with or in relation to the flow management light. A camera, a video camera, and/or a three-dimensional camera respectively can capture multi-dimensional visual images in proximity to the flow management light. A GPS device can facilitate sensing a location of the flow management light or an object(s) in proximity to the flow management light and/or generating directions in connection with the flow management light. A motion sensor can sense movement and/or direction of movement of an object(s) in proximity and relation to the flow management light (e.g., in proximity to the motion sensor of the flow management light). A radar sensor or device can employ radar technology to facilitate detecting an object(s), including detecting the location and/or movement of an object(s), in proximity to the flow management light (e.g., in proximity to the radar sensor of the flow management light).

A temperature or heat sensor can sense, measure, determine, or facilitate determining a temperature of the environment or an object in proximity to the flow management light (e.g., in proximity to the temperature sensor of the flow management light). A weather sensor can sense weather conditions of or associated with the environment in proximity to or relevant to the flow management light. A humidity sensor can detect, measure, determine, or facilitate determining the humidity level of the environment in proximity to the flow management light (e.g., in proximity to the humidity sensor of the flow management light). A barometer can sense, measure, determine, or facilitate determining the air pressure level of the environment in proximity to the flow management light (e.g., in proximity to the barometer of the flow management light). A Doppler radar can employ the Doppler effect to sense, measure, determine, or facilitate determining movement of objects and/or velocity of movement of objects in proximity to the flow management light (e.g., in proximity to the Doppler radar of the flow management light).

A light sensor can detect or measure light or an amount of light in proximity to the flow management light (e.g., in proximity to the light sensor of the flow management light). A thermal imaging sensor or device, or an infrared camera, can detect, measure, or determine an amount of radiation of the environment or objects in the environment, and can generate thermal images (e.g., thermograms) of the radiation of the environment or objects in the environment, based at least in part on the detecting, measuring, or determining the amount of radiation. An audio sensor can sense audio signals, measure audio signals, or facilitate identifying audio signals in proximity to the flow management light (e.g., in proximity to the audio sensor of the flow management light). An ultrasound imaging sensor or device can employ ultrasound technology to detect features of or objects in an environment in proximity to the flow management light (e.g., in proximity to the ultrasound imaging sensor or device of the flow management light), and can facilitate generation of images (e.g., ultrasound images) that can represent the features of or objects in the environment in proximity to the flow management light.

A LIDAR sensor or device can employ a laser light (e.g., a pulsed laser light) to detect features of or objects in an environment in proximity to the flow management light (e.g., in proximity to the LIDAR sensor or device of the flow management light), and can facilitate generation of images (e.g., LIDAR images) that can represent the features of or objects in the environment in proximity to the flow management light. A SONAR sensor or device that can employ ultrasound technology to detect features of or objects in the environment in proximity to the flow management light, and the distance between the features or objects and the flow management light, and can facilitate generation of images (e.g., SONAR images) that can represent the features of or objects in the environment in proximity to the flow management light (e.g., in proximity to the SONAR sensor or device of the flow management light).

A microwave sensor can employ microwaves to facilitate detecting objects, including the movement of objects, in the environment in proximity to the flow management light (e.g., in proximity to the microwave sensor of the flow management light). A smoke detector can detect smoke or other air impurities, or measure smoke or other air impurities, in the environment in proximity to the flow management light (e.g., in proximity to the smoke detector of the flow management light). A chemical sensor can detect, measure, and/or facilitate identifying chemical elements or information in the environment in proximity to the flow management light. A radiation sensor can detect, measure, and/or facilitate identifying radiation, including an amount or a type of radiation, in the environment in proximity to the flow management light (e.g., in proximity to the radiation sensor of the flow management light). An electromagnetic field sensor can sense or measure electromagnetic fields in the environment in proximity to the flow management light (e.g., in proximity to the electromagnetic field sensor of the flow management light).

A pressure sensor can detect or measure pressure (e.g., an amount of pressure) in the environment in proximity to the flow management light (e.g., in proximity to the pressure sensor of the flow management light). A spectrum analyzer can detect and measure the spectral composition of electrical signals, acoustic pressure waves, optical light waves, or other signals that are in the environment in proximity to the flow management light (e.g., in proximity to the spectrum analyzer of the flow management light).

A scent sensor can sense and/or facilitate identifying scents in the environment (e.g., in the air of the environment or emitted by an object(s) in the environment) in proximity to the flow management light (e.g., in proximity to the scent sensor of the flow management light). A moisture sensor can detect an amount of moisture in the environment (e.g., in the air of the environment or emitted by an object(s) in the environment) in proximity to the flow management light (e.g., in proximity to the moisture sensor of the flow management light). A biohazard sensor can detect, measure, and/or facilitate identifying a biohazardous condition in the environment (e.g., in the air of the environment or emitted by an object(s) in the environment) in proximity to the flow management light (e.g., in proximity to the biohazard sensor of the flow management light).

A touch sensor that can detect contact with the flow management light or a device or surface associated with the flow management light, and/or can facilitate identifying a type of touch or contact (e.g., a touch or contact by a finger or hand of a user, a touch or contact by or with an inanimate object) with the flow management light or the device or surface associated with the flow management light. A gyroscope can sense, measure, determine, and/or facilitate determining motion, direction of motion, position, orientation, and/or rotation of an object. An accelerometer can sense, measure, determine, and/or facilitate determining acceleration, velocity, motion, direction of motion, position, orientation, and/or rotation of an object. An altimeter can detect, measure, and/or identify an altitude of the flow management light or an object in proximity to the flow management device.

A microscope can be employed to detect or observe very small objects and/or small details on objects in the environment in proximity to the flow management light (e.g., in proximity to the microscope of the flow management light). A magnetometer can detect, measure, determine, and/or facilitate determining magnetism, direction of a magnetic field (e.g., magnetic or electromagnetic field), strength of a magnetic field, or relative change of a magnetic field in the environment in proximity to the flow management light (e.g., in proximity to the magnetometer of the flow management light).

The system 100 also can include an instrument component 108 that can comprise or employ one or more instruments, tools, or devices that can perform respective functions or tasks. The instrument component 108 can include, for example, a projectile launcher, a liquid sprayer, an air blower, a flame thrower, a heat projector, a cold projector, a scent projector, a chemical projector, an electric discharge device, a fire extinguisher, a laser device, or any other suitable tools to perform any task. The instrument component 108 also can comprise, for example, a display screen, a video projector, an audio speaker, indicators (e.g., visual indicators (e.g., light-emitting diodes (LEDs)) or audio indicators), or any other suitable instrument, tool, or device. It is to be appreciated that the flow management light of the system 100 can have configurable instruments, tools, or devices. For example, the flow management light can have a modular configuration that can allow for one or more instruments, tools, or devices to be added or removed by a manufacturer or user.

A projectile launcher can be employed to launch, emit, eject, or project a projectile from the flow management light, for example, at an object or entity. The projectile can be, for example, a tag (e.g., paint or chemical tag) that can permanently or semi-permanently mark the object or entity (e.g., criminal) it hits to tag the object or entity to facilitate identifying that the object or entity was present in proximity to the flow management light. The projectile also can be a weapon that can be employed to strike and disable an object or entity in proximity to the flow management light.

A liquid sprayer can spray or emit desired liquids, such as, for example, water, fire retardant, horticulture-related liquids on or in the direction of desired targets (e.g., object, entity, fire, plants or flowers, etc.) in proximity to the flow management light. For example, in response to a heat sensor and/or smoke detector sensing a fire in proximity to the flow management light, the flow management component 104 can determine that fire retardant is to be sprayed on the fire, and can instruct the liquid sprayer to spray fire retardant on the fire. In response to the instruction, the liquid sprayer can spray fire retardant on the fire.

An air blower can blow air or create an air flow in the area (e.g., environment) in proximity to the flow management light. The air blower can be employed, for example, to try to blow smoke out of an area in proximity to the flow management light (e.g., to another area outside of the building or to another desired area) or to create an air flow to blow or clear away a harmful chemical in the air in proximity to the flow management light. For instance, in response to the smoke detector detecting smoke in proximity to the flow management light, the flow management component 104 can determine that the air blower is to be turned on to blow the smoke out of the area in proximity to the flow management light, and can instruct the air blower to blow air in a certain direction. In response to the instruction, the air blower can switch to an on state and blow air in the certain direction to blow the smoke out of the area.

A flame thrower can be employed to emit flames in a controlled manner and desired direction (e.g., at a desired target). The flame thrower can be employed, for example, to emit flames in a controlled manner to create a controlled burn of agriculture or other materials. For instance, as part of land management, in response to a determination by the flow management component 104 of the flow management light (e.g., on a land vehicle, or on an air vehicle (e.g., helicopter, plane, drone)) that a certain area of land should be cleared to facilitate desirable land management, in accordance with defined environment criteria, the flow management component 104 can determine that the flame thrower is to be employed to clear that certain area of land, and can instruct the flame thrower to emit flames in a controlled manner in the direction of the certain area of land. In response to the instruction, the flame thrower can emit flames in a controlled manner in the direction of the certain area of land.

A heat projector can project, emit, or blow heat in a desired direction, in a desired area, or on a desired object or entity. For instance, the temperature sensor can sense a temperature level in the area of the flow management light. The flow management component 104 can determine that the temperature is too low, in accordance with the defined environment criteria. The flow management component 104 can instruct the heat projector to emit heat to increase the temperature in the area in proximity to the flow management light to a desired temperature, in accordance with the defined environment criteria.

A cold projector can project, emit, or blow colder air in a desired direction, in a desired area, or on a desired object or entity. For example, the temperature sensor can sense a temperature level in the area of the flow management light. The flow management component 104 can determine that the temperature is too high based at least in part on the defined environment criteria. The flow management component 104 can instruct the cold projector to emit colder air to decrease the temperature in the area in proximity to the flow management light to a desired temperature, in accordance with the defined environment criteria.

A scent projector can emit, spray, or project one or more desired scents (e.g., fragrances, chemicals) in the area in proximity to the flow management light. This can, for example, facilitate achieving a desired scent or smell in the area. For instance, in accordance with the defined environment criteria relating to scent, the flow management component 104 can determine that a particular scent is to be emitted in a particular amount in the area, or can determine that the amount of the particular scent being emitted in the area should be adjusted (e.g., increased, or decreased, in response to a detected change in environmental conditions in the area). The flow management component 104 can instruct the scent projector to emit the particular scent in a specified amount to introduce a desired amount of the particular scent in the area in proximity to the flow management light, in accordance with the defined environment criteria.

A chemical projector can emit, spray, or project one or more desired chemicals in the area in proximity to the flow management light. For example, it can be desired to emit chemicals (e.g., pesticides) on agricultural land or plants, or in a room(s) of or an area around a building, to reduce or control insects, animals, weeds, fungus, and/or other undesired pests. For instance, in accordance with the defined environment criteria relating to chemicals, the flow management component 104 can determine that a particular chemical is to be emitted in a particular amount in a particular area in which the flow management light is located or to which the flow management light can travel (e.g., via a vehicle associated with the flow management light), or can determine that the amount of the particular chemical being emitted in the particular area should be adjusted (e.g., increased, or decreased, in response to a detected change in environmental conditions in the area). The flow management component 104 can instruct the chemical projector to emit the particular chemical in a specified amount to introduce a desired amount of the particular chemical in the particular area in proximity to the flow management light, in accordance with the defined environment criteria.

An electric discharge device that can be employed to discharge electricity or static in an area or of an object in proximity to the flow management light. For example, a sensor of the sensor component 106 can detect that an object in proximity to the flow management light is electrically charged, wherein the flow management component 104 determine that such electrical charge of the object is undesirable based at least in part on the defined environment criteria. The flow management component 104 can instruct the electric discharge device to discharge the electrical charge of the object. In response to the instruction, the electric discharge device can operate to desirably discharge the electrical charge of the object.

A fire extinguisher can be employed to emit or spray fire retardant or another desired liquid and/or chemical to facilitate extinguishing a fire in an area in proximity to the flow management light or reachable by the flow management light (e.g., via a vehicle associated with the flow management light). For instance, in response to a heat sensor and/or smoke detector sensing a fire in the area, the flow management component 104 can determine that fire retardant is to be sprayed on the fire, and can instruct the fire extinguisher to spray fire retardant on the fire. In response to the instruction, the fire extinguisher can spray fire retardant on the fire to facilitate extinguishing the fire.

A laser device can be utilized to emit a laser light to perform one or more desired tasks. For example, in response a smoke detector detecting smoke in an area in proximity to the flow management light, wherein the smoke can make it difficult for a person to see a safe path through the area, the flow management component 104 can determine that the laser device should be engaged to emit a laser light that can illuminate the area and/or facilitate illuminating a safe path through the area to enable the person to be able to better see the area and safely proceed through the area. In response to, and in accordance with, an instruction from the flow management component 104, the laser device can emit laser light to the area or a desired portion (e.g., safe path) of the area in proximity to the flow management light.

A display screen and/or a video projector can be employed to facilitate displaying and/or projecting desired information (e.g., location information, directions, emergency or hazard information, alerts or notifications, videos) to a person in the area of the flow management light. For instance, in response to an emergency situation (e.g., fire, explosion, or gun shots) detected by one or more sensors (e.g., video camera, smoke detector, heat sensor, biohazard sensor, chemical sensor, audio sensor) in a building employing flow management lights at various locations in or around the building, the flow management component 104 (e.g., employing a GPS device or other instrument) can determine a desirable (e.g., safe) path of travel for a person to travel through the building to safely exit the building. The flow management component 104 can employ the display screen and/or the video projector to display or project a map detailing the path of travel, written directions, and/or other visual information (e.g., information regarding the type of hazard(s) or emergency that exists) to the person, so that the person can be notified of the emergency situation and/or hazard(s) and of the path of travel to take to safely exit the building. Additionally or alternatively, in some implementations, the flow management component 104 can coordinate with other flow management lights (and flow management components of the other flow management lights) in the building to have flow management lights along the travel path to be lit (e.g., with the lights themselves being lit and/or indicators (e.g., green colored indicators) being lit) to highlight and show the travel path to the person. Other flow management lights that are off the travel path and/or are in a hazardous area can be differently lit from the flow management lights along the travel path and/or can employ different indicators (e.g., red indicators) to facilitate indicating, to the person, that the person should not proceed into those areas associated with those other flow management lights.

An audio speaker(s) can be employed to provide audio information (e.g., location information, directions, emergency or hazard information, alerts or notifications, music) to a person(s) located in the area in proximity to the flow management light. For example, in response to an emergency situation (e.g., fire, explosion, or gun shots) detected by one or more sensors in a building employing flow management lights at various locations in or around the building, the flow management component 104 (e.g., employing a GPS device or other instrument) can determine a desirable (e.g., safe) path of travel for a person to travel through the building to safely exit the building. The flow management component 104 can employ the audio speaker(s) to emit or present map or direction information detailing the path or direction of travel and/or other audio information (e.g., information regarding the type of hazard(s) or emergency that exists) to the person(s), so that the person(s) can be notified of the emergency situation and/or hazard(s) and of the path or direction of travel to take to safely exit the building.

The flow management light also can employ one or more indicators, which can comprise visual indicators (e.g., LEDs) or audio indicators. For example, in addition to or as an alternative to other visual information or audio information that can be presented by the flow management light, the flow management component 104 can facilitate the presentation of one or more visual indicators (e.g., via one or more LED indicators) and/or audio indicators (e.g., via one or more audio speakers) to facilitate providing information to a person(s) in proximity to the flow management light, and/or notifying or alerting the person(s) to a condition (e.g., environmental, emergency, and/or hazardous condition) in or near the area in proximity to the flow management light. For instance, a visual indicator can be a green-colored light (e.g., green-colored LED) and/or arrow-shaped indicator light to indicate a person is on a desired (e.g., correct, appropriate, and/or safe) travel path by traveling in the area of the flow management light, whereas visual indicator can be a red-colored light (e.g., red-colored LED) and/or X-shaped indicator light to indicate a person is not on the desired (e.g., correct, appropriate, or safe) travel path by traveling in the area of the flow management light and/or there may be a hazard in that area.

In some embodiments, the light component 102, the flow management component 104, the sensor component 106, and the instrument component 108 can be integrated together to form a device (e.g., a flow management light device), as more fully described herein. In other embodiments, as more fully disclosed herein, all or a portion of the flow management component 104 can be implemented in a device that can be distinct from, but associated with (e.g., connected to), the light component 102, the sensor component 106, and/or the instrument component 108; all or a portion of the sensor component 106 (e.g., all or a portion of the sensors of the sensor component 106) can be implemented in a device that can be distinct from, but associated with, the light component 102, the flow management component 104, and/or the instrument component 108; and/or all or a portion of the instrument component 108 (e.g., all or a portion of the instruments, tools, etc., of the instrument component 108) can be implemented in a device that can be distinct from, but associated with, the light component 102, the flow management component 104, and/or the sensor component 106.

Figure 2:
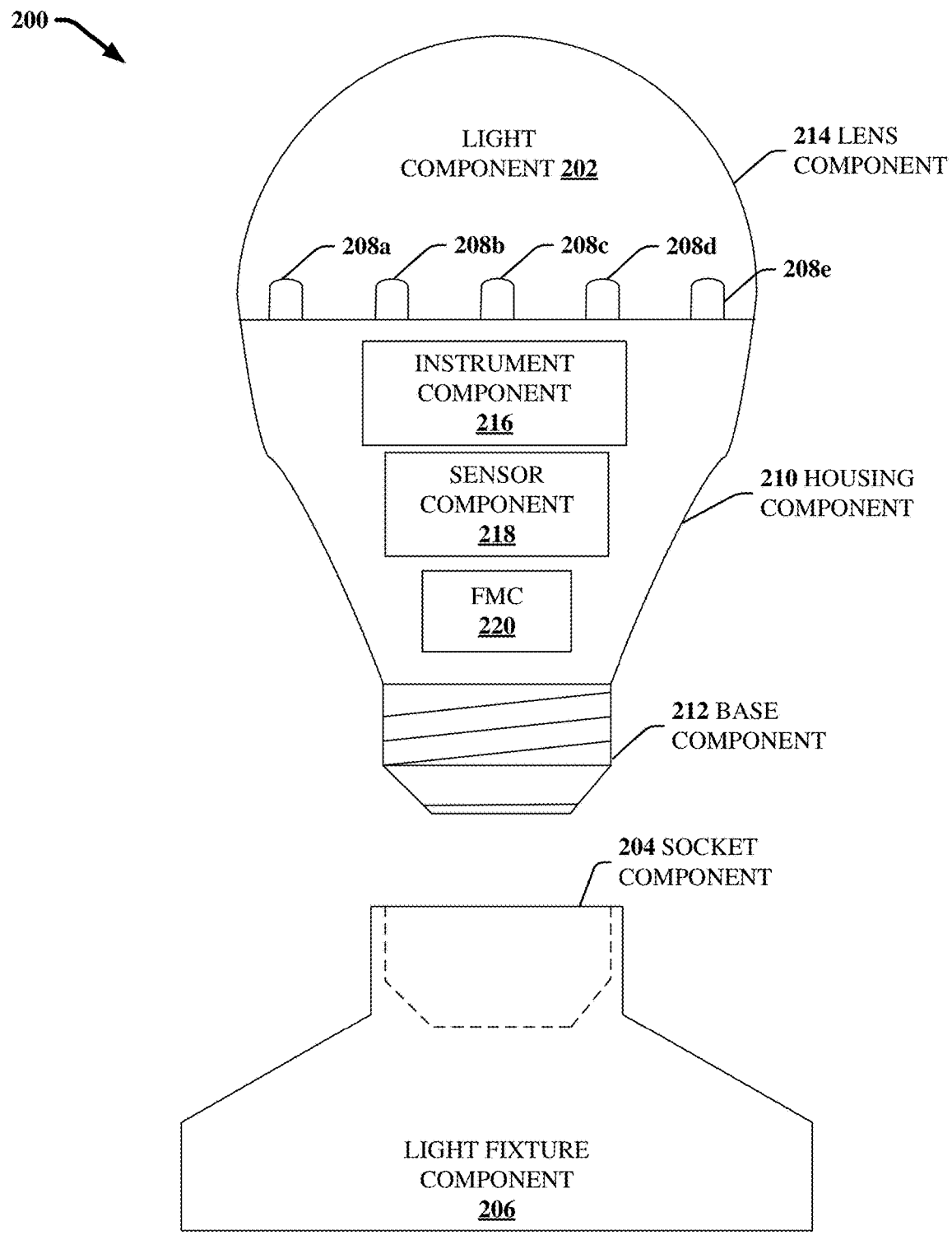
FIG. 2 depicts a block diagram of an example, non-limiting flow management light, in accordance with one or more aspects and embodiments described herein.

Referring briefly to FIG. 2, FIG. 2 depicts a block diagram of an example, non-limiting flow management light 200 (e.g., flow management light system), in accordance with one or more aspects and embodiments described herein. The flow management light 200 can comprise a light component 202 (e.g., a light bulb), which can be installed (e.g., as a retrofit) into a socket component 204 of a light fixture component 206 of or associated with the flow management light 200. The light component 202 can comprise one or more light emitting elements (e.g., light emitting devices), such as, for example, light emitting elements 208a, 208b, 208c, 208d, and/or 208e (e.g. LED, organic LED (OLED), filament, quantum dot, incandescent, high-intensity discharge (HID), neon, fluorescent, compact fluorescent (CFL), electroluminescent (EL), laser, or any other suitable light emitting element).

The flow management light 200 also can comprise a housing component 210, a base component 212, a lens component 214, an instrument component 216, a sensor component 218, and a flow management component (FMC) 220. The housing component 210 can provide a structure or casing that can house or contain one or more components of the flow management light 200, wherein the structure or casing can be formed from one or more desired materials (e.g., metal, polymer material, glass, ceramic, fiberglass, etc.). The base component 212 at least partially can be formed of a conductive material (e.g., metal) to facilitate forming an electrical connection between the base component 212 and the socket component 204, when the base component 212 is inserted (e.g., screwed into or connected to) the socket component 204, to facilitate powering the flow management light 200. The lens component 214 can provide a desired lens, medium, or conduit through which light can be emitted from the light component 202 of the flow management light 200.

The instrument component 216 can comprise one or more instruments, tools, or devices (e.g., a projectile launcher, a liquid sprayer, an air blower, . . . ) that can perform respective functions or tasks, as more fully disclosed herein. The sensor component 218 can comprise or employ one or more sensors (e.g., RFID reader, navigation device, video camera, GPS device, motion sensor, . . . ) that can sense respective conditions associated with the environment(s) (e.g., physical environment, logical environment, communication network environment) in which the flow management light 200 is situated or with which the flow management light 200 is associated, as more fully described herein.

The flow management component 220 can be associated with (e.g., connected to) the light component 202, instrument component 216, sensor component 218, and other components of the flow management light 200 to facilitate controlling operation of the flow management light 200, including the light component 202, instrument component 216, sensor component 218, and other components of the flow management light 200, and/or other flow management lights associated with the flow management light 200, in accordance with the light profile and/or environment profile associated with the flow management light 200 and generated by the flow management component 220, as more fully disclosed herein. The flow management component 220 can receive environment-related information from one or more sensors of the sensor component 218 and/or from another source(s) (e.g., another flow management light) of environment-related information, wherein the environment-related information can relate to an environment in an area in which the flow management light 200 is installed or is located. The flow management component 220 can analyze the environment-related information to generate analysis results. The flow management component 220 can determine and generate an environment profile that can describe characteristics of the environment, based at least in part on the analysis results, in accordance with the defined environment criteria.

The flow management component 220 also can determine and generate a light profile for the flow management light 200, based at least in part on the results of the analysis of the environment profile and light-related information associated with the flow management light 200, in accordance with defined light management criteria. The light-related information can comprise information regarding the capabilities, specifications, features, characteristics, status, etc., of the flow management light 200 and components (e.g., light component 202, instrument component 216, sensor component 218, . . . ) thereof. The flow management component 220 can employ the light profile to configure (e.g., automatically, dynamically, or self configure) one or more parameters (e.g., by setting or modifying a parameter(s)) of the flow management light 200, wherein such configuration of the flow management light 200 can be based at least in part on conditions (e.g., current conditions, predicted future conditions) of the environment in the area in which the flow management light 200 is installed or is located, as determined, for example, by the flow management component 220 from the environment profile. The configuration of the flow management light 200 and the operation of the flow management light 200, as controlled by the flow management component 220, can enable the flow management light 200 to take action (e.g., perform a responsive action) in response to the conditions of the environment in the area in which the flow management light 200 is installed or is located, wherein, when the flow management component 220 determines a particular action is appropriate, the particular action can comprise executing one or more tools (e.g., projectile launcher, liquid sprayer, and/or air blower, . . . ) of the instrument component 216.

It is to be appreciated and understood that, while five light emitting devices 208a, 208b, 208c, 208d, and 208e are depicted in FIG. 2 for illustrative purposes only, the flow management light 200 can include any desired (e.g., suitable) number of light emitting elements. It is also to be appreciated and understood that the flow management light 200 can comprise other components (not shown) or exclude one or more components. For example, the flow management light 200 can exclude the lens component 214. In another example, the flow management light 200 can comprise one or more reflectors, one or more shades, one or more positioning motors, and/or any other components desired (e.g., that are suitable), in accordance with functionality described herein.

Figure 3:
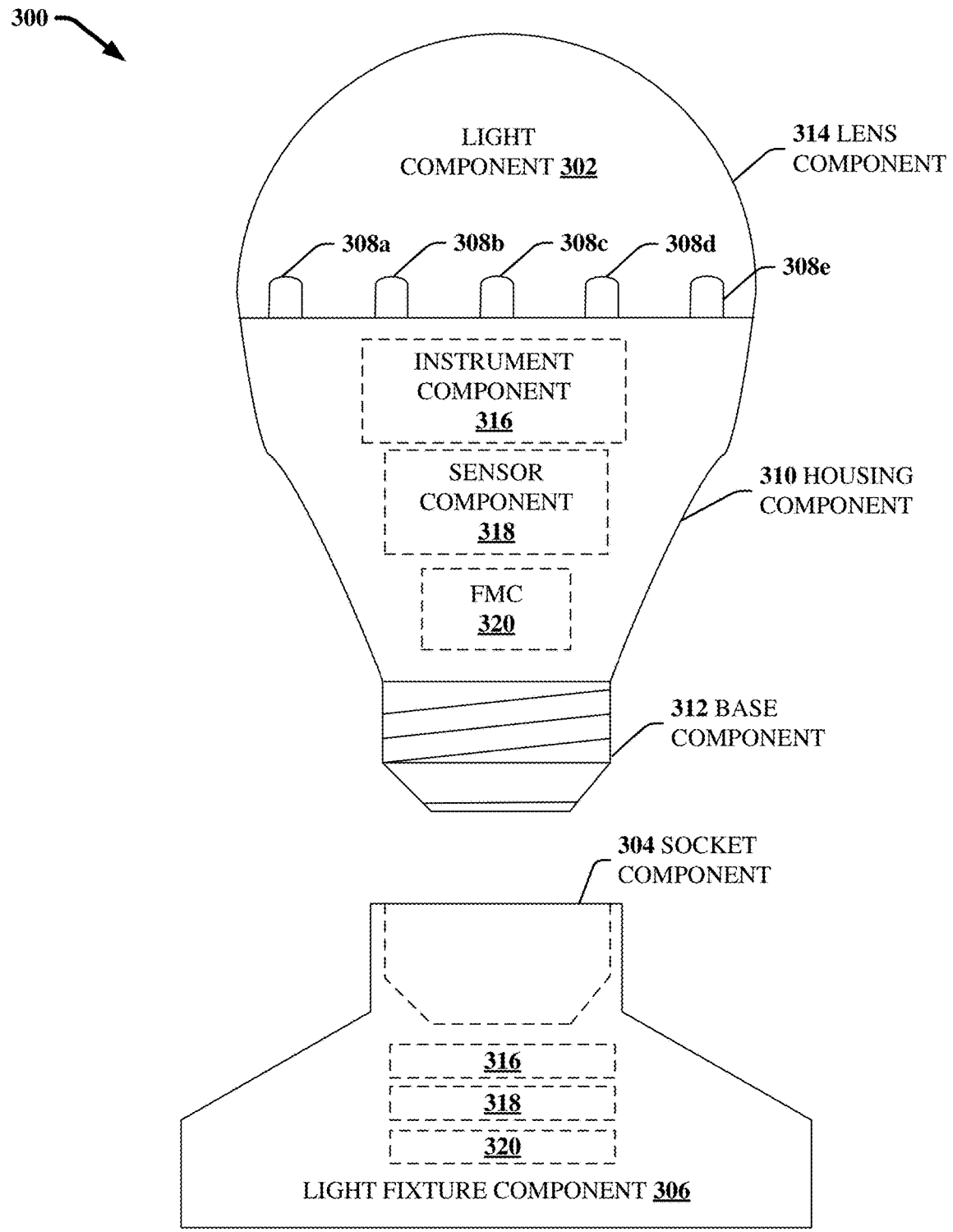
FIG. 3 illustrates a block diagram of an example, non-limiting flow management light in accordance with one or more aspects and embodiments of the disclosed subject matter.

FIG. 3 illustrates a block diagram of an example, non-limiting flow management light 300, in accordance with one or more aspects and embodiments of the disclosed subject matter. The flow management light 300 can comprise a light component 302. The flow management light 300 can comprise a socket component 304 and a light fixture component 306 (e.g., self-aware light fixture component). The light component 302 can comprise one or more light emitting elements, such as, for example, light emitting elements 308a, 308b, 308c, 308d, and/or 308e. The flow management light 300 also can include a housing component 310, a base component 312, a lens component 314, an instrument component 316, a sensor component 318, and a flow management component 320. The base component 312 of the light component 302 can be installed into the socket component 304 of the light fixture component 306.

The flow management light 300 can comprise the same or similar functionality as the flow management light 200 of FIG. 2 (and flow management lights disclosed herein). The difference between the flow management light 300 and the flow management light 200 is that all or a portion of the instrument component 316, all or a portion of the sensor component 318, and/or all or a portion of the flow management component 320 can be situated in or associated with the light fixture component 306, wherein none or a portion of the instrument component 316, none or a portion of the sensor component 318, and/or none or a portion of the flow management component 320 can be situated in the housing component 310 of the flow management light 300.

It is to be appreciated and understood that the light fixture component 306 (e.g., self-aware light fixture component) can include other components (not shown) or exclude one or more components. For example, the light fixture component 306 can include one or more light emitting devices or indicators, one or more reflectors, one or more shades, one or more positioning motors, or any other suitable components needed according to functionality described herein. It is to be appreciated that the light component 302 can communicate with the light fixture component 306 via a wired or wireless communication connection. For example, the base component 312 can be connected to the socket component 304, which can form a wired communication connection.

While FIGS. 2 and 3 depict a flow management light (e.g., 200, 300) that can be fit or inserted into a light fixture component (e.g., 206, 306), it is to be appreciated and understood that a single light fixture component can comprise a plurality of socket components (e.g., 204, 304) for installation of a plurality of lights (e.g., light bulbs).

Figure 4:
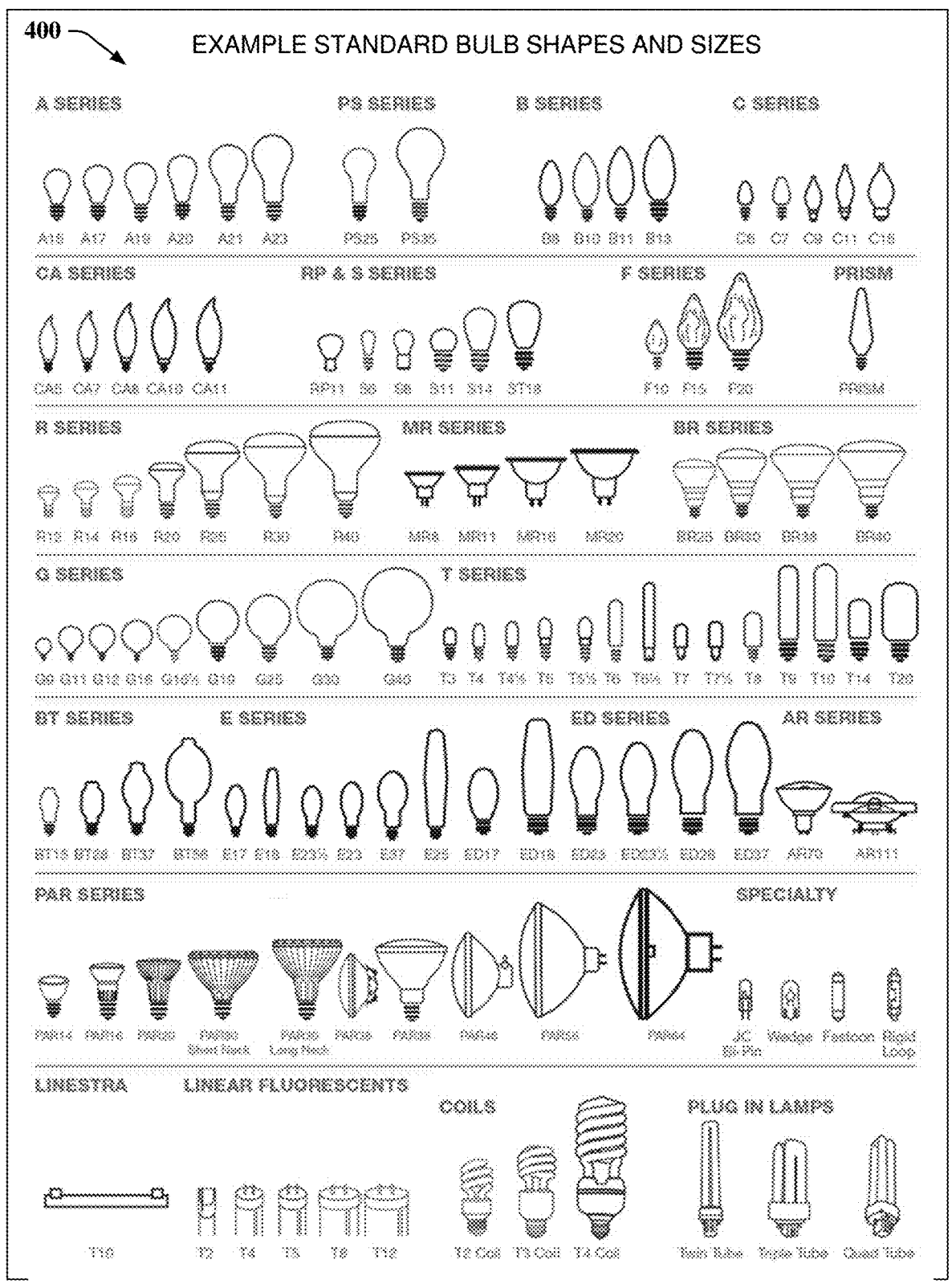
FIG. 4 presents an example, non-limiting light bulb diagram of standard shapes and sizes of light bulbs that can be employed for one or more light elements of a light component for a flow management light, in accordance with various aspects and embodiments of the disclosed subject matter.

Referring briefly to FIG. 4 (along with FIGS. 1, 2, and 3), FIG. 4 presents an example, non-limiting light bulb diagram 400 of standard shapes and sizes of light bulbs that can be employed for one or more light elements of a light component (e.g., 102, 202, 302) for a flow management light, in accordance with various aspects and embodiments of the disclosed subject matter. It is to be appreciated and understood that the flow management light can be customized to be in any suitable shape and any suitable size, employing one or more light elements or bulbs having desired shapes and sizes, for an application in which a flow management light is to be installed, in accordance with various aspects and embodiments of the disclosed subject matter.

Figure 5:
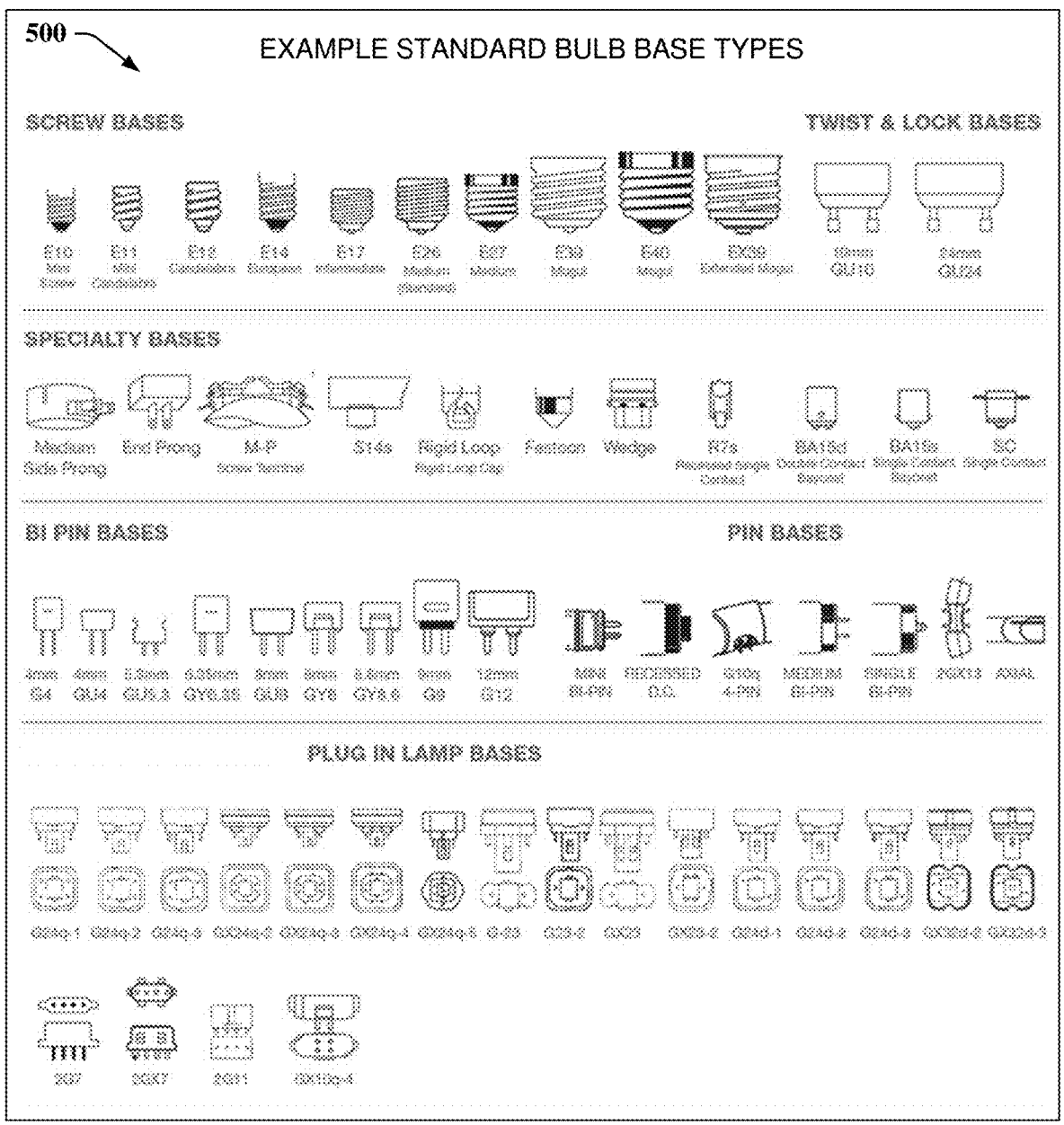
FIG. 5 illustrates an example, non-limiting diagram of standard types of base components, in accordance with various aspects and embodiments of the disclosed subject matter.

Referring briefly to FIG. 5 (along with FIGS. 1, 2, and 3), FIG. 5 illustrates an example, non-limiting diagram 500 of standard types of base components (e.g., that can be employed for base component 212 or 312), in accordance with various aspects and embodiments of the disclosed subject matter. It is to be appreciated and understood that a base component (e.g., 212, 312) can be customized to be in any desired (e.g., suitable) form for an application in which a light element(s) or bulb(s) of the flow management light is to be installed. Likewise, the socket component (e.g., 204, 304) can be customized to be compatible with the base component (e.g., 212, 312). Additionally, the light fixture component (e.g., 206, 306) can be customized to be in any desirable (e.g., suitable) form for an application in which a light element(s) or bulb(s) of the flow management light is to be installed.

With further regard to FIG. 1 (along with FIGS. 2 and 3), the system 100 (e.g., the flow management light of the system 100) can comprise one or more power sources (not shown). Non-limiting examples the one or more power sources can include electrical grid power, a battery, an electrochemical cell, a fuel cell, natural gas generated electric power, compressed air generated electric power, diesel fuel generated electric power, gasoline generated electric power, oil generated electric power, propane generated electric power, a nuclear power system, a solar power system, a wind power system, a piezoelectric power system, microelectrical mechanical systems (MEMS)-generated electric power, an inductive power system, a radio-frequency power system, a wireless power transfer mechanism, and/or any other suitable power source. In an example, a flow management light of the system 100 can have a constantly, or substantially constantly, available power source, such as that provided by an electrical power grid. In another example, a flow management light of the system 100 can have a temporary power source, such as a battery (e.g. disposable battery or rechargeable battery). In a further example, a flow management light of the system 100 can generate and store its own power, such as by solar via a solar cell, fuel cell, radio-frequency harvesting, induction, piezoelectric, electro-mechanical, chemical, nuclear, carbon based-fuel, and/or any other suitable self-generating power source. This can be advantageous for long-term installations (e.g. where frequent battery changes would be required) that do not have a constantly available power source, such as an outdoor environment where a power outlet may not readily be available (e.g. a porch, a yard, a camping site, a farm field, a park, a sports field, etc.), or an indoor location where a power outlet may not readily be available (e.g. a closet, a sunroom, a cabinet, a drawer, a garage, a barn, a shed, an indoor location where an extension cord is not desired, etc.). It is to be appreciated and understood that the flow management light can have a plurality of different power sources, with one or more power sources acting as a backup for another power source. It is to be appreciated and understood that the flow management light also can have configurable power sources. For example, the flow management light can have a modular configuration that can allow for one or more power sources to be added or removed by a manufacturer or user.

A flow management light (e.g., the flow management light of the system 100, flow management light 200, flow management light 300) can comprise one or more computers, one or more processors, one or more memories, and/or one or more programs. A flow management light can communicate via any suitable form of wireless or wired communication using a communication component or device of or associated with the flow management light. Non-limiting examples of wireless communication can include, for example, radio communication, optical communication, sonic communication, electromagnetic induction communication, or any other suitable wireless communication.

A flow management light (e.g., the flow management light of the system 100, flow management light 200, flow management light 300) can be constructed of any desired (e.g., suitable) material(s) appropriate for environments in which the flow management light will operate. A flow management light can have suitable protection against an environment in which the flow management light will operate, wherein non-limiting examples of the materials that can be used to construct the flow management light can comprise materials that can be weather resistant, crush resistant, fire resistant, heat resistant, cold resistant, pressure resistant, impact resistant, liquid and/or solid material ingress protected or resistant, chemical resistant, corrosion resistant, shatter resistant, scratch resistant, bio-contamination resistant, electromagnetic pulse resistant, electrical shock resistant, projectile resistant, explosion resistant, or any other suitable resistance for an environment in which the flow management light can operate.

The computer processing systems, computer-implemented methods, apparatus and/or computer program products of a flow management light (e.g., the flow management light of the system 100, flow management light 200, flow management light 300) can employ hardware and/or software that can solve problems that can be highly technical in nature (e.g., related to complex coordination between respective flow management lights, complex coordination between one or more flow management lights and another device, performance of self-configuration of a flow management light(s)) that are not abstract and that cannot be performed as a set of mental acts by a human. One or more embodiments of the subject computer processing systems, methods, apparatuses and/or computer program products can enable one or more flow management lights (e.g., the flow management light of the system 100, flow management light 200, flow management light 300) to coordinate amongst themselves, and optionally with other devices, to perform actions to understand the environment in which the one or more flow management lights are installed, determine an objective (e.g. goal, intention, purpose, action, operation, configuration, etc.) of such installation, perform a self-configuration of the flow management light(s) according to such determined objective, and operate to achieve such determined objective. For example, the flow management lights can employ artificial intelligence to learn their environment, and learn actions to facilitate performing self-configuration of the flow management lights and to operate for a determined objective of the installation in the environment.

Figure 6:
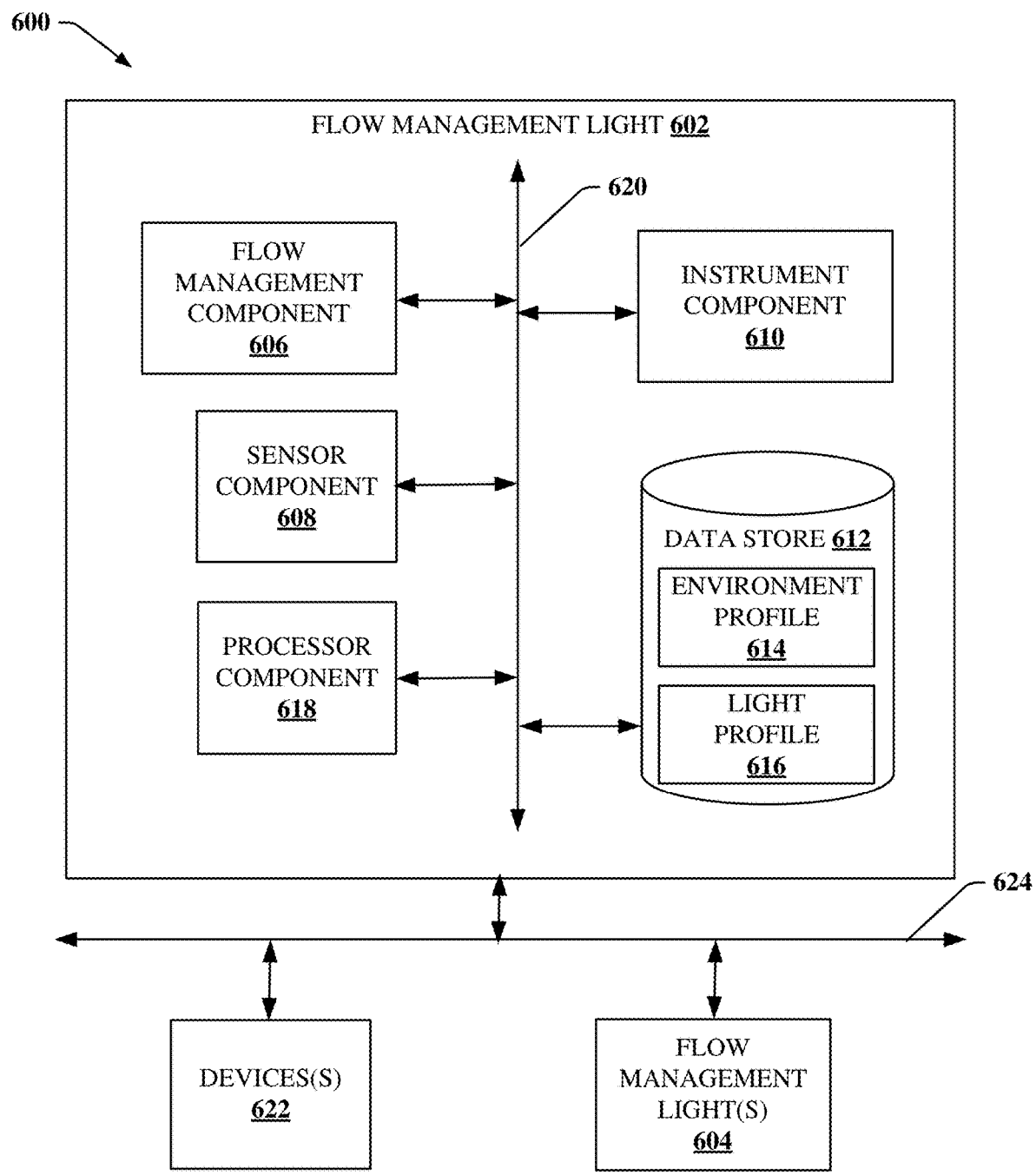
FIG. 6 illustrates a block diagram of an example, non-limiting system that can employ a set of flow management lights that can coordinate with each other and/or another device(s), in accordance with various aspects and embodiments of the disclosed subject matter.

FIG. 6 illustrates a block diagram of an example, non-limiting system 600 that can employ a set of flow management lights that can coordinate with each other and/or another device(s), in accordance with various aspects and embodiments of the disclosed subject matter. The set of flow management lights can comprise a plurality of flow management lights, including a flow management light 602 and one or more other flow management lights, such as flow management light 604. The flow management lights 602 and 604 can comprise the same or similar components and functionality as the flow management lights (e.g., flow management light of system 100, flow management light 200, flow management light 300) disclosed herein.

In accordance with various embodiments, the flow management lights 602 and 604 can be or include the structure and/or functionality of one or more of flow management lights 200 or 300 and/or any other structure and/or functionality described herein for flow management lights. In one example, the flow management light 602 can be a different type of flow management light than flow management light 604. In another example, a flow management light 604 can be the same type of flow management light as flow management light 602 and/or include one or more components (e.g., flow management component, instrument component, and/or sensor component, . . . ) that can be found in the flow management light 602. It is to be appreciated and understood that, in the disclosure herein in which more than one flow management light is employed, the flow management lights can comprise one or more flow management lights 602 and/or one or more flow management lights 604.

The respective flow management lights (e.g., 602, 604) of the set of flow management lights can learn, understand, and react (e.g., respond) to the respective environments in which the respective flow management lights are installed or located, determine respective objectives of such installation or location, perform respective self-configuration of the respective flow management lights according to the respective determined objectives and the defined light management criteria, and respectively operate to achieve the respective determined objectives, in accordance with one or more aspects and embodiments described herein.

The flow management light 602 can include a flow management component 606, a sensor component 608 comprising one or more sensors, and an instrument component 610 comprising one or more instruments. The flow management component 606, sensor component 608, and instrument component 610 can respectively be the same as or similar to, and/or can comprise the same or similar functionality as, respective components (e.g., respectively named components), as more fully described herein.

The flow management light 602 also can include or otherwise be associated with one or more data stores (e.g., one or more memories), such as data store 612, that can store machine (e.g., computer) executable components (e.g., machine executable components can include, but are not limited to, all or a portion of the flow management component 606, a portion of the sensor component 608, a portion of the instrument component 610, and/or associated components). The data store 612 can store an environment profile 614 that can comprise data (e.g., environment data) that can relate to and/or describe characteristics (e.g., attributes) of an environment in which the flow management light 602 is installed or located. The data store 612 also can store a light profile 616 that can comprise data that can relate to and/or describe the environment profile 614, capabilities of the flow management light 602 and configuration of self-aware light 502. For example, the data in the light profile 616 can comprise specifications of the flow management light 602, parameters of the flow management light 602, environmental data of the environment profile, mapping information that can map the characteristics of the environment to characteristics of the flow management light 602, to respective functions of the flow management light 602, to respective parameters of respective components of the flow management light 602, and/or to responsive actions that can be performed by the flow management light 602 (e.g., by the flow management component 606, the instrument component 610, and/or the processor component 618, . . . ) to respond to a condition(s) (e.g., environmental condition(s)) of or associated with the environment.

The data store 612 can store data structures (e.g., user data, metadata), code structure(s) (e.g., modules, objects, hashes, classes, procedures) or instructions, information relating to operation of the flow management light 602 or associated flow management lights, parameters, responsive actions (e.g., responsive to environmental conditions of the environment), policies, defined light management criteria, defined environment criteria, algorithms (e.g., defined light management algorithm(s)), protocols, interfaces, tools, and/or other information, to facilitate controlling operations associated with the flow management light 602. In an aspect, the processor component 618 can be functionally coupled (e.g., through a system bus 620 and/or a memory bus (not shown in FIG. 6)) to the data store 612 in order to store and retrieve information desired to operate and/or confer functionality, at least in part, to the flow management component 606, sensor component 608, instrument component 610, the processor component 618, and data store 612, etc., and/or substantially any other operational aspects of the flow management light 602.

The flow management light 602 also can include or otherwise be associated with at least one processor component, including the processor component 618, that can execute the machine executable components and/or machine executable instructions stored in the data store 612. The processor component 618 can work in conjunction with the other components (e.g., the flow management component 606, sensor component 608, instrument component 610, data store 612) to facilitate performing the various functions of the flow management light 602. The processor component 618 can employ one or more processors, microprocessors, or controllers that can process data, such as information relating to operation of the flow management light 602 or associated flow management lights, parameters, responsive actions (e.g., responsive to environmental conditions of the environment), policies, defined light management criteria, defined environment criteria, algorithms (e.g., defined light management algorithm(s)), protocols, interfaces, tools, and/or other information, to facilitate operation of the flow management light 602, as more fully disclosed herein, and control data flow between the flow management light 602 and other components or devices (e.g., one or more other flow management lights (e.g., 604) associated with the communication network 624, one or more devices, such as device(s) 622, associated with the communication network 624, network devices of the communication network 624, data sources, applications, . . . ) associated with the flow management light 602.

The flow management light 602 can further include a system bus 620 that can couple the various components including, but not limited to, the flow management component 606, the sensor component 608, the instrument component 610, the data store 612, the processor 618, and/or other components of the flow management light 602 to each other. The one or more other flow management lights (e.g., 604) can comprise the same or similar components and/or functionality as the flow management light 602. For reasons of brevity, the components (e.g., flow management component, sensor component, instrument component, data store, processor component, . . . ) of the one or more other flow management components (e.g., 604) are not shown in FIG. 6.

The communication network 624 can comprise a macro communication network and/or a micro communication network. The macro communication network can be, can comprise, or can be associated with a core network, a cellular network, an IP-based network, wireless fidelity (Wi-Fi), Wi-Max, gigabit wireless (Gi-Fi) network, Hi-Fi network (e.g., providing higher gigabit data communication than Gi-Fi or Wi-Fi), Bluetooth, ZigBee, etc. The micro communication network can be associated with the macro communication network, wherein the micro communication network typically can operate in a defined local area (e.g., in or in proximity to a home, building, or other defined area). The micro communication network can be, can comprise, or can be associated with Wi-Fi, Wi-Max, Gi-Fi, Hi-Fi, Bluetooth, ZigBee, etc., and/or can be associated with (e.g., connected to) the macro communication network. The micro communication network can be or can comprise, for example a local area network (LAN) or wireless LAN (WLAN), that can facilitate connecting certain devices (e.g., flow management lights and/or other devices) associated with the micro communication network to each other and/or to the macro communication network. The macro communication network and/or a micro communication network can employ radio communication, microwave communication, satellite communication, optical communication, sonic communication, electromagnetic induction communication, or any other desired (e.g., suitable) communication technology.

Respective communication devices (e.g., flow management light 602, flow management light(s) 604, and/or device(s) 622, . . . ) can be associated with (e.g., communicatively connected to) the communication network 624 via a wireless communication connection or a wireline (e.g., wired) communication connection (e.g., via a cell and associated base station). The respective communication devices (e.g., flow management light 602, flow management light(s) 604, and/or device(s) 622, . . . ) can operate and communicate in the communication network environment. At various times, a communication device (e.g., flow management light 602, flow management light(s) 604, and/or device(s) 622, . . . ) can be communicatively connected via a wireless communication connection(s) to one or more radio access networks (RANs) (not shown), which can comprise one or more base stations (not shown) to communicatively connect the communication device to the communication network 624 to enable the communication device to communicate with other communication devices associated with (e.g., communicatively connected to) the communication network 624 in the communication network environment. The RANs can comprise, for example, a 3GPP universal mobile telecommunication system (UMTS) terrestrial RAN (UTRAN), an E-UTRAN (e.g., Long Term Evolution (LTE) RAN), a GSM RAN (GRAN), and/or other type of RAN(s) employing another type of communication technology.

The communication network 624 can comprise one or more wireline communication networks and one or more wireless communication networks, wherein the one or more wireless communication networks can be based at least in part on one or more various types of communication technology or protocols, such as, for example, 3G, 4G, 5G, or x generation (xG) network, where x can be virtually any desired integer or real value; Wi-Fi; Gi-Fi; Hi-Fi; etc. The communication network 624 (e.g., macro communication network, micro communication network, core network, cellular network, or a network comprising a core network, a cellular network, and/or an IP-based network) can facilitate routing voice and data communications between a communication device(s) (e.g., flow management light 602, flow management light(s) 604, and/or device(s) 622, . . . ) and another communication device associated with the communication network 624 in the communication network environment. The communication network 624 also can allocate resources to the communication devices in the communication network 624, convert or enforce protocols, establish and enforce quality of service (QOS) for the communication devices, provide applications or services in the communication network 624, translate signals, and/or perform other desired functions to facilitate system interoperability and communication in the communication network 624 (e.g., wireless portion of the communication network 624 or wireline portion of the communication network 624). The communication network 624 further can comprise desired components, such as routers, nodes (e.g., general packet radio service (GPRS) nodes, such as serving GPRS support node (SGSN), gateway GPRS support node (GGSN)), switches, interfaces, controllers, etc., that can facilitate communication of data between communication devices in the communication network environment.

As a communication device(s) (e.g., flow management light 602, flow management light(s) 604, and/or device(s) 622, . . . ) is moved through a wireless communication network environment, at various times, the communication device(s) can be connected (e.g., wirelessly connected) to one of a plurality of access points (APs) (e.g., macro or cellular AP, femto AP, pico AP, wi-fi AP, wi-max AP, hotspot (e.g., hotspot 1.x, hotspot 2.x, where x is an integer number; communication device (e.g., communication device functioning as a mobile hotspot)) that can operate in the wireless communication network environment. An AP (e.g., a macro base station or micro base station) can serve a specified coverage area to facilitate communication by the communication device(s) (e.g., flow management light 602, flow management light(s) 604, and/or device(s) 622, . . . ) or other communication devices in the wireless communication network environment. An AP can serve a respective coverage cell (e.g., macrocell, femtocell, picocell, . . . ) that can cover a respective specified area, and the AP can service mobile wireless devices, such as the communication device(s) (e.g., flow management light 602, flow management light(s) 604, and/or device(s) 622, . . . ) located in the respective area covered by the respective cell, where such coverage can be achieved via a wireless link (e.g., uplink (UL), downlink (DL)). When an attachment attempt is successful, the communication device(s) (e.g., flow management light 602, flow management light(s) 604, and/or device(s) 622, . . . ) can be served by the AP and incoming voice and data traffic can be paged and routed to the communication device(s) through the AP, and outgoing voice and data traffic from the communication device(s) can be paged and routed through the AP to other communication devices in the communication network environment. In an aspect, the communication device(s) (e.g., flow management light 602, flow management light(s) 604, and/or device(s) 622, . . . ) can be connected and can communicate wirelessly using virtually any desired wireless technology, including, for example, cellular, Wi-Fi, Gi-Fi, Hi-Fi, Wi-Max, Bluetooth, wireless local area networks (WLAN), etc.

It is to be appreciated and understood that, in some embodiments, the flow management light 602 can establish a direct communication connection (e.g., a direct wireline or wireless communication connection) with the other flow management light(s) 604 and can communicate with the other flow management light(s) 604 without using the communication network 624.

A device 622 can be any electronic device that can electronically interact (e.g. unidirectional interaction or bidirectional interaction) with the flow management light 602 and/or flow management light(s) 604, wherein non-limiting examples of a device 622 can comprise a wearable electronic device or a non-wearable electronic device. It is to be appreciated that interaction can include in a non-limiting example, communication, control, physical interaction, or any other suitable interaction between devices (e.g., between the device 622 and the flow management light 602). A wearable device can include, for example, heads-up display glasses, a monocle, eyeglasses, contact lens, sunglasses, a headset, a visor, a cap, a mask, a headband, clothing, or any other suitable device that can be worn by a human or non-human user, wherein the wearable device comprises electronic components. Non-wearable devices can comprise, for example, a mobile device, a mobile phone, a camera, a camcorder, a video camera, a laptop computer, a tablet device (e.g., an electronic tablet or electronic notebook), a desktop computer, a server system, a set top box (e.g., a cable set top box, a satellite set top box), a cable modem, a television set, a monitor, a media extender device, a blu-ray device, a DVD (digital versatile disc or digital video disc) device, a compact disc device, a video game system, a portable video game console, an audio/video receiver, a radio device, a portable music player, a navigation system (e.g., a GPS system), a car stereo, a mainframe computer, a robotic device, an artificial intelligence system, a home automation system, a security system, a messaging system, a presentation system, a sound system, a warning system, a fire suppression system, a lighting system, a network storage device, a communication device, a web server device, a network switching device, a network routing device, a gateway device, a network hub device, a network bridge device, a control system, a washing machine, a dryer, a refrigerator, a dishwashing machine, an oven, a stove, a microwave, a coffee maker, a kitchen appliance, a toy, or any other suitable device. In some embodiments, the device 622 can be equipped with a communication device that can enable the device 622 to communicate with the flow management light 602 and/or the flow management light(s) 604 over the communication network 624. It is to be appreciated that the device 622 can be employed by a user to interact with the flow management light 602 and/or the flow management light(s) 604.

In some embodiments, two or more of the respective flow management lights (e.g., 602, 604) can coordinate with each other to understand the respective environments in which the respective flow management lights (e.g., 602, 604) are installed or located, determine respective objectives of the respective installations or locations, perform respective self-configurations according to the respective objectives, and respectively operate to achieve the respective objectives.

For instance, the flow management light 602 can be associated with an area, and another flow management light(s) 604 can be associated with another area(s), which can be completely distinct from the area or can partially cover (e.g., encompass) the area associated with the flow management light 602. The flow management component 606 (e.g., a network component of the flow management component 606) of the flow management light 602 can detect and contact the other flow management light(s) 604 (e.g., a network component(s) of the other flow management component(s) of the other flow management light(s) 604) via the communication network 624. The respective flow management components of the respective flow management lights (e.g., 602, 604) can exchange network-related information and/or other information to facilitate setting up a communication connection with each other, and can establish the communication connection(s) between the flow management light 602 and the other flow management light(s) 604 based at least in part on the network-related information and/or other information. The communication connection can be a wireline communication connection and/or a wireless communication connection.

The flow management light 602 can communicate, via the communication connection and the communication network 624, the environment profile and the light profile associated with the flow management light to the at least one other flow management light, wherein the environment profile can comprise environmental profile information regarding the environmental conditions associated with the area associated with (e.g., in proximity to) the flow management light 602, and the light profile can comprise light profile information regarding the features (e.g., characteristics, attributes, functions, . . . ) of the flow management light 602. The other flow management light(s) 604 can communicate, via the communication connection and the communication network 624, its environment profile(s) and light profile(s) associated with the other flow management light(s) 604 to the flow management light 602, wherein the environment profile(s) associated with the other flow management component(s) 604 can comprise environmental profile information regarding the environmental conditions associated with the other area(s) associated with (e.g., in proximity to) the other flow management light(s) 604, and the light profile(s) associated with the other flow management light(s) 604 can comprise light profile information regarding the features (e.g., characteristics, attributes, functions, . . . ) of the other flow management light(s) 604.

The respective flow management lights (e.g., 602, 604) can determine and coordinate respective actions, which can be responsive to the respective environmental conditions associated with the respective flow management lights (e.g., 602, 604), between the flow management light 602 and the other flow management light(s) 604, based at least in part on the results of analyzing the respective environmental profile information and/or the respective light profile information associated with the respective flow management lights (e.g., 602, 604). For instance, the flow management component 606 of the flow management light 602, and/or another flow management component(s) of the other flow management light(s) 604, can analyze (e.g., respectively analyze) the respective environmental profile information and/or the respective light profile information associated with the respective flow management lights (e.g., 602, 604). Based at least in part on the results (e.g., the respective results) of the analysis (e.g., the respective analysis), the flow management component 606 of the flow management light 602, and/or the other flow management component(s) of the other flow management light(s) 604, can determine the respective actions that are to be performed by the respective flow management lights (e.g., 602, 604), in accordance with the defined light management criteria. The flow management component 62 and the other flow management component(s) 604 can negotiate and coordinate with each other to facilitate determining the respective actions that the respective flow management lights (e.g., 602, 604) are to perform to be responsive to the respective environmental conditions associated with the respective flow management lights.

In response to determining the respective actions and coordinating the respective actions between the respective flow management lights (e.g., 602, 604), the respective flow management lights (e.g., 602, 604) can perform the respective actions. For instance, the flow management light 602 and the other flow management light(s) 604 can perform their respective actions in a coordinated manner to be responsive to the respective environmental conditions associated with the respective flow management lights (e.g., 602, 604). For example, the flow management component 606, the instrument component, and/or the processor component 618 of the flow management light 602 can respectively perform operations to facilitate performing the action (e.g., responsive action) determined for the flow management light 602. Similarly, the other flow management component(s), the other instrument component(s), and/or the other processor component(s) of the other flow management light(s) 604 can respectively perform operations to facilitate performing the action determined for the flow management light(s) 604.

It is to be appreciated and understood that the various aspects of systems (e.g., the system 600 or other system(s) disclosed herein), apparatuses or processes described or explained in this disclosure can constitute machine-executable component(s) embodied within machine(s) (e.g., computer(s)), e.g., embodied in one or more machine readable mediums (or media) associated with one or more machines. Such component(s), when executed by the one or more machines, e.g., one or more computers, one or more computing devices, one or more virtual machines, etc., can cause the one or more machines to perform the operations described herein.

It also is to be appreciated and understood that, in some implementations, a user (e.g., an operator) can employ a user interface (not shown) of an application on a device (e.g., 622) to enter information that can override data in the environment profile 614, the light profile 616, and/or actions determined by the flow management light 602.

In some implementations, the flow management light 602 can enhance (e.g. upgrade, augment, improve, increase, etc.) operation of a legacy (e.g., older) device. There are many legacy devices that can operate reliably for a long period of time. However, given their lengthy operational lifecycles, they may fall behind in operational capabilities as compared to newer devices. Many of these legacy devices can have lights installed in them. The flow management light 602 can be installed in a legacy device as a retrofit to enhance the capability of the legacy device. A legacy device can include any device that can have a light which can be replaced with the flow management light 602. Furthermore, a legacy device can include any device that does not have a light, but on which the flow management light 602 can be fitted. Non-limiting examples of legacy devices can include a refrigerator, a freezer, a dryer, a washing machine, a vehicle, a machine, a flashlight, a range hood, an oven, a microwave, or any other suitable legacy device.

In certain implementations, the flow management light 602 can employ a high speed data transfer mechanism (e.g. Li-Fi) to transfer content to another flow management light(s) 604 and/or a device(s) 622. For example, the flow management light 602 can transfer a movie to a television, laptop, electronic tablet, or cell phone using Li-Fi for playback on such device.

In some embodiments, one or more flow management lights (e.g., 602) can employ their processing capabilities to offload or enhance processing operations of another device(s) 622 communicating with the one or more flow management lights (e.g., 602).

In certain implementations, a set of flow management lights (e.g., 602, 604, . . . ) in a building can employ their processing, memory, and/or communication capabilities to act as a cloud platform for the building.

In some implementations, the flow management light 602 can take an analog input, convert the analog input to digital output, and/or employ artificial intelligence with a library of functions/templates to facilitate self-configuration and/or self-operation of the flow management light 602.

It is to be appreciated and understood that any criteria or thresholds disclosed herein can be pre-defined, operator specified, and/or dynamically determined, for example, based at least in part on learning algorithms.

Figure 7:
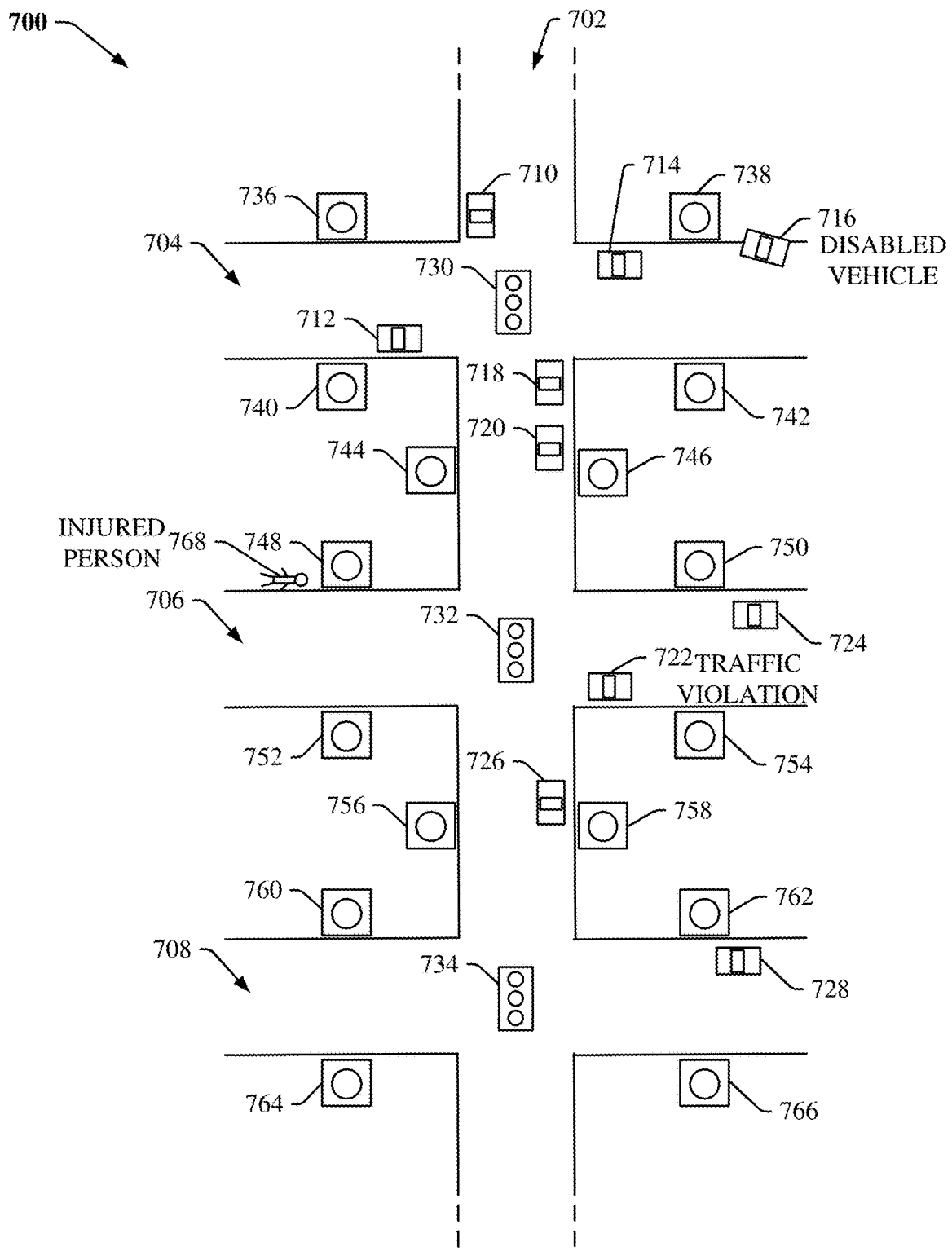
FIG. 7 presents a diagram of an example area in which flow management lights can operate, in accordance with various aspects and embodiments of the disclosed subject matter.

Referring to FIG. 7, FIG. 7 presents a diagram of an example area 700 in which flow management lights can operate, in accordance with various aspects and embodiments of the disclosed subject matter. The area 700 can be, for example, a neighborhood, or portion thereof, that can have streets, such as street 702, street 704, street 706, and street 708, wherein certain streets (e.g., 704, 706, and 708) can intersect with certain other streets (e.g., 702). At various times, one or more vehicles can be traveling on or in proximity to the respective streets (e.g., 702, 704, 706, or 708). As example, vehicles 710, 712, 714, 716, 718, 720, 722, 724, 726, and/or 728 can be traveling or located on, or in proximity to, the respective streets (e.g., 702, 704, 706, or 708) of the area 700. The respective vehicles can be, for example, cars, trucks, buses, law enforcement vehicles, emergency vehicles, or other types of vehicles.

For exemplary purposes only, the area 700 is depicted as a neighborhood. It is to be appreciated that flow management lights can be installed in any suitable environment, non-limiting examples of which can include indoor, outdoor, underwater, embedded in a material, house, building, office, hospital, factory, warehouse, school, mall, store, bus terminal, train terminal, airport, vehicle, barn, or any other suitable environment. All such embodiments are envisaged and are part of the disclosed subject matter.

In accordance with various embodiments, a plurality of flow management lights can be distributed, located, and/or installed at various locations in the area 700. In some embodiments, a flow management light can be fixed or installed in a particular location in the area 700. In other embodiments, a flow management light can be movable from one location to another location within the area 700 or outside the area 700, wherein such flow management light can be physically moved by a user (e.g., the user can carry the flow management light from one location to another location) or can be moved by a user remotely (e.g., using a communication device to instruct the flow management light to move from one location to another location). For instance, the flow management light can be, or can be installed on, a drone. In the example area 700, the plurality of flow management lights can comprise, for example, flow management lights 730, 732, and 734 can be, or can be installed on, traffic lights at respective intersections of streets 702 and 704, streets 702 and 706, and streets 702 and 708. As another example, the plurality of flow management lights also can comprise flow management lights, such as flow management lights 736, 738, 740, 742, 744, 746, 748, 750, 752, 754, 756, 758, 760, 762, 764, and/or 766, that can be distributed on respective streets (e.g., 702, 704, 706, and/or 708) throughout the area 700, as depicted in FIG. 7. In accordance with various implementations, all or some the flow management lights 736 through 766 can be street lights that can illuminate respective portions of the respective streets (e.g., 702, 704, 706, 708) in proximity to the respective flow management lights 736 through 766. While FIG. 7 depicts nineteen flow management lights for exemplary purposes, it is to be appreciated that any desired (e.g., suitable or acceptable) quantity of flow management lights can be installed in an area (e.g., environment).

The respective flow management lights 730 through 766 can be the same types of flow management lights or can be different types of flow management lights from each other. For instance, all or some of the flow management lights 730 through 766 can be the same as or similar to the flow management light 200 of FIG. 2, all or some of the flow management lights 730 through 766 can be the same as or similar to the flow management light 300 of FIG. 3, or all or some of the flow management lights 730 through 766 can be the same as or similar to another type of flow management light. The respective flow management lights 730 through 766 can comprise respective flow management components, respective light components, respective sensor components, respective instrument components, respective processor components, respective data stores, and/or other components that, respectively, can comprise the same or similar functionality, and/or can perform the same or similar functions, operations, or tasks, as respectively named components described herein. For reasons of brevity and clarity, the respective flow management components, light components, sensor components, instrument components, processor components, data stores, etc., are not shown in FIG. 7.

The respective flow management lights 730 through 766 can employ their respective sensor components to monitor and sense respective conditions (e.g., environment conditions) of the respective environments of the respective portions of the area 700 in proximity to the respective flow management lights 730 through 766. The respective flow management components of the respective flow management lights 730 through 766 can analyze the sensor information regarding the respective conditions of the respective environments, and can generate respective environment profiles of the respective environments based at least in part on the respective results of the respective analyses of the respective sensor information.

The respective flow management components of the respective flow management lights 730 through 766 also can analyze respective light-related information (e.g., specifications, parameters, characteristics, attributes, . . . ) relating to the respective flow management lights to determine respective features (e.g., characteristics, capabilities, . . . ) of the respective flow management lights, and/or can analyze the respective environment profiles in relation to the respective features of the respective flow management lights. Based at least in part on the respective results of the respective analyses of the respective light-related information and/or the respective environment profiles, the respective flow management components of the respective flow management lights 730 through 766 can determine respective light profiles of the respective flow management lights.

The respective flow management lights 730 through 766 can be respectively configured (e.g., self-configured) based at least in part on the respective light profiles associated with the respective flow management lights. For instance, the respective flow management components of the respective flow management lights 730 through 766 can configure the respective flow management lights based at least in part on the respective light profiles, in accordance with the defined light management criteria.

The respective flow management lights (e.g., the respective flow management components of the respective flow management lights 730 through 766) can continue to monitor conditions associated with the respective environments, update the respective environment profiles and the respective light profiles based at least in part on updates to or changes in the respective conditions of the respective environments, and/or update or modify respective configurations of the respective flow management lights in response to the respective updated light profile and/or changes in conditions. The respective flow management lights (e.g., the respective flow management components of the respective flow management lights 730 through 766) also can determine respective actions (e.g., responsive actions) that are to be taken (e.g., performed) by the respective flow management lights, in response to respective identified conditions associated with the respective environments. The respective flow management lights (e.g., the respective flow management components, respective light components, respective instrument components, and/or respective processor components of the respective flow management lights 730 through 766) can perform or facilitate performing the respective actions, in accordance with the defined light management criteria.

In some embodiments, all or some of the respective flow management lights 730 through 766 (e.g., respective flow management components, respective sensor components, etc., of the respective flow management lights) can monitor and detect various types of conditions of their respective portions of the area 700, and can monitor and/or determine respective contexts of the respective portions of the area 700 based at least in part on the various types of conditions of their respective portions of the area 700. For instance, such flow management lights (e.g., flow management components, sensor components, and/or other components of such flow management lights) can monitor and sense respective conditions regarding people and/or vehicle traffic in their respective portions of the area 700. The flow management components of such flow management lights can control operations of the respective flow management lights to enhance (e.g., improve or optimize) performance of the respective flow management lights, and/or manage or enhance flow and security of people and/or vehicle traffic in the respective portions of the area 700, based at least in part on the respective conditions of the respective portions of the area 700. A flow management component or sensor component of a flow management light (e.g., 736), for example, can use pattern recognition techniques or other techniques to monitor or determine a context associated with an area portion, wherein the flow management component or sensor component can, for instance, count the number of people or vehicles located or traveling in that area portion, detect respective speeds of people or vehicles traveling in the area portion, detect respective directions of travel of respective people or vehicles in that area portion, detect or determine weather conditions (e.g., current or predicted future weather conditions) for that area portion, detect or determine respective activities of respective people or vehicles located in that area portion, and/or other activities, objects, or entities in that area portion. The flow management component of the flow management light can determine the conditions and/or a context associated with the area portion associated with the flow management light, and can determine configuration and/or parameters of components (e.g., light component, instruments of the instrument component, . . . ), and/or actions to be performed by the components, to enhance performance of the components of the flow management light and/or enhance the flow and security of people and/or vehicle traffic in the area portion associated with the flow management light.

For instance, based at least in part on a determined context for an area portion associated with a flow management light, the flow management component of the flow management light can determine that the light output of the light component of the flow management light is to be adjusted and can adjust the light output of the light component. For example, if the determined context indicates poor visibility conditions in the area portion, the flow management component can adjust the light output (e.g., spectrum, wavelength, frequency, intensity, pattern, direction, etc.) of the light component to enhance the illumination of the area portion and enhance flow and security of people and/or vehicle traffic in the area portion. Additionally or alternatively, based at least in part on the determined context, the flow management component can determine that a desired responsive action can be to adjust the light output of the light component so that it is indicative of a hazardous condition and/or turn on a hazardous light or indicator on the flow management light that can indicate a hazardous condition to notify people walking or people using vehicles that the hazardous condition exists in that area portion.

In accordance with various embodiments, all or a desired portion of the respective flow management lights 730 through 766 can communicate with each other and coordinate their operations to enhance the operation of the respective flow management lights (e.g., 730 through 766) and/or enhance the flow and security of people and vehicle traffic in the respective portions of the area 700, as such communication and coordination between flow management lights is more fully described herein.

In some embodiments, in response to respective monitoring of the respective environments over time, the respective flow management lights (e.g., the respective flow management components of the respective flow management lights 730 through 766) can learn (e.g., determine) respective contexts (e.g., respective contexts relating to respective conditions) associated with the respective environments over time, and can update the respective light profiles based at least in part on the respective contexts. The respective flow management lights (e.g., the respective flow management components of the respective flow management lights 730 through 766) can control respective operations of the respective flow management lights and/or perform respective actions, based at least in part on the respective contexts associated with the respective environments, to enhance performance of operations of the flow management lights and/or enhance the flow and security of people and vehicle traffic in the respective portions of the area 700.

In certain embodiments, the flow management component of a flow management light (e.g., 736) can learn over time contexts of people, vehicle traffic, or other entities or activities at various times in the area portion associated with the flow management light, and can control operations of the flow management light and/or determine actions (e.g., responsive actions) to be performed by the flow management light, based at least in part on a particular context at a particular time or during occurrence of a particular event relating to the particular context, in accordance with the light management criteria. For instance, the flow management component of the flow management light (e.g., 736) can control operation of, modify (e.g., adjust) configuration of, employ the light component and/or one or more instruments of the instrument component, and/or instruct the light component, the one or more instruments, and/or another device(s) or system(s) to perform one or more actions, based at least in part on a particular context at a particular time or during occurrence of a particular event, to enhance operation of the flow management light and/or enhance the flow and security of people and vehicle traffic in the area portion associated with the flow management light.

As an example, the respective flow management components of flow management lights 730, 732, and 734 (e.g., flow management traffic lights), employing respective sensors of respective sensor components, can monitor, detect, and learn traffic conditions and pedestrian conditions over time for their respective area portions. The respective flow management components can analyze the respective sensor information from the respective sensors and can learn (e.g., determine) respective contexts for the respective area portions or an overall context for the respective area portions during a particular time period (e.g., during rush hour in the afternoon of a typical work day). Based at least in part on the learned respective contexts or the overall context for the respective area portions during that particular time period, at a future occurrence of that particular time period (e.g., during a future afternoon rush hour on another typical work day), the respective flow management component of the respective flow management lights 730, 732, and 734 can control respective operations of the light component (e.g., instruct the traffic lights of the light component to operate accordingly) and coordinate the performance of respective operations of the respective light components of the respective flow management lights 730, 732, and 734 to enhance (e.g., improve or optimize) respective operation of the respective light components of the respective flow management lights 730, 732, and 734 and/or enhance the flow of vehicle traffic and/or pedestrians (e.g., people walking) at that particular time period.

As another example, a flow management component of a flow management light (e.g., 736) can learn a context that indicates the illumination in the portion of the area 700 in proximity to the flow management light (e.g., 736) is undesirably low during night hours (e.g., because houses in the area do not have outdoor house lights turned on, because there are no houses or buildings in the area (so there are no outdoor house or building lights), or because of another reason) during certain periods of a month (e.g., periods of the month when the moon is at or near new moon phase or is otherwise providing lower levels of illumination to the portion of the area 700). Based at least in part on that learned context, in the future, when a certain period of the month that the moon is predicted (e.g., by the flow management component) to provide undesirably lower levels of illumination to the portion of the area 700 is about to occur, during the night hours, the flow management component of the flow management light (e.g., 736) can control operations of the flow management light (e.g., the light component of the flow management light) to increase illumination of the light component and/or turn on additional light elements, and/or adjust the location(s) or aim of emission of light by the light elements, and/or perform one or more other actions to facilitate providing desirable lighting conditions or warn of hazardous or potentially hazardous conditions in the portion of the area 700, to facilitate improved flow and security of people and/or vehicle traffic in that portion of the area 700, in accordance with the light management criteria.

In contrast, another flow management light (e.g., 764) may be in another portion of the area 700 where there are houses and/or buildings that have outdoor lights that are regularly illuminated during night hours and provide some illumination to such other portion of the area 700, in addition to the illumination provided by the flow management light (e.g., 764), wherein the illumination provided by all of those light sources can provide adequate lighting to that portion of the area 700, even during periods of the month when the moon is providing undesirably lower levels of illumination to that portion of the area 700. The flow management component of that flow management light (e.g., 764) can learn and identify that context regarding illumination at night in that portion of the area 700 (even during the periods of the month when the moon is providing undesirably lower levels of illumination) and can determine that no adjustment to normal operation of the light component is to be made (e.g., during the periods of the month when the moon is providing undesirably lower levels of illumination), based at least in part on that context associated with that portion of the area 700.

In some implementations, a flow management component of a flow management light (e.g., 738), employing a sensor component, can detect a disabled vehicle (e.g., 716) in a portion of the area 700 in proximity to the flow management light (e.g., 738), wherein the vehicle (e.g., 716) can be disabled, for example, due to a mechanical failure, an electronics failure, and/or a single or multiple vehicle accident. The flow management component can update the environment profile associated with that portion of the area 700, in response to and to indicate the detection of the disabled vehicle. The flow management component also can update the light profile based at least in part on the update to the environment profile with regard to the detection of the disabled vehicle. In response to detecting the disabled vehicle, and based at least in part on the updated light profile, the flow management component can employ one or more instruments (e.g., communication component, notification component, . . . ) of the instrument component of the flow management light (e.g., 738) to notify a communication device of a towing company of the disabled vehicle (e.g., 716) and its location and/or dispatch a tow truck to the location of the disabled vehicle.

In other implementations, a flow management component of a flow management light (e.g., 748), employing a sensor component, can detect an injured person (e.g., 768) in a portion of the area 700 in proximity to the flow management light (e.g., 748). The flow management component can update the environment profile associated with that portion of the area 700, in response to and to indicate the detection of the injured person. The flow management component also can update the light profile based at least in part on the update to the environment profile with regard to the detection of the injured person. In response to detecting the injured person, and based at least in part on the updated light profile, the flow management component of the flow management light (e.g., 748) can employ one or more instruments (e.g., communication component, notification component, . . . ) of the instrument component of the flow management light (e.g., 748) to notify a communication device of an emergency medical services (EMS) company of the injured person (e.g., 716), conditions (e.g., conscious or unconscious, bleeding or not bleeding, description of the features, . . . ) of the injured person, and/or the location of the injured person, and/or can dispatch an EMS vehicle to the location of the injured person.

In some embodiments, a flow management component of a flow management light (e.g., 732), employing a sensor component, can detect and determine a vehicle (e.g., 722) that has committed a traffic violation (e.g., went through a red light, speeding, hitting another vehicle and not stopping, . . . ) in a portion of the area 700 in proximity to the flow management light (e.g., 732). The sensor component also can detect, and the flow management component also can identify, other information relating to the traffic violation (e.g., license plate number of the vehicle, make and model of the vehicle, name and address of the vehicle owner, time of traffic violation, location of traffic violation, direction of travel of the vehicle, and/or type of traffic violation, . . . ). The flow management component can update the environment profile associated with that portion of the area 700, in response to and to indicate that the traffic violation has been committed and include the information relating thereto. The flow management component also can update the light profile based at least in part on the update to the environment profile with regard to the determination that the traffic violation has occurred.

In response to detecting and determining the traffic violation and/or other information relating thereto, and based at least in part on the updated light profile, the flow management component of the flow management light (e.g., 732) can employ one or more instruments (e.g., communication component, notification component, traffic citation component, . . . ) of the instrument component of the flow management light (e.g., 732) to generate and issue, or facilitate generating and issuing (e.g., to the owner of the vehicle), a traffic citation comprising information relating to the vehicle and/or the owner of the vehicle (e.g., license plate number, make and model of the vehicle, name and address of the vehicle owner, type of traffic violation, date, time, and location of traffic violation, . . . ), notifying law enforcement of the traffic violation and/or the information relating to the vehicle or its owner to facilitate issuance of the traffic violation to the vehicle owner, and/or dispatching or facilitating dispatching of law enforcement to the location where the traffic violation occurred or in the direction the vehicle was traveling.

In some implementation, a flow management light (e.g., 730) can detect and record (e.g., record video and/or audio of) defined incidents (e.g., significant incidents), such as, for example, a traffic accident, a shooting or homicide, a robbery, an assault, or other type of significant incident that occurs in a portion of the area 700 associated with (e.g., in proximity to) the flow management light. The flow management component of the flow management light (e.g., 730) can facilitate storing the video content, audio content, and/or related information (e.g., date and time of the incident, location of the incident, vehicle(s) involved in the incident, owner(s) of the vehicle(s) involved in the incident, . . . ), in a data store of the flow management light (e.g., 730).

The flow management component can update the environment profile associated with that portion of the area 700, in response to and to indicate the detection of the defined incident(s). The flow management component also can update the light profile based at least in part on the update to the environment profile with regard to the detection of the defined incident(s). Based at least in part on the updated light profile, and in response to the detection of the defined incident(s), the flow management component of the flow management light (e.g., 730) also can communicate the video content, audio content, and/or related information to a communication device of an appropriate entity (e.g., a communication device of a law enforcement entity, a prosecutor, security personnel associated with a business or community, a physician, EMS, a hospital, an insurance company, a victim, an owner(s) of the vehicle(s), . . . ).

Figure 8:
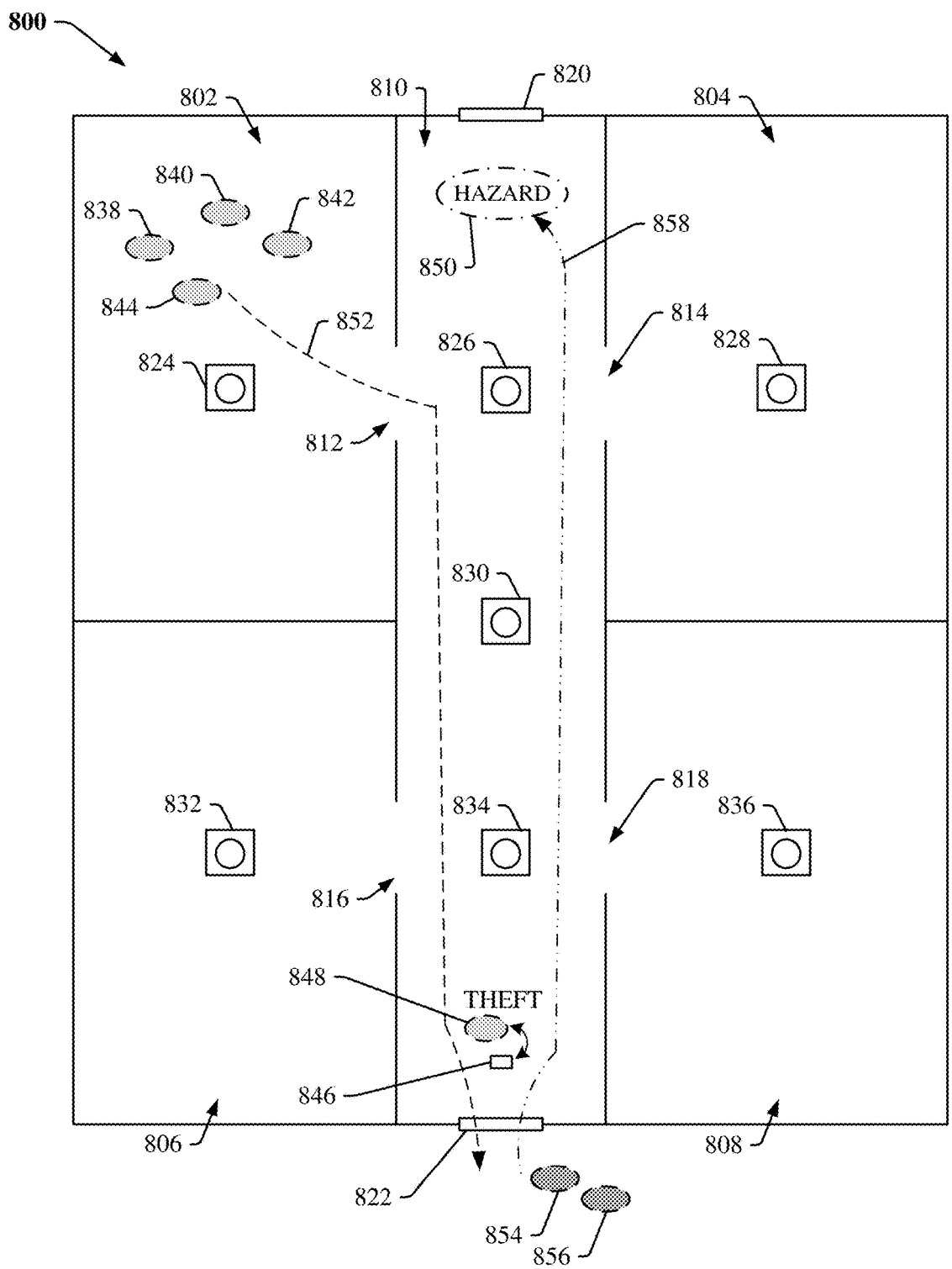
FIG. 8 illustrates a diagram of an example area of a building in which flow management lights can operate, in accordance with various aspects and embodiments of the disclosed subject matter.

Turning to FIG. 8, FIG. 8 illustrates a diagram of an example area 800 of a building in which flow management lights can operate, in accordance with various aspects and embodiments of the disclosed subject matter. The area 800 can be, for example, a building (e.g., building comprising a store(s) or restaurant(s)), warehouse, or factory where businesses operate, people occupy or live, and/or vehicles can operate. While the area 800 is depicted as a closed area, such as having walls that can enclose the area 800, it is to be appreciated and understood that the area 800 can be an open area or partially closed area where there can be sub-areas (e.g., open-air stores or restaurants, open-air business, open area with kiosks, . . . ).

The area 800 can comprise a number of sub-areas (e.g., rooms or demarcated sub-areas) that can have a desired size and/or shape. The sub-areas of the area 800 can comprise, for example, sub-areas 802, 804, 806, and 808, which can be respective rooms or demarcated areas, and sub-area 810, which can be a hallway or throughway associated with the sub-areas 802, 804, 806, and 808. The respective sub-areas 802, 804, 806, and 808 can have respective openings (e.g., doorways or throughways), such as openings 812, 814, 816, and 818 that can enable ingress to and egress from the respective sub-areas 802, 804, 806, and 808 from or to the sub-area 810. The sub-area 810 can be associated with doors, such as door 820 and door 822, wherein, in this example area 800, the doors 820 and 822 can be at opposite ends of the sub-area 810 and can enable ingress to or egress from the sub-area 810 from or to an area outside the area 800.

In accordance with various embodiments, a plurality of flow management lights can be distributed, located, and/or installed at various locations in the area 800. In some embodiments, a flow management light can be fixed or installed in a particular location in the area 800. In other embodiments, a flow management light can be movable from one location to another location within the area 800 or outside the area 800, wherein such flow management light can be physically moved by a user (e.g., the user can carry the flow management light from one location to another location) or can be moved by a user remotely (e.g., using a communication device to instruct the flow management light to move from one location to another location). For instance, the flow management light can be, or can be installed on, a drone. In the example area 800, the plurality of flow management lights can comprise, for example, flow management lights 824, 826, 828, 830, 832, 834, and/or 836, that can be distributed in the respective sub-areas (e.g., 802, 804, 806, 808, and/or 810) throughout the area 800, as depicted in FIG. 8. While FIG. 8 depicts seven flow management lights for exemplary purposes, it is to be appreciated that any desired (e.g., suitable or acceptable) quantity of flow management lights can be installed in an area (e.g., environment).

The respective flow management lights (e.g., 824, 826, 828, 830, 832, 834, and/or 836) can comprise the same or similar functionality, and/or can perform the same or similar functions, operations, or tasks, as the flow management lights described herein. All or some of the respective flow management lights (e.g., 824, 826, 828, 830, 832, 834, and/or 836) can be of the same type of flow management light (e.g., flow management light 200, flow management light 300, . . . ), or all or some of the respective flow management lights can be different types of flow management lights.

In some embodiments, the area 800 can be or comprise a warehouse or factory. The respective flow management lights (e.g., 824, 826, 828, 830, 832, 834, and/or 836), employing respective components (e.g., light component, flow management component, sensor component, instrument component, processor component, data store, . . . ), can monitor and detect respective conditions (e.g., activities of people or vehicles, events that occur) and respective contexts relating to people, vehicles, and/or events in the respective sub-areas (e.g., 820, 804, 806, 808, 810) of the area 800. The respective flow management components of the respective flow management lights can analyze respective data (e.g., respective sensor data from respective sensors) relating to the respective conditions and respective contexts relating to people, vehicles, and/or events. The respective flow management components of the respective flow management lights can determine or recognize the respective contexts relating to people, vehicles, and/or events with respect to the respective sub-areas, based at least in part on the respective results of the respective analyses, in accordance with the defined light management criteria. The respective flow management components of the respective flow management lights can generate or update the respective environment profiles associated with the respective sub-areas and/or respective light profiles associated with the respective flow management lights, based at least in part on the respective results of the respective analyses and/or the respective contexts, in accordance with the defined light management criteria.

The respective flow management components of the respective flow management lights (e.g., 824, 826, 828, 830, 832, 834, and/or 836) can determine respective actions (e.g., responsive actions) that can be performed by the respective flow management lights to enhance (e.g., improve or optimize) performance of operations by the flow management lights and/or enhance performance of tasks by people or vehicles operating in the respective sub-areas of the area 800. In some implementations, all or a desired portion of the respective flow management lights (e.g., 824, 826, 828, 830, 832, 834, and/or 836) can communicate with each other, determine and coordinate the respective actions to be performed by the respective flow management lights, and the performance of the respective actions by the flow management lights to enhance the performance of operations by the flow management lights and/or enhance performance of tasks by people or vehicles operating in the respective sub-areas of the area 800.

In certain embodiments, the area 800 can be or comprise a shopping area or store. The respective flow management lights (e.g., 824, 826, 828, 830, 832, 834, and/or 836), employing respective components (e.g., light component, flow management component, sensor component, instrument component, processor component, data store, . . . ), can monitor and detect respective conditions (e.g., activities of people or vehicles, events that occur) and/or respective contexts relating to people (e.g., shoppers, store employees, security personnel, law enforcement personnel, . . . ), vehicles (e.g., shopping carts, motorized vehicles, . . . ), products, storage areas (e.g., racks or shelves) for products, cash registers, and/or events (e.g., product sales or discount events, weather-related events or conditions, holidays, . . . ) in the respective sub-areas (e.g., 820, 804, 806, 808, 810) of the area 800. The respective flow management components of the respective flow management lights can analyze respective data (e.g., respective sensor data from respective sensors) relating to the respective conditions and/or respective contexts relating to people, vehicles, products, storage areas, cash registers, and/or events in the respective sub-areas. The respective flow management components of the respective flow management lights can determine or recognize the respective contexts relating to people, vehicles, products, storage areas, cash registers, and/or events with respect to the respective sub-areas, based at least in part on the respective results of the respective analyses, in accordance with the defined light management criteria.

The respective flow management components of the respective flow management lights can generate or update the respective environment profiles associated with the respective sub-areas and/or respective light profiles associated with the respective flow management lights, based at least in part on the respective results of the respective analyses and/or the respective contexts, in accordance with the defined light management criteria. The respective flow management components also can respectively analyze respective environment profiles (e.g., updated based on the sensed conditions and/or contexts) associated with the respective environments of the sub-areas and respective light profiles (e.g., updated based on the sensed conditions and/or contexts) of the respective flow management lights to facilitate determining respective configurations to be implemented for the respective flow management lights and/or respective actions to be taken (e.g., performed) by the respective flow management lights, in accordance with the defined light management criteria.

The respective flow management components of the respective flow management lights (e.g., 824, 826, 828, 830, 832, 834, and/or 836) can determine respective actions (e.g., responsive actions) that can be performed by the respective flow management lights to enhance (e.g., improve or optimize) performance of operations by the flow management lights and/or enhance performance of tasks by people (e.g., store employees), vehicles, cash registers, etc., operating in the respective sub-areas of the area 800, based at least in part on the results of analyzing the respective (updated) light management profiles associated with the respective flow management lights and/or the respective (updated) environment profiles associated with the respective sub-areas, in accordance with the defined light management criteria. In some implementations, all or a desired portion of the respective flow management lights (e.g., 824, 826, 828, 830, 832, 834, and/or 836) can communicate with each other, determine and coordinate the respective actions to be performed by the respective flow management lights, and the performance of the respective actions by the flow management lights to enhance the performance of operations by the flow management lights and/or enhance performance of tasks by people, vehicles, cash registers, etc., operating in the respective sub-areas of the area 800.

For instance, based at least in part on the respective results of the respective analyses of respective data (e.g., sensor data) relating to the conditions or context associated with the respective sub-areas (e.g., 802, 804, 806, 808, 810) and the respective light profiles of the respective flow management lights, the respective flow management components of the respective flow management lights (e.g., 824, 826, 828, 830, 832, 834, and/or 836) can control respective performance of operations of the respective flow management lights that can improve the likelihood of people (e.g., customers) making purchases of products. For example, based at least in part on the respective results of the respective analyses of the respective data, the respective flow management components of the respective flow management lights (e.g., 824, 826, 828, 830, 832, 834, and/or 836) can coordinate with each other, and one or more of the respective flow management components can determine a context where, at a particular time of day, there typically is a relatively higher traffic flow of people, as represented by example customers 838, 840, 842, and 844, in sub-area 802 and can determine that initiating one or more sales (e.g., discounts) on products in that sub-area 802 during that particular time of day can enhance product sales, revenues, and/or profits. In response to such determinations, at a future time, during that particular time of day (e.g., on a future date) the flow management component of the flow management light (e.g., 824) can control operations of the flow management light to initiate and present (e.g., via video content on a display screen, visual indicator, or audio content via an audio interface) information regarding the sale (e.g., discount price) of a product(s) in the sub-area 802 to facilitate enhancing product sales, revenues, and/or profits of the store. Additionally or alternatively, one or more of the other flow management components of the other flow management lights (e.g., 826, 828, 830, 832, 834, and/or 836) can control respective operations of the respective flow management lights to initiate and present (e.g., via video content on a display screen, visual indicator, or audio content via an audio interface) information regarding the sale (e.g., discount price) of the product(s) in the sub-area 802 to notify customers in the other sub-areas (e.g., 804, 806, 808, 810) of the sale of the product(s) in the sub-area 802 and/or directing customers to the sub-area 802 to facilitate enhancing product sales, revenues, and/or profits of the store.

As another example, a flow management light (e.g., 828), employing one or more sensors of a sensor component (e.g., a video camera, an RFID reader, . . . ), can detect a theft of a product 846 by a person 848 (e.g., shoplifter or thief) in or near a shopping area (e.g., in sub-area 810 as the shoplifter or thief attempts to leave the store). In response to detecting the theft, the flow management component of the flow management light (e.g., 828) in the sub-area 810, and/or one or more other flow management components of one or more other flow management lights, can control operations of the components (e.g., light component, audio component (e.g., amplifier, speaker), and/or notification component, . . . ) of the flow management light(s) to provide an indication or notification (e.g., a visual and/or audio indication or alert) that a theft has occurred and/or highlight the person 848 (e.g., direct a particular light on the person 848) who committed the theft of the product, based at least in part on the respective environment profiles (updated based on the detected conditions) and respective light profiles (updated based on the detected conditions) associated with the flow management lights, in accordance with the defined light management criteria. Additionally or alternatively, the flow management component(s) of the flow management light(s) (e.g., 828) can perform an action to tag the person 848, and respective video cameras of the respective flow management lights can track (e.g., automatically track) the person 848 based at least in part on the tag to facilitate tracking and locating of the person 848 by security personnel and/or law enforcement, and/or facilitate identifying the person 848 and/or product stolen.

In some embodiments, in response to an emergency condition detected in or near the area 800, the flow management lights (e.g., 826, 828, 830, 832, 834, and/or 836) can communicate with each other and coordinate their performance of operations and actions to enhance operations of the flow management lights and enhance the safety of people in or near the area 800, in accordance with the defined light management criteria. For example, in response to a flow management light(s) (e.g., 826), employing one or more sensors of a sensor component(s), detecting an emergency condition (e.g., hazard 850, such as a fire) and/or other conditions (e.g., smoke, noxious fumes, . . . ) in the sub-area 810 or one or other sub-areas of the area 800, the flow management components of the flow management lights can coordinate with each other to analyze respective information (e.g., sensor data) regarding the respective conditions (e.g., emergency condition, sub-areas where conditions are relatively safe, . . . ) of the sub-areas (e.g., 802, 804, 806, 808, 810) and the respective (updated) light profiles (and respective (updated) environment profiles) associated with the respective flow management lights, wherein the light profiles and environment profiles were updated based at least in part on the detected conditions in the respective sub-areas.

Based at least in part on the respective results of the respective analyses, the respective flow management components of the respective flow management lights can coordinate with each other to determine a path(s) that can enable people in or near the area 800 to travel to avoid or at least substantially avoid the hazard 850 and safely exit the area 800 or at least enhance the probability that the people can safely exit the area 800, based at least in part on the respective updated environment profiles of the respective sub-areas and the respective updated light profiles of the respective flow management lights, in accordance with the defined light management criteria. For example, in response to detecting the hazard 850 in sub-area 810 relatively close to the door 820 and sub-areas 802 and 804, and detecting that people (e.g., 838, 840, 842, and 844) are located in sub-area 802, one or more of the respective flow management components of the respective flow management lights can determine a path 852 that the people (e.g., 838, 840, 842, and 844) in sub-area 802 can travel to safely or relatively safely exit the sub-area 802 and the overall area 800 to avoid or at least substantially avoid the hazard 850. The respective flow management lights (e.g., 824, 826, 828, 830, 833, 834, and 836) can be controlled and can coordinate with each other (e.g., via their respective flow management components) to facilitate directing the people (e.g., 838, 840, 842, and 844) in sub-area 802 from sub-area 802 through relatively safer portions of sub-area 810 and out the door 822 to exit the area 800. For instance, the flow management light 824 can present visual or audio information (e.g., via display screen, audio speaker, visual indicator) to the people (e.g., 838, 840, 842, and 844) in sub-area 802 to at least direct them to exit via opening 812 into the sub-area 810 and proceed to the right away from the hazard 850, and/or to present a map of the path the people are to take to exit the area 800 and avoid or substantially avoid the hazard 850. Additionally or alternatively, the flow management component of the flow management light 824 also can adjust the light component (e.g., increase the illumination level of the light component or adjust the type of lighting of the light component) to enhance visibility for the people, for example, in response to detected conditions (e.g., smoke from the hazard 850) negatively affecting visibility in or near that sub-area(s) (e.g., 802, 810). Additionally or alternatively, the flow management component of the flow management light 824 also can control an instrument(s) (e.g., air blower, filter, and/or conditioner device) of the instrument component to mitigate negative conditions (e.g., mitigate smoke) in or near the sub-area 802.

The flow management light 826 in sub-area 810 also can present visual or audio information (e.g., via display screen, audio speaker, visual indicator (e.g., a green light directional arrow indicator to indicate a direction of a relatively safe travel path)) to the people (e.g., 838, 840, 842, and 844) in sub-area 802 to at least direct those people to proceed to the right after they exit the sub-area 802 via opening 812 into the sub-area 810 and proceed away from the hazard 850, and/or to present a map of the path the people are to take to exit the area 800 and avoid or substantially avoid the hazard 850. Additionally or alternatively, the flow management component of the flow management light 826 also can adjust its light component (e.g., increase the illumination level of the light component or adjust the type of lighting of the light component) to enhance visibility for the people, for example, in response to detected conditions (e.g., smoke from the hazard 850) negatively affecting visibility in or near that sub-area(s) (e.g., 810). Additionally or alternatively, the flow management component of the flow management light 826 also can control one or more instruments (e.g., fire extinguisher device; air blower, filter, and/or conditioner device; . . . ) of the instrument component to mitigate negative conditions (e.g., extinguish fire, reduce heat, remove or mitigate smoke, . . . ) in or near the sub-area 810.

Accordingly, the respective flow management components of the respective other flow management lights (e.g., 830, 834) of sub-area 810 can control operations of the respective flow management lights (e.g., 830, 834) present visual or audio information (e.g., via display screen, audio speaker, visual indicator (e.g., a green light directional arrow indicator to indicate a direction of a relatively safe travel path)) to the people (e.g., 838, 840, 842, and 844) in sub-area 810 to direct those people to proceed through the sub-area 810 towards the door 822 and away from the hazard 850, and/or to present a map of the path the people are to take to exit the area 800 and avoid or substantially avoid the hazard 850. Additionally or alternatively, the respective flow management components of the respective flow management lights (e.g., 830, 834) can control operations of their respective light components (e.g., increase the illumination level of the light component or adjust the type of lighting of the light component) to enhance visibility for the people, for example, in response to detected conditions (e.g., smoke from the hazard 850) negatively affecting visibility in or near that sub-area(s) (e.g., 810). Additionally or alternatively, the flow management component(s) of the flow management light(s) (e.g., 830 and/or 834) also can control one or more instruments (e.g., fire extinguisher device; air blower, filter, and/or conditioner device; . . . ) of the instrument component(s) to mitigate negative conditions (e.g., extinguish fire, reduce heat, remove or mitigate smoke, . . . ) in or near the sub-area 810.

In some implementations, other flow management components of other flow management lights (e.g., 828, 832, and/or 836) can control respective operations of the other flow management lights (e.g., 828, 832, and/or 836) to provide (e.g., present) information (e.g., visual or audio information) to the people (e.g., 838, 840, 842, and 844) to facilitate enabling the people to maintain travel on the determined path 852 to safely exit the area 800 and/or to mitigate negative conditions (e.g., smoke, fire, excessive temperature, . . . ) in or near their respective sub-areas (e.g., 804, 806, 808). For example, the other flow management components can control respective operations of the other flow management lights (e.g., 828, 832, and/or 836) to present visual and/or audio information (e.g., via display screen, audio speaker, visual indicator (e.g., a red or yellow light indicator to indicate proceeding in the direction of the red or yellow light indicator is a wrong direction to take and is off of the determined travel path 852 to safety)) to the people (e.g., 838, 840, 842, and 844). Additionally or alternatively, the other flow management component(s) of the other flow management light(s) (e.g., 828, 832, and/or 836) can control one or more instruments (e.g., fire extinguisher device; air blower, filter, and/or conditioner device; . . . ) of the instrument component(s) to mitigate negative conditions (e.g., extinguish fire, reduce heat, remove or mitigate smoke, . . . ) in their respective sub-areas relating to the hazard 850 or near the sub-area 810 where the hazard 850 exists.

Additionally or alternatively, a flow management light(s) (e.g., 826) can generate a map of the area 800 detailing the path 852 (e.g., relatively safe path) to exit the area 800 and detailing the location(s) of one or more hazards in the area 800 (e.g., hazard 850 in sub-area 810, smoke in sub-area 804, . . . ). The flow management light(s) (e.g., 826) can communicate the map of the area 800 to the communication device(s) of one or more people (e.g., 838, 840, 842, and/or 844, . . . ) in the sub-area 802 via the communication network. Those people can use their communication devices to view the map and their location relative to the path 852 and relative to the location(s) of one or more hazards (e.g., hazard condition 850) in the area 800 to facilitate enabling the people to follow the path 852 and exit the area 800 while avoiding, or at least substantially being able to avoid, any hazards along the way.

In other implementations, additionally or alternatively, the respective flow management lights (e.g., 824, 826, 828, 830, 833, 834, and 836) can be controlled and can coordinate with each other (e.g., via their respective flow management components) to facilitate directing (e.g., safely directing) emergency responders (e.g., 854, 856) through the area 800 to the hazard 850, for example, via the path 858 (as depicted), and/or to a victim(s) in the area 800, based at least in part on the respective results of the respective analyses of the respective information (e.g., sensor data) regarding the respective conditions (e.g., emergency or hazard condition, sub-areas where conditions are relatively safe, . . . ) of the sub-areas (e.g., 802, 804, 806, 808, 810), the respective updated light profiles of the respective flow management lights, and the respective updated environment profiles of the respective sub-areas. For instance, the respective flow management lights (e.g., 824, 826, 828, 830, 833, 834, and/or 836) can present visual and/or audio information (e.g., map information, audio information, visual indicators, . . . ) to facilitate enabling the emergency responders (e.g., 854, 856) to identify and travel along the path 858 (e.g., relatively safe path) to the hazard condition 850 and/or travel along another path to one or more people (e.g., victims) in the area 800. The visual indicators can comprise, for example, green arrow direction indicators to indicate a proper direction of travel along the travel path 858 to the hazard 850 and/or another path to a victim(s) in the area 800, and/or another indicator(s) (e.g., red indicator, yellow indicator, . . . ) that can indicate a wrong direction to take in order to travel to the hazard 850 and/or a victim(s) in the area 800. A flow management light also can present a defined indicator to indicate when the hazard 850 is in proximity to the flow management light to enable an emergency responder (or another person) to know that the emergency responder (or the other person) is in proximity to the hazard 850.

Additionally or alternatively, a flow management light(s) (e.g., 826) can generate a map of the area 800 detailing the path 858 (e.g., relatively safe path) to the hazard condition 850 and/or another path to (and location(s) of) one or more people (e.g., victims) in the area 800, and detailing the location(s) of one or more hazards in the area 800 (e.g., hazard 850 in sub-area 810, smoke in sub-area 804, . . . ). The flow management light(s) (e.g., 826) can communicate the map of the area 800 to the communication device(s) of one or more emergency responders (or an entity associated therewith) via the communication network. The emergency responders (e.g., 854, 856) can use their communication devices to view the map and their location relative to the path 858 to the hazard condition 850, other path to the victim, and/or locations of hazards in the area 800.

In certain implementations, the respective flow management components of the respective flow management lights (e.g., 824, 826, 828, 830, 833, 834, and 836) can allow certain users (e.g., emergency responders, law enforcement, . . . ) to at least partially control operations of the respective flow management lights to control illumination parameters of respective light components, control instruments of the respective instrument components, control the sensors of the respective sensors components, of the respective flow management lights to enhance flow and/or security of people and/or vehicle traffic associated with the area 800, in accordance with the light management criteria. Such certain users can employ the light component and/or instruments (e.g., fire extinguisher device; air blower, filter, and/or conditioner device; . . . ) of the flow management lights to facilitate mitigating or eliminating the one or more hazards (e.g., hazard 850 in sub-area 810, smoke in sub-area 804, . . . ) in the area 800 and/or safely getting people out of the area 800.

Figure 9:
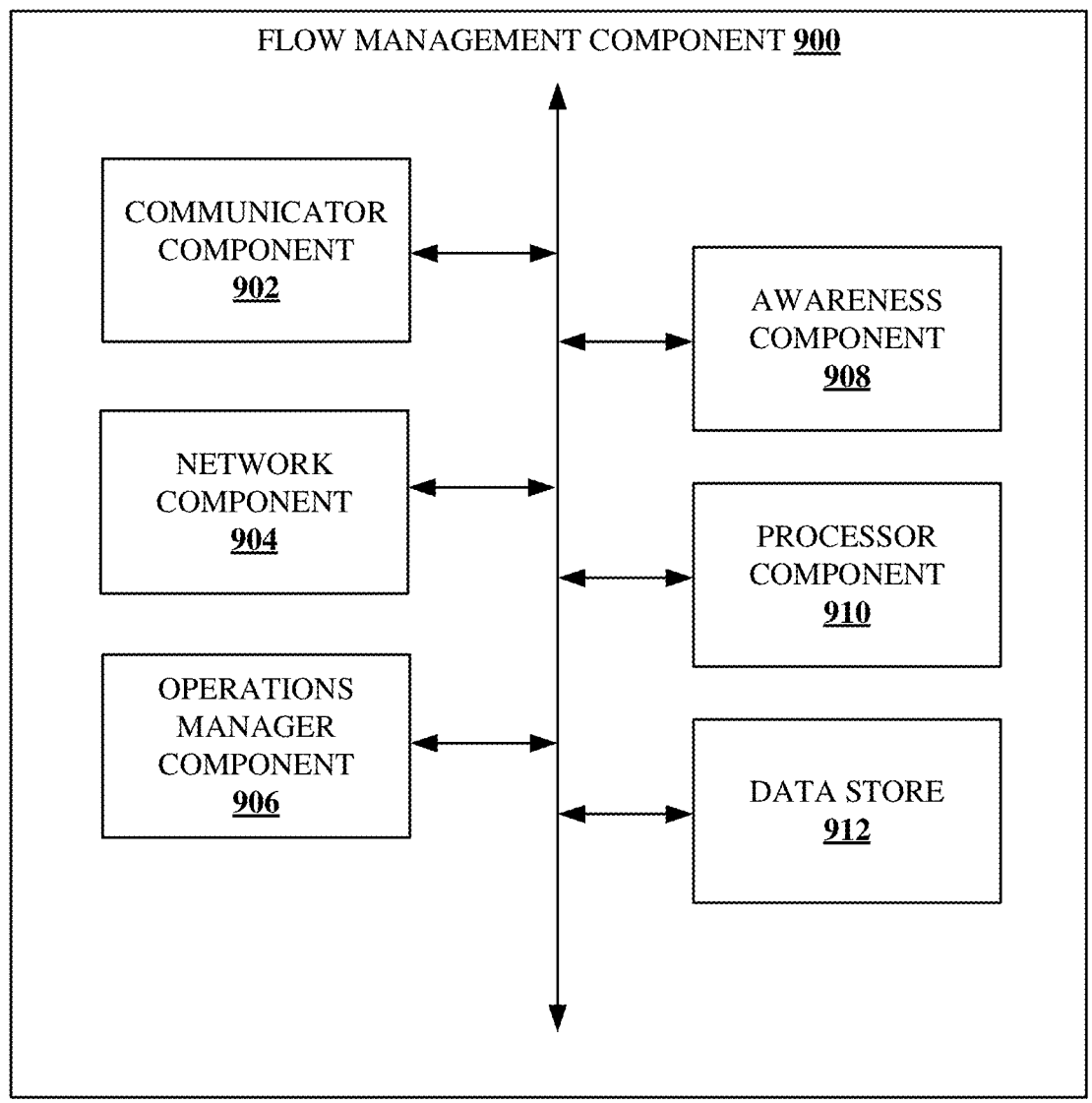
FIG. 9 depicts a block diagram of an example, non-limiting flow management component, in accordance with various aspects and embodiments described herein.

FIG. 9 depicts a block diagram of an example, non-limiting flow management component 900, in accordance with various aspects and embodiments described herein. In some implementations, the flow management component 900 can be part of a flow management light.

The flow management component 900 can comprise a communicator component 902 that can communicate data between the flow management light and one or more other devices, such as, for example, one or more other flow management lights, and devices associated with one or more entities (e.g., a user(s), law enforcement, a fire department, an emergency response entity, . . . ). The communicator component 902 can communicate information using wireline or wireless communication technologies and protocols, as more fully described herein. The communicator component 902 also can facilitate presenting desired visual information and/or audio information to one or more users in proximity to the flow management light.

The flow management component 900 also can include a network component 904 that can employ one or more communication network technologies and/or protocols to facilitate establishing a communication connection between the flow management light and one or more other devices, such as, for example, one or more other flow management lights, and devices associated with one or more entities. The communication connection can be a wireline communication connection and/or a wireless communication connection using wireline or wireless communication technologies and protocols, as more fully described herein.

The flow management component 900 further can comprise an operations manager component 906 that can control (e.g., manage) operations associated with the flow management component 900. For example, the operations manager component 906 can facilitate generating instructions to have components of the flow management component 900 perform operations, and can communicate respective instructions to respective components (e.g., communicator component 902, network component 904, awareness component 908, . . . ) of the flow management component 900 to facilitate performance of operations by the respective components of the flow management component 900 based at least in part on the instructions, in accordance with the defined light management criteria and the defined light management algorithm(s). The operations manager component 906 also can facilitate controlling data flow between the respective components of the flow management component 900 and controlling data flow between the flow management component 900 and another component(s) or device(s) (e.g., another flow management light associated with the flow management light; a device, such as a communication device; a base station or other component or device of the communication network) associated with (e.g., connected to) the flow management component 900.

The flow management component 800 also can include an awareness component 908 that can enable the flow management light to learn and understand the environment in which the flow management light is installed or located, determine one or more objectives of the installation or location of the flow management light, determine capabilities and/or features of the flow management light, perform a self-configuration of the flow management light in accordance with the one or more determined objectives and the determined capabilities and/or features of the flow management light, and perform operations to achieve the one or more determined objectives.

The flow management component 900 can comprise a processor component 910 that can work in conjunction with the other components (e.g., communicator component 902, network component 904, operation manager component 906, awareness component 908, data store 912) to facilitate performing the various functions of the flow management component 900. The processor component 910 can employ one or more processors, microprocessors, or controllers that can process data, such as information relating to operation of the flow management light or associated flow management lights, parameters, responsive actions (e.g., responsive to environmental conditions of the environment), policies, defined light management criteria, defined environment criteria, algorithms (e.g., defined light management algorithm(s)), protocols, interfaces, tools, and/or other information, to facilitate operation of the flow management component 900, as more fully disclosed herein, and control data flow between the flow management component 900 and other components (e.g., flow management lights, communication devices, base station or other devices of the communication network, data sources, applications, . . . ) associated with the flow management component 900.

The data store 912 that can store data structures (e.g., user data, metadata), code structure(s) (e.g., modules, objects, hashes, classes, procedures) or instructions, information relating to operation of the flow management light or associated flow management lights, parameters, responsive actions (e.g., responsive to environmental conditions of the environment), policies, defined light management criteria, defined environment criteria, algorithms (e.g., defined light management algorithm(s)), protocols, interfaces, tools, and/or other information, to facilitate controlling operations associated with the flow management component 900. In an aspect, the processor component 910 can be functionally coupled (e.g., through a memory bus) to the data store 912 in order to store and retrieve information desired to operate and/or confer functionality, at least in part, to the communicator component 902, network component 904, operations manager component 906, awareness component 908, and data store 912, etc., and/or substantially any other operational aspects of the flow management component 900.

Figure 10:
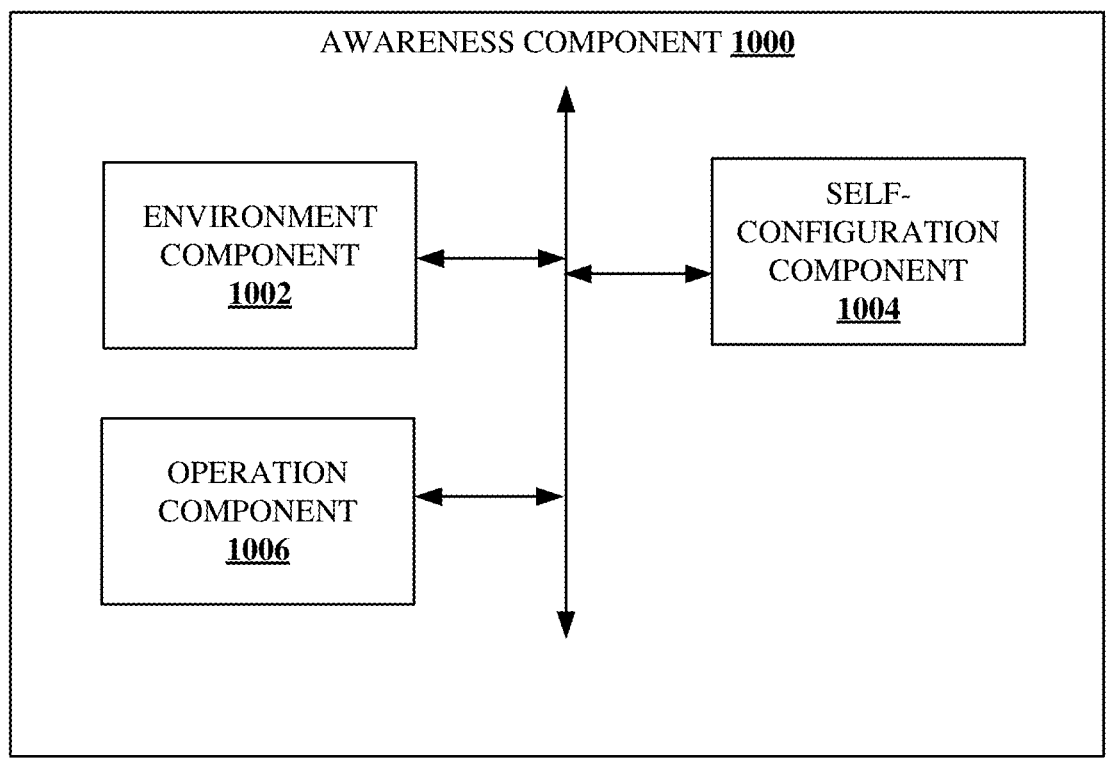
FIG. 10 illustrates a block diagram of an example, non-limiting awareness component, in accordance with various aspects and embodiments of the disclosed subject matter.

FIG. 10 illustrates a block diagram of an example, non-limiting awareness component 1000, in accordance with various aspects and embodiments of the disclosed subject matter. The awareness component 1000 can facilitate enabling a flow management light to determine (e.g., ascertain, infer, calculate, predict, prognose, estimate, derive, forecast, detect, and/or compute) characteristics of the environment in which the flow management light is installed or located, determine characteristics, capabilities, and/or features of the flow management light, determine one or more objectives of the installation or location of the flow management light, perform a self-configuration of flow management light in accordance with the determined characteristics, capabilities, conditions, and/or features of the flow management light and the one or more determined objectives, and determine and execute one or more desired actions for the flow management light to achieve the one or more determined objectives, in accordance with one or more embodiments described herein. Repetitive description of like elements employed in other embodiments described herein is omitted for sake of brevity.

The awareness component 1000 can comprise an environment component 1002 that can determine characteristics, conditions, or features of an environment in which the flow management light is installed or located. The environment component 1002 can employ one or more sensors (of a sensor component) or instruments (of an instrument component) to obtain information about the environment in which the flow management light is installed or located. The environment component 1002 can determine characteristics or conditions of the environment, and can generate an environment profile of the environment, based at least in part on the results of analyzing the information regarding the environment. In accordance with various non-limiting embodiments, the characteristics or conditions can include objects, devices, people, flora, fauna, predators, pests, colors, scents, hazards, biohazards, chemicals, dimensional characteristics, health status, locations, topography, landscape, seascape, boundaries, atmosphere, manmade features, furniture, toys, equipment, machines, vehicles, buildings, grounds, roads, railroad tracks, water feature, rocks, trees, debris, geographic features, unsafe conditions, weather conditions, property line boundary, ground conditions, water conditions, atmospheric conditions, water currents, air currents, water salinity, air temperature, water temperature, ground temperature, ground traction, network topology, or any other suitable conditions or characteristics of the environment that can be determined from information obtained by the sensors or instruments.

It is to be appreciated and understood that the environment component 1002 can employ intelligent recognition techniques (e.g., spatial relationship recognition, pattern recognition, object recognition, facial recognition, animal recognition, pose recognition, action recognition, shape recognition, scene recognition, behavior recognition, sound recognition, scent recognition, voice recognition, audio recognition, image recognition, motion recognition, hue recognition, feature recognition, edge recognition, texture recognition, timing recognition, location recognition, and/or any other suitable recognition technique) to determine the conditions, characteristics, or features of the environment based at least in part on the information obtained by one or more sensors or instruments.

The awareness component 1000 also can include a self-configuration component 1004 that can determine characteristics, capabilities, conditions, and/or features of the flow management light. The self-configuration component 1004 can generate or update a light profile of the flow management light based at least in part on the environment profile of the environment associated with the flow management light and the characteristics, capabilities, conditions, and/or features of the flow management light, in accordance with the defined light management criteria. The self-configuration component 1004 also can determine one or more objectives of the installation or location of the flow management light, and perform a self-configuration of the flow management light, in accordance with the one or more determined objectives and the light profile of the flow management light.

The awareness component 1000 also can comprise an operation component 1006 that can determine and execute one or more desired (e.g., suitable, acceptable, enhanced, or optimal) actions for the flow management light to perform to achieve the one or more determined objectives (e.g., to be responsive to the conditions or characteristics of the environment). For example, the operation component 1006 can employ intelligence (e.g., artificial intelligence) to monitor the environment for conditions relating to the characteristics according to the one or more determined objectives using one or more sensors or instruments, determine one or more desired (e.g., suitable, acceptable, enhanced, or optimal) actions for the flow management light (e.g., one or more instruments of the flow management light) to perform to achieve the one or more determined objectives based at least in part on the conditions relating to the characteristics and the determined capabilities, conditions, or features of the flow management light, and execute the one or more desired actions. In an example, the operation component 1006 can select actions from a library of actions stored in a data store or in one or more knowledges sources. In another example, the operation component 1206 can create actions to be performed by the flow management light based at least in part on artificial intelligence.

Figure 11:
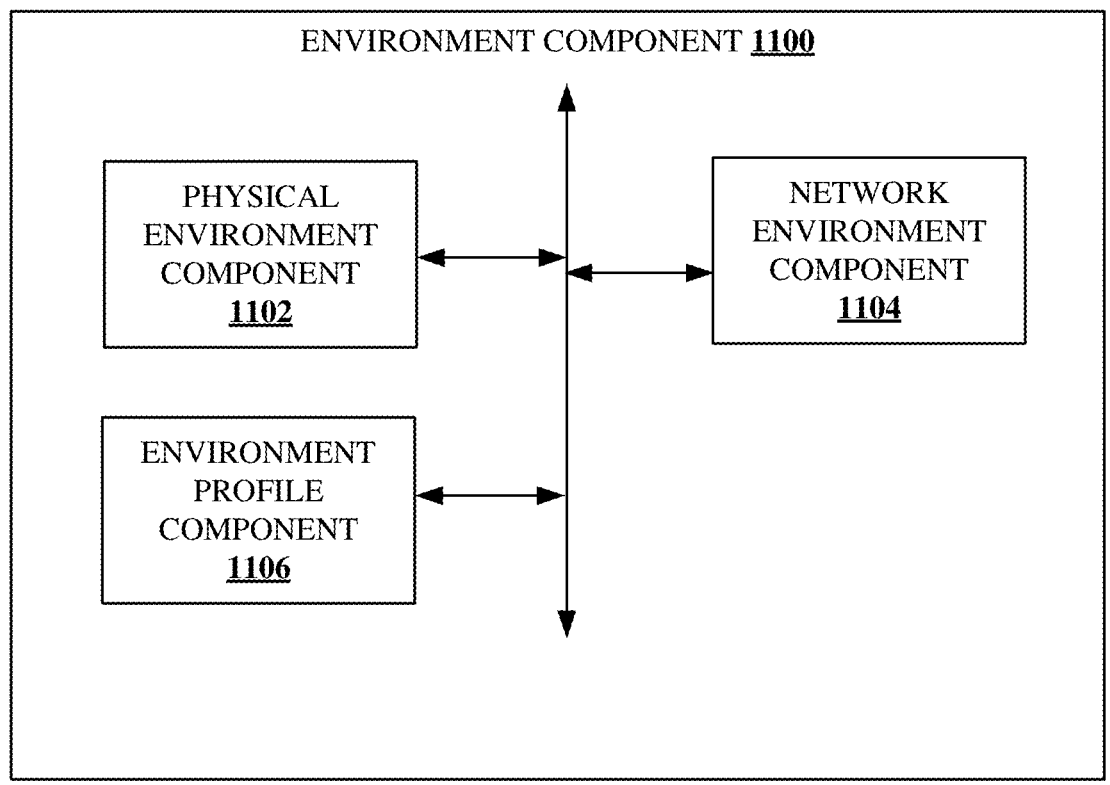
FIG. 11 depicts a block diagram of an example, non-limiting environment component, in accordance with one or more aspects and embodiments described herein.

FIG. 11 depicts a block diagram of an example, non-limiting environment component 1100, in accordance with one or more aspects and embodiments described herein. The environment component 1100 can comprise a physical environment component 1102 that can employ one or more sensors of a sensor component, as described herein, to obtain physical information about the physical environment in which the flow management light is installed or located. In an example, the physical environment component 1102 can employ a camera to obtain visual information about the environment. In another example, the physical environment component 1102 can employ a microphone to obtain audio information about the environment. In a further example, the physical environment component 1102 can employ a GPS device to obtain its location in the environment. In still another example, the physical environment component 1102 can employ an LIDAR sensor to obtain mapping information about the environment. In yet another example, the physical environment component 1102 can employ a GPS device and LIDAR sensor to map the locations of characteristics, conditions, or features recognized by the physical environment component 1102 in the environment. It is to be appreciated and understood that the physical environment component 1102 can employ any suitable sensor or instrument to obtain corresponding information produced by the sensor or instrument about the physical environment.

The environment component 1100 can comprise a network environment component 1104 that can employ one or more sensors or instruments as described herein to obtain information about the network environment in which the flow management light is installed or located. In an example, the network environment component 1104 can employ a communication device to discover communication networks operating in the environment. The network environment component 1104 can connect to one or more of the networks using suitable security and authentication schemes and obtain device information about devices and/or other flow management lights operating on the one or more networks. In a non-limiting example, device information regarding a device can comprise device type, device model number, device location, device functionality, device configuration, device security, communication protocols supported, or any other suitable attribute of a device. It is to be appreciated and understood that the network environment component 1104 can employ suitable security techniques to prevent unauthorized access to the flow management light while obtaining device information regarding other devices on the one or more networks. The flow management light can determine what security and/or communication protocols it should employ and self-configure for operation using the appropriate security and/or communication protocols.

The environment component 1100 also can include an environment profile component 1106 that can create an environment profile that can describe the characteristics, conditions, and/or features of the environment in which the flow management light is installed or located based at least in part on the physical information and the device information obtained by the one or more sensors or instruments. For example, the environment profile component 1106 can employ intelligent recognition techniques to recognize characteristics, conditions, and/or features of the environment based at least in part on the physical information and the device information. In an additional example, the environment profile component 1106 can associate device information obtained from the devices with corresponding physical information associated with the devices obtained from sensors. The environment profile component 1106 also can employ knowledge resources (e.g., Internet, libraries, encyclopedias, databases, devices, or any other suitable knowledge resources) to obtain detailed information describing the characteristics, conditions, and/or features of the environment. For example, the environment profile component 1106 can obtain detailed product information related to recognized characteristics, conditions, or features of the environment. In another example, the environment profile component 1106 can obtain risk information related to recognized characteristics, conditions, or features of the environment. In a further example, the environment profile component 1106 can obtain information describing interaction between various recognized characteristics, conditions, or features of the environment. The environment profile component 1106 can obtain any suitable information associated with recognized characteristics, conditions, or features of the environment from any suitable knowledge resource.

Furthermore, the environment profile component 1106 can generate a confidence metric indicative of a confidence of a determination of a characteristic, condition, or feature that has been made by the environment profile component 1106 based at least in part on any suitable function. For example, the environment profile component 1106 can employ the multiple sources of information (e.g., physical information, device information, and information from knowledge sources) and perform a cross-check validation across the various sources to generate a confidence metric indicative of a confidence of an accuracy of a determination of a characteristic, condition, or feature.

The environment profile component 1106 can employ the characteristics, conditions, features, and/or any associated obtained information to generate the environment profile that describes the characteristics, conditions, or features of the environment. The environment profile component 1106 can organize the environment profile in any desired (e.g., suitable, acceptable, or optimal) manner, non-limiting examples of which can include an array, a table, a tree, a map, a graph, a chart, a list, network topology, or any other suitable manner of organizing data in a profile. In a non-limiting example, the environment profile can include respective entries for each characteristic, condition, or feature of the environment that comprise a detailed description of the characteristic, condition, or feature, a location of the characteristic, condition, or feature in the environment, tracking information describing changes to the characteristic, condition, or feature over time, source used to determine the characteristic, condition, or feature, confidence of accuracy of the determined characteristic, condition, or feature, or any other suitable information associated with the characteristic, condition, or feature. The environment profile can comprise a map of the environment identifying characteristics, conditions, or features, and their respective locations on the map.

Figure 12:
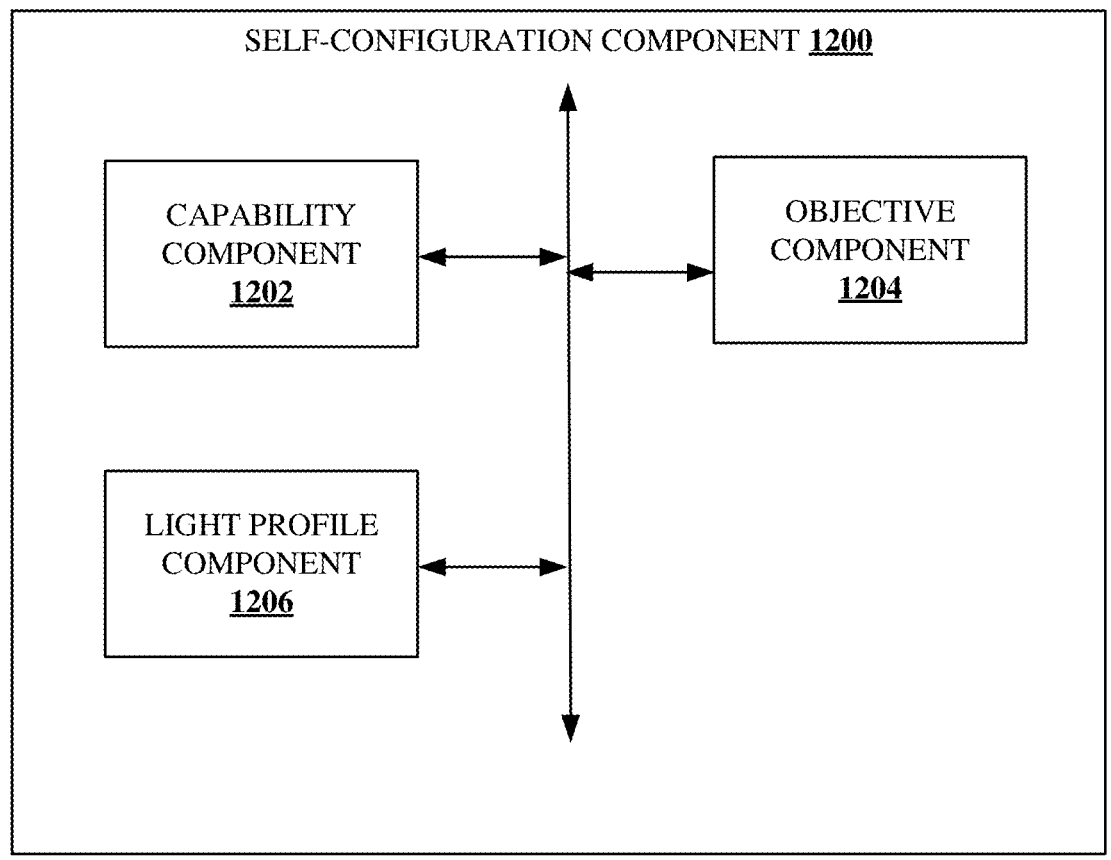
FIG. 12 depicts a block diagram of an example, non-limiting self-configuration component, in accordance with one or more aspects and embodiments of the disclosed subject matter.

FIG. 12 depicts a block diagram of an example, non-limiting self-configuration component 1200, in accordance with one or more aspects and embodiments of the disclosed subject matter. The self-configuration component 1200 can analyze the flow management light (e.g., characteristics, components, features, and/or conditions of the flow management light) and/or information relating to the flow management light. Based at least in part on the results of the analysis, the self-configuration component 1200 can determine characteristics, capabilities, features and/or conditions of the flow management light, determine one or more objectives of the installation or location of the flow management light, and perform a self-configuration of the flow management light according to the one or more determined objectives.

The self-configuration component 1200 can include a capability component 1202 that can perform a self-examination of the flow management light to determine characteristics, capabilities, features and/or conditions of the flow management light, including in relation to where the flow management light is installed or located. For example, the capability component 1202 can determine characteristics, capabilities, features and/or conditions of the flow management light, such as, in non-limiting examples, power sources, computers, processor components (e.g.,), memories (e.g., data stores), programs, sensors, instruments, or any other suitable capability of the flow management light. In an example, the capability component 1202 can probe a system bus to facilitate determining characteristics, capabilities, features and/or conditions of the flow management light. In another example, the capability component 1202 can examine a memory (e.g., data store) for information regarding characteristics, capabilities, features and/or conditions of the flow management light. In a further example, the capability component 1202 can obtain information regarding characteristics, capabilities, features and/or conditions of the flow management light from one or more knowledge sources. It is to be appreciated and understood that the capability component 1202 can employ any suitable mechanism to determine the characteristics, capabilities, features and/or conditions of the flow management light.

The self-configuration component 1200 also can include an objective component 1204 that can determine one or more objectives of the installation or location of the flow management light. For example, the objective component 1204 can employ intelligence (e.g., artificial intelligence) to determine an objective of the installation or location of the flow management light based at least in part on an environment profile of the environment associated with the flow management light and the determined characteristics, capabilities, features and/or conditions of the flow management light. In a non-limiting example, an objective can be related to safety, automation, control, communication, instruction, entertainment, social enhancement, economics, mood enhancement, activity enhancement, notification, coordination, monitoring, intervention, time management, workflow management, or any other suitable objective. In an example, the objective component 1204 can select one or more objectives from a library of objectives stored in a data store or in one or more knowledges sources. In another example, the objective component 1204 can create one or more objectives based at least in part on artificial intelligence. In a further example, the objective component 1204 can create linked objectives, wherein one or more objectives can depend on one or more other objectives. For example, an objective can become active if another objective is achieved. In another example, an objective can become inactive if another objective is achieved. It is to be appreciated and understood that the objective component 1204 can employ any suitable mechanism to determine objectives of the flow management light.

The self-configuration component 1200 further can comprise a light profile component 1206 that can generate a light profile for (e.g., representative of) the flow management light based at least in part on the characteristics, capabilities, features and/or conditions of the flow management light and/or the one or more determined objectives. The light profile can comprise or be based at least in part on the environment profile associated with the environment that is associated with the flow management light, characteristics, capabilities, features and/or conditions of the flow management light, and objectives of the flow management light. The light profile component 1206 can organize the light profile in any desired (e.g., suitable or acceptable) manner, non-limiting examples of which can include an array, a table, a tree, a map, a graph, a chart, a list, a topology, or any other suitable manner of organizing data in a profile. In a non-limiting example, the light profile can include respective entries for each objective that comprise a detailed description of the objective, success metrics for the objective, tracking information describing changes to the objective over time, source used to determine the objective, confidence of accuracy of the determined objective, or any other suitable information associated with the objective. Furthermore, the light profile component 1206 can configure settings of one or more parameters of the flow management light (e.g., of processor component, data store, programs, sensor component, instrument component, light component, light fixture, housing 106, lens, light elements, base component, socket component, or any other suitable parameters of components of the flow management light) to achieve the one or more objectives, and store the settings in the light profile.

Some of the processes performed by the components of or associated with the flow management light may be performed by specialized computers for carrying out defined tasks related to determining characteristics of the environment in which a flow management light is installed or located, determining capabilities of the flow management light, determining one or more objectives of the installation or location of the flow management light, performing a self-configuration of the flow management light according to the one or more determined objectives, and determining and executing suitable actions for the flow management light to perform to achieve the one or more determined objectives. The subject computer processing systems, methods, apparatuses, and/or computer program products can be employed to solve new problems that arise through advancements in technology, computer networks, the Internet, and the like. The subject computer processing systems, methods, apparatuses, and/or computer program products can provide technical improvements to systems for determining characteristics of the environment in which the flow management light is installed, determining capabilities of the flow management light, determining one or more objectives of the installation of the flow management light, performing a self-configuration of the flow management light according to the one or more determined objectives, and determining and executing suitable actions for the flow management light to perform to achieve the one or more determined objectives by improving processing efficiency among processing components in these systems, reducing delay in processing performed by the processing components, reducing memory requirements, and/or improving the accuracy in which the processing systems are determining characteristics of the environment in which the flow management light is installed or located, determining capabilities of the flow management light, determining one or more objectives of the installation or location of the flow management light, performing a self-configuration of the flow management light according to the one or more determined objectives, and determining and executing suitable actions for the flow management light to perform to achieve the one or more determined objectives.

The embodiments of systems, devices, and/or methods described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) described herein, components described herein can examine the entirety or a subset of the data to which it is granted access and can provide for reasoning about or determine states of the system, environment, etc. from a set of observations as captured via events and/or data. Determinations can be employed to identify a specific context or action, or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence can be employed. Classification as used herein also is inclusive of statistical regression that is utilized to develop models of priority.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 13-16. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 13:
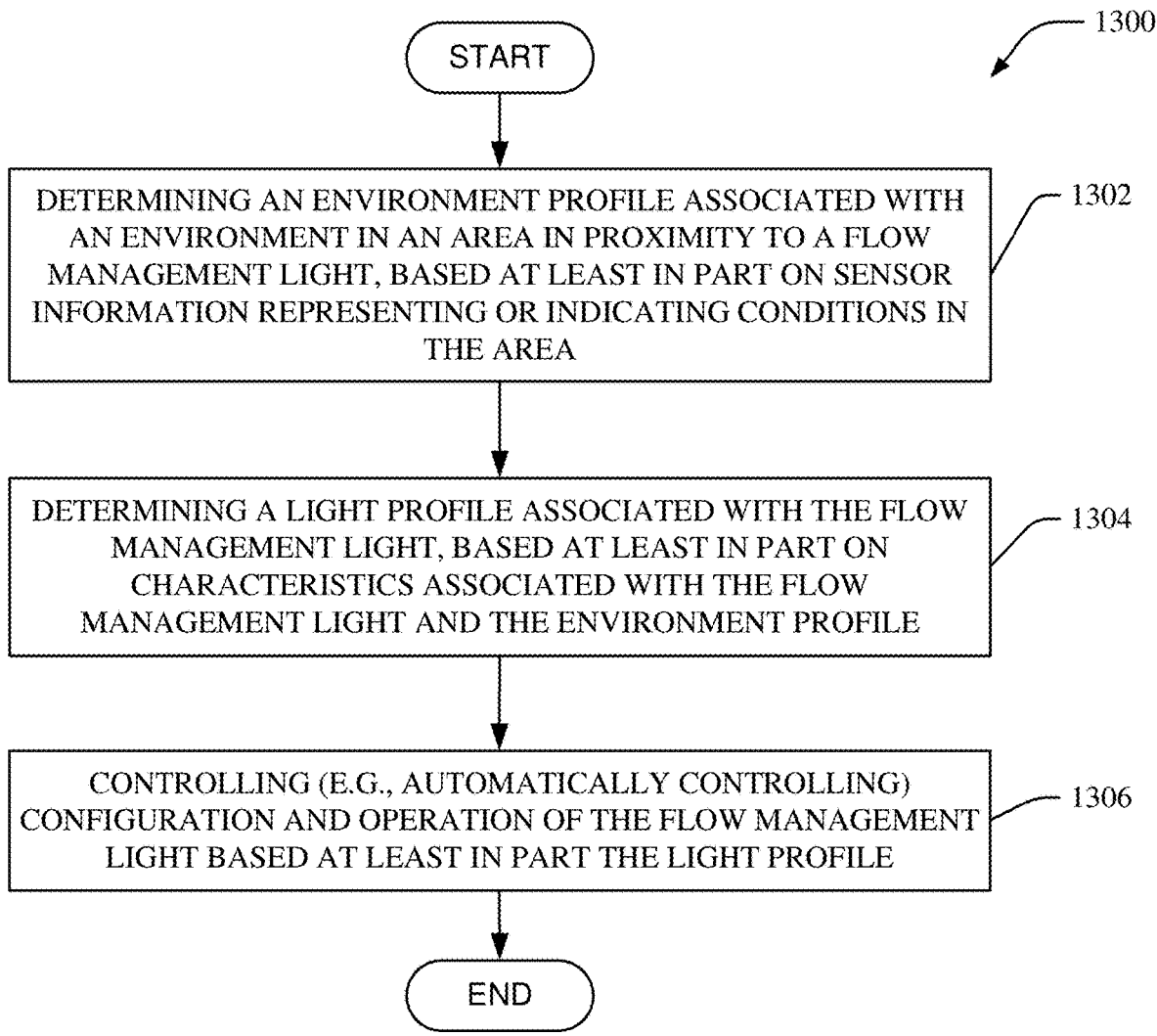
FIG. 13 illustrates a flow diagram of an example, non-limiting method that can facilitate controlling operation of one or more flow management lights, in accordance with various aspects and embodiments of the disclosed subject matter.

FIG. 13 illustrates a flow diagram of an example, non-limiting method 1300 that can facilitate controlling operation of one or more flow management lights, in accordance with various aspects and embodiments of the disclosed subject matter. The method 1300 can be employed, for example, by a system comprising a processor and/or a flow management component.

At 1302, an environment profile associated with an environment in an area in proximity to a flow management light can be determined, based at least in part on sensor information representing or indicating conditions in the area. One or more sensors can monitor and detect conditions (e.g., environmental conditions) in the area in proximity to the flow management light and can generate the sensor information, which can indicate, represent, and/or describe the conditions detected by the one or more sensors. The flow management component can receive the sensor information from the one or more sensors. The flow management component can analyze the sensor information and/or other information, and can determine and generate (e.g., automatically determine and generate) the environment profile associated with the environment in the area based at least in part on the results of the analysis, in accordance with the defined environment criteria.

At 1304, a light profile associated with the flow management light can be determined, based at least in part on characteristics associated with the flow management light and the environment profile. The flow management component can analyze information (e.g., characteristics data) relating to characteristics (e.g., specifications, types of parameters, capabilities, configuration or available configurations, features, . . . ) of the flow management light and the environment profile. Based at least in part on the results of the analysis of the environment profile and the information relating to the characteristics of the flow management light, the flow management component can determine and generate (e.g., automatically determine and generate) the light profile associated with the flow management light, in accordance with the defined light management criteria.

At 1306, configuration and operation of the flow management light can be controlled (e.g., automatically controlled) based at least in part the light profile. The flow management component can control the configuration and operation of the flow management light based at least in part on the light profile associated with the flow management light. For instance, the flow management component can configure or adjust parameters of the flow management light (e.g., parameters of the light component, parameters of the instrument component, . . . ) based at least in part on the light profile. The light profile can take into account the environmental conditions in the area in proximity to the flow management light, as the light profile is determined based at least in part on the environment profile. As a result, the configuration or adjustment of parameters of the flow management light can be determined and implemented to be responsive to the environmental conditions of the environment in the area in proximity to the flow management light.

The flow management component can continue to perform (e.g., automatically perform) the method 1300 in real time, or substantially real time, to update (e.g., automatically update) the environment profile and light profile in real time, or substantially real time, and/or in response to a condition detected in the environment in the area in proximity to the flow management light, to account for and respond to any changes in the environment in the area in proximity to the flow management light. The flow management component can control (e.g., automatically control), in real time or at least substantially real time, the configuration and the operation of the flow management light based at least in part the light profile (e.g., as updated).

Figure 14:
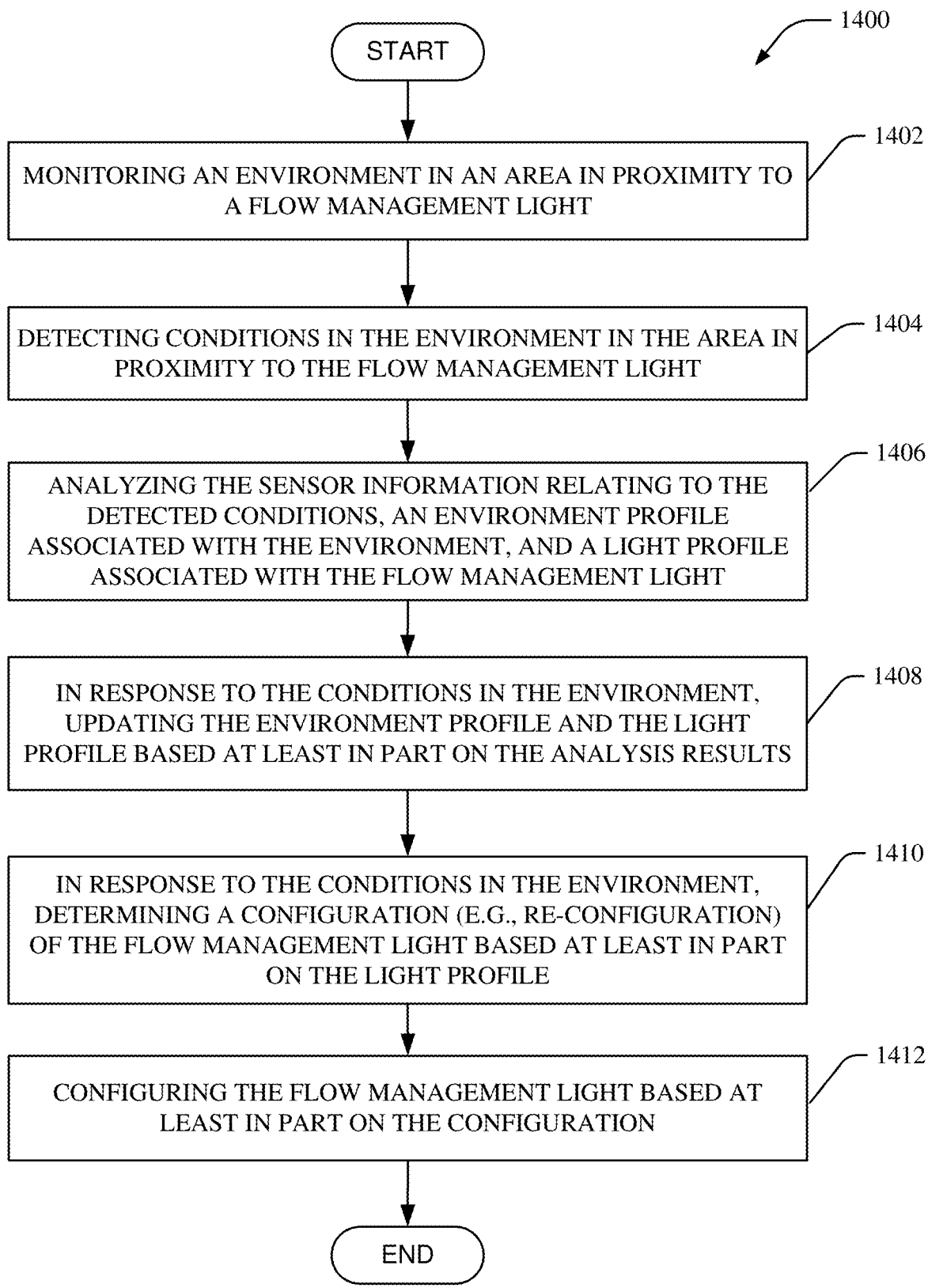
FIG. 14 depicts a flow diagram of another example, non-limiting method that can facilitate controlling operation of one or more flow management lights, in accordance with various aspects and embodiments of the disclosed subject matter.

FIG. 14 depicts a flow diagram of another example, non-limiting method 1400 that can facilitate controlling operation of one or more flow management lights, in accordance with various aspects and embodiments of the disclosed subject matter. The method 1400 can be employed, for example, by a system comprising a processor, a flow management component, a sensor component, and/or an instrument component.

At 1402, an environment in an area in proximity to a flow management light can be monitored. One or more sensors of a sensor component of the flow management light can monitor the area.

At 1404, conditions (e.g., environmental conditions) can be detected in the environment in the area in proximity to the flow management light. One or more of the sensors can detect the conditions (e.g., change in conditions) in the environment in the area in proximity to the flow management light and can generate sensor information indicating, representing, and/or describing the conditions.

At 1406, the sensor information relating to the conditions, an environment profile associated with the environment, and a light profile associated with the flow management light can be analyzed. The flow management component can receive the sensor information from one or more of the sensors. The flow management component also can access and retrieve the environment profile and the light profile from a data store of the flow management light. The flow management component can analyze the sensor information, the environment profile, and the light profile to generate analysis results.

At 1408, in response to the conditions in the environment, the environment profile and the light profile can be updated based at least in part on the analysis results. To account for the conditions (e.g., change in conditions) in the environment, the flow management component can determine respective updates to, and perform respective updates to, the environment profile and the light profile based at least in part on the analysis results.

At 1410, in response to the conditions in the environment, a configuration (e.g., re-configuration) of the flow management light can be determined based at least in part on the light profile. To self-configure the flow management light to respond to the conditions in the environment, the flow management component can determine a configuration of the flow management light based at least in part on the light profile. The light profile can comprise information (e.g., light profile information) that can indicate or specify the configuration of various parameters of various components (e.g., a light element(s) of the light component, an instrument(s) of the instrument component, a processor, a program(s), . . . ) of the flow management light. In some implementations, the flow management component can structure the light profile to map respective configurations of respective parameters of respective components of the flow management light to respective conditions of the environment.

At 1412, the flow management light can be configured based at least in part on the configuration. The flow management component can facilitate configuring the flow management light (e.g., respective components of the flow management light), in accordance with the configuration determined for the flow management light, based at least in part on the light profile. For example, one or more respective parameters of one or more respective components of the flow management light can be configured, set, or adjusted to facilitate configuring (e.g., auto or self configuring) the respective components of the flow management light, in accordance with the light profile.

Figure 15:
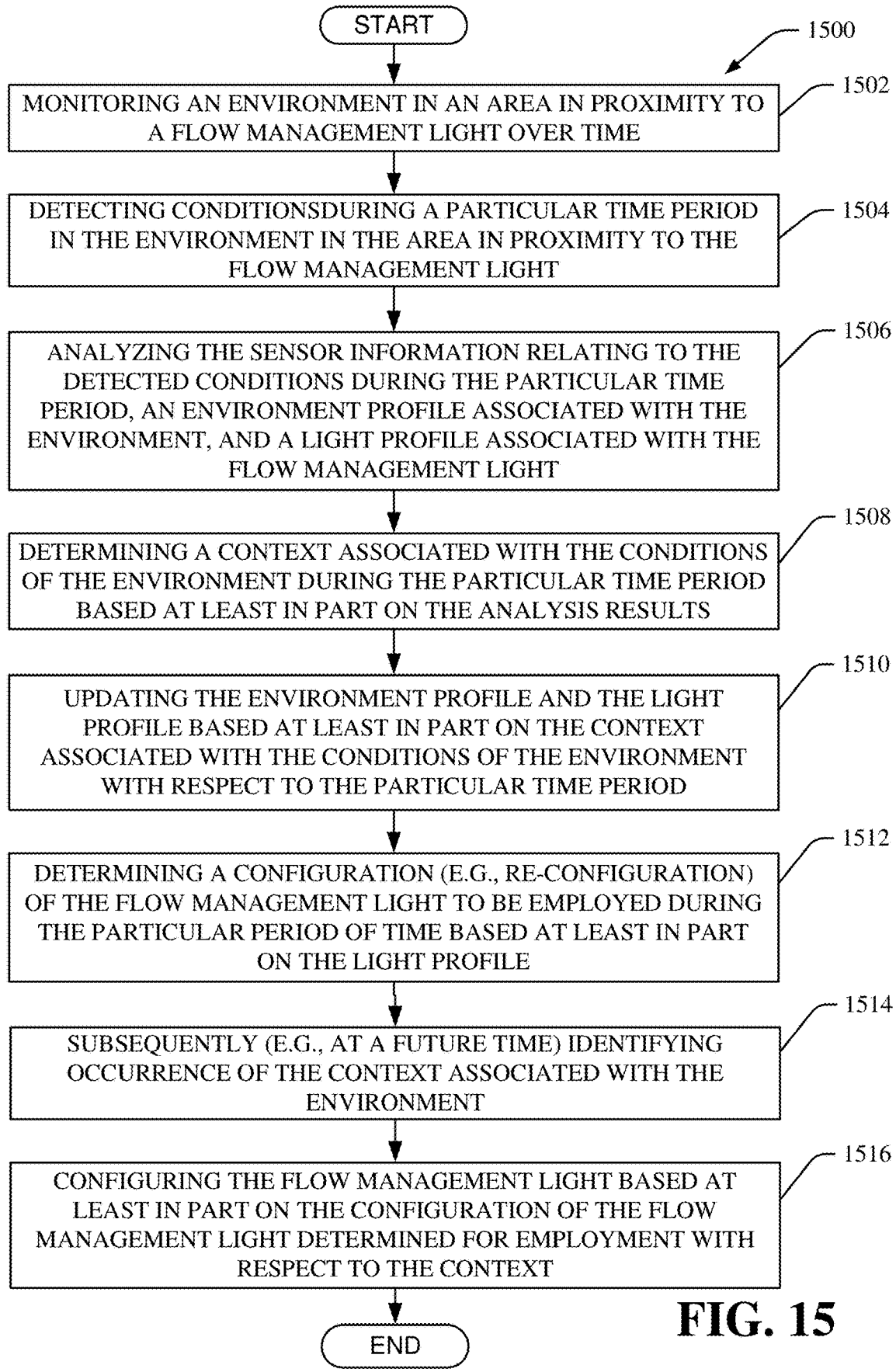
FIG. 15 presents a flow diagram of an example, non-limiting method that can determine contexts associated with an environment in an area in proximity to a flow management light to facilitate controlling and operation of a flow management light, in accordance with various aspects and embodiments of the disclosed subject matter.

FIG. 15 presents a flow diagram of an example, non-limiting method 1500 that can determine contexts associated with an environment in an area in proximity to a flow management light to facilitate controlling and operation of a flow management light, in accordance with various aspects and embodiments of the disclosed subject matter. The method 1500 can be employed, for example, by a system comprising a processor and/or a flow management component.

At 1502, an environment in an area in proximity to a flow management light can be monitored over time. One or more sensors of a sensor component of the flow management light can monitor the area over time.

At 1504, conditions (e.g., environmental conditions) during a particular time period can be detected in the environment in the area in proximity to the flow management light. One or more of the sensors can detect the conditions (e.g., change in conditions) in the environment in the area in proximity to the flow management light during a particular time period. The one or more sensors can generate sensor information indicating, representing, and/or describing the conditions during that particular time period.

At 1506, the sensor information relating to the conditions during the particular time period, an environment profile associated with the environment, and a light profile associated with the flow management light can be analyzed. The flow management component can receive the sensor information from one or more of the sensors. The flow management component also can access and retrieve the environment profile and the light profile from a data store of the flow management light. The flow management component can analyze the sensor information, the environment profile, and the light profile to generate analysis results.

At 1508, a context associated with the conditions of the environment during the particular time period can be determined based at least in part on the analysis results. Based at least in part on the analysis results, the flow management component can determine the context associated with the conditions of the environment during the particular time period. A context for a particular time period can be, for example, that vehicular traffic in the area is significantly higher during that particular time period (e.g., of the day, such as a weekday) as compared to the respective periods of time before and after that particular time period.

At 1510, the environment profile and the light profile can be updated based at least in part on the context associated with the conditions of the environment with respect to the particular time period. The flow management component can update the environment profile and the light profile based at least in part on the context, in accordance with the defined light management criteria.

At 1512, a configuration (e.g., re-configuration) of the flow management light to be employed during the particular period of time can be determined based at least in part on the light profile. To self-configure the flow management light to respond to the context associated with the environment with respect to the particular period of time, the flow management component can determine a configuration of the flow management light that is to be employed during the particular period of time, based at least in part on the light profile. The light profile can comprise information (e.g., light profile information) that can indicate or specify the configuration of various parameters of various components (e.g., a light element(s) of the light component, an instrument(s) of the instrument component, a processor, a program(s), . . . ) of the flow management light that is to be employed with respect to the context associated with the particular period of time.

At 1514, subsequently (e.g., at a future time), an occurrence of the context associated with the environment can be identified. For instance, at a future time, the flow management component can identify or determine that the context associated with the environment in the area in proximity to the flow management light exists.

At 1516, in response to detecting the existence of the context associated with the environment, the flow management light can be configured based at least in part on the configuration of the flow management light that was determined for employment with respect to the context. For example, in response to the flow management component detecting the existence of the context associated with the environment at the future time, the flow management component can facilitate configuring the flow management light (e.g., respectively configuring respective components of the flow management light) based at least in part on the configuration of the flow management light determined for use with respect to the existence or occurrence of the context associated with the environment, in accordance with the defined light management criteria.

It is to be appreciated and understood that, while the method 1500 describes a context relating to a particular period of time in connection with the environment, a context can relate to other types of conditions. For example, a context can relate to an occurrence of an event, an occurrence of a particular environmental condition, or another type of trigger. For instance, a context can relate to an occurrence of an event or environmental condition (e.g., rain falling on a street where a flow management light is located), wherein the flow management component can determine or identify an environmental condition (e.g., slippery or hazardous street) that typically follows in response to the occurrence of such event or condition (e.g., rain falling on the street). Accordingly, the flow management component can determine the context as being related to the occurrence of such event or condition, can determine or detect an environmental condition that typically can occur based at least in part on the context, and can determine a response of the flow management light to the context when the contextual event or condition (e.g., rain falling on the street) occurs, wherein, for example, the response can be to control operation of the flow management light to have the flow management light present (e.g., display) a caution or hazard indicator (e.g., a yellow colored indicator and/or an indicator that can indicate a slippery or hazardous street condition).

Figure 16:
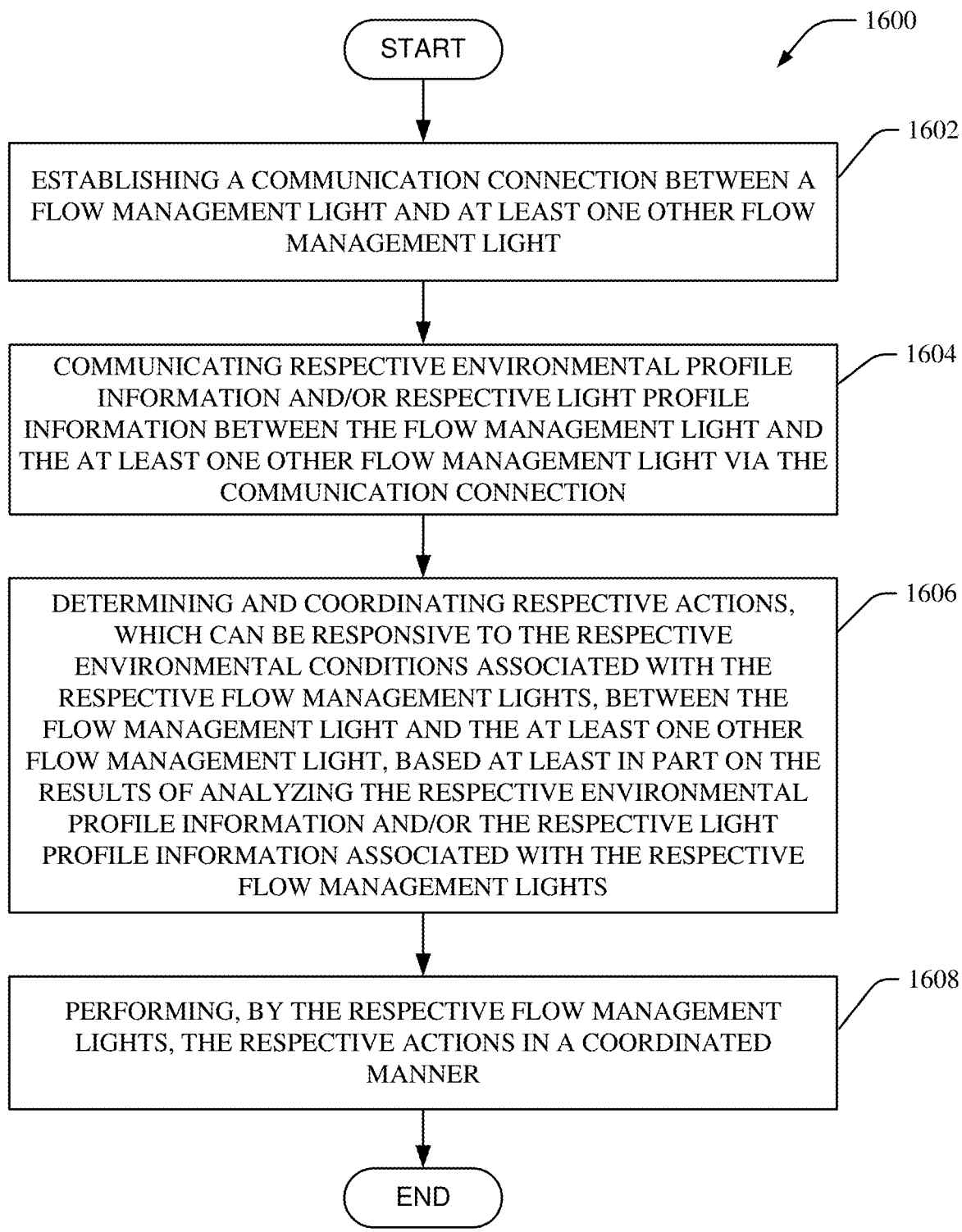
FIG. 16 illustrates a flow diagram of an example, non-limiting method that can facilitate controlling and coordinating respective operation of flow management lights, in accordance with various aspects and embodiments of the disclosed subject matter.

FIG. 16 illustrates a flow diagram of an example, non-limiting method 1600 that can facilitate controlling and coordinating respective operation of flow management lights, in accordance with various aspects and embodiments of the disclosed subject matter. The method 1600 can be employed, for example, by a system comprising respective processors and/or respective flow management components of respective flow management lights.

At 1602, a communication connection can be established (e.g., created, generated) between a flow management light and at least one other flow management light. The flow management light can be associated with an area, and the at least one other flow management light can be associated with at least one other area, which can be completely distinct from the area or can partially cover (e.g., encompass) the area. The flow management component (e.g., a network component of the flow management component) can detect and contact at least one other flow management light (e.g., at least one network component of at least one other flow management component of the at least one other flow management light). The respective flow management components can exchange network-related information and/or other information to facilitate setting up a communication connection (e.g., at least one communication connection) with each other, and can establish the communication connection between the flow management light and the at least one other flow management light based at least in part on the network-related information and/or other information. The communication connection can be a wireline communication connection and/or a wireless communication connection.

At 1604, respective environmental profile information and/or respective light profile information can be communicated between the flow management light and the at least one other flow management light via the communication connection. The flow management light can communicate the environment profile and the light profile associated with the flow management light to the at least one other flow management light, wherein the environment profile can comprise environmental profile information regarding the environmental conditions associated with the area associated with (e.g., in proximity to) the flow management light, and the light profile can comprise light profile information regarding the features (e.g., characteristics, attributes, functions, . . . ) of the flow management light. The at least one other flow management light can communicate at least one environment profile and at least one light profile associated with the at least one other flow management light to the flow management light, wherein the at least one other environment profile can comprise environmental profile information regarding the environmental conditions associated with the at least one other area associated with (e.g., in proximity to) the at least one other flow management light, and the at least one other light profile can comprise light profile information regarding the features (e.g., characteristics, attributes, functions, . . . ) of the at least one other flow management light.

At 1606, respective actions, which can be responsive to the respective environmental conditions associated with the respective flow management lights, can be determined and coordinated between the flow management light and the at least one other flow management light, based at least in part on the results of analyzing the respective environmental profile information and/or the respective light profile information associated with the respective flow management lights. The flow management component of the flow management light, and/or the at least one other flow management component of the at least one other flow management light, can analyze (e.g., respectively analyze) the respective environmental profile information and/or the respective light profile information associated with the respective flow management lights. Based at least in part on the results (e.g., the respective results) of the analysis (e.g., the respective analysis), the flow management component and/or the at least one other flow management component can determine the respective actions that are to be performed by the respective flow management lights, in accordance with the defined light management criteria. The flow management component and the at least one other flow management component can negotiate and coordinate with each other to facilitate determining the respective actions that the respective flow management lights are to perform to be responsive to the respective environmental conditions associated with the respective flow management lights.

At 1608, the respective actions can be performed by the respective flow management lights in a coordinated manner. The flow management light and the at least one other flow management light can perform their respective actions in a coordinated manner to be responsive to the respective environmental conditions associated with the respective flow management lights. The respective flow management components, respective instrument components, respective processor components, etc., of the respective flow management lights can facilitate the respective performance of the respective actions by the respective flow management lights.

Figure 17:
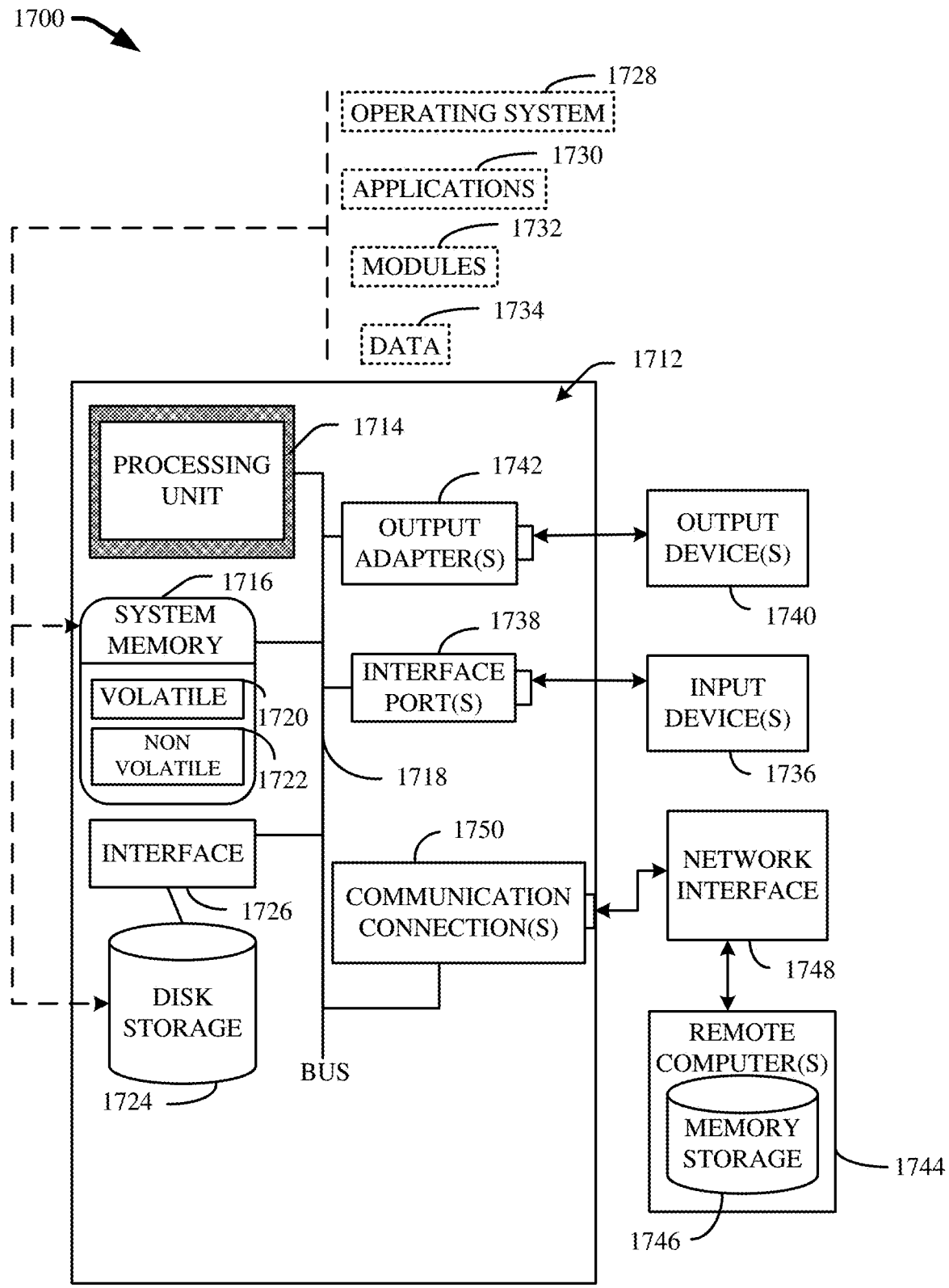
FIG. 17 illustrates a block diagram of an example, non-limiting operating environment in which one or more embodiments described herein can be facilitated.
Figure 18:
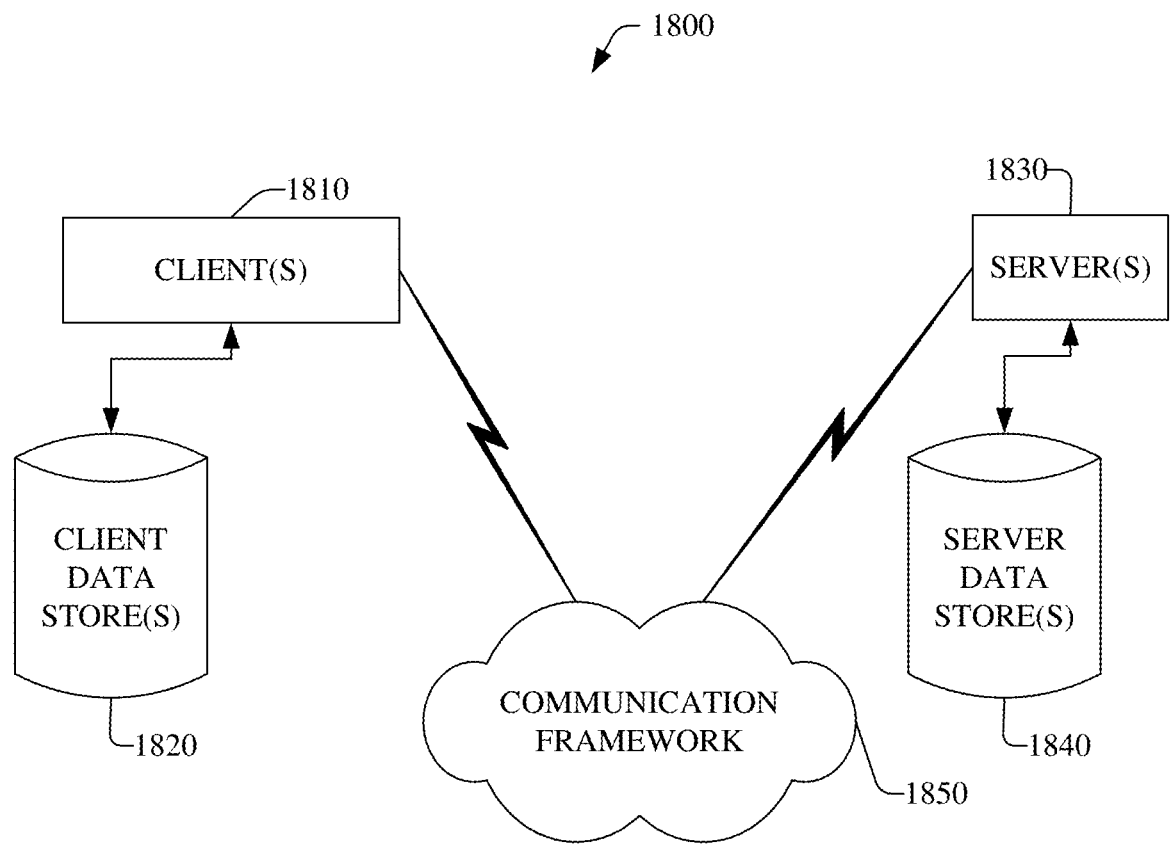
FIG. 18 is a schematic block diagram of a sample-computing environment.

In order to provide a context for the various aspects of the disclosed subject matter, FIGS. 17 and 18 as well as the following discussion are intended to provide a general description of a suitable environment in which the various aspects of the disclosed subject matter can be implemented. FIG. 17 illustrates a block diagram of an example, non-limiting operating environment in which one or more embodiments described herein can be facilitated. Repetitive description of like elements employed in other embodiments described herein is omitted for sake of brevity.

With reference to FIG. 17, a suitable operating environment 1700 for implementing various aspects of this disclosure can also include a computer 1712. The computer 1712 can also include a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714. The system bus 1718 can be any of several types of bus structure(s)

including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1494), and Small Computer Systems Interface (SCSI). The system memory 1716 can also include volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1720 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1712 can also include removable/non-removable, volatile/nonvolatile computer storage media. FIG. 17 illustrates, for example, a disk storage 1724. Disk storage 1724 can also include, but is not limited to, devices like a magnetic disk drive, floppy disk drive, tape drive, Jaz drive, Zip drive, LS-100 drive, flash memory card, or memory stick. The disk storage 1724 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1724 to the system bus 1718, a removable or non-removable interface is typically used, such as interface 1726. FIG. 17 also depicts software that acts as an intermediary between users and the basic computer resources described in the suitable operating environment 1700. Such software can also include, for example, an operating system 1728. Operating system 1728, which can be stored on disk storage 1724, acts to control and allocate resources of the computer 1712. System applications 1730 take advantage of the management of resources by operating system 1728 through program modules 1732 and program data 1734, e.g., stored either in system memory 1716 or on disk storage 1724. It is to be appreciated that this disclosure can be implemented with various operating systems or combinations of operating systems. A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port can be used to provide input to computer 1712, and to output information from computer 1712 to an output device 1740. Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a computer, a server, a router, a network PC, a workstation, a microprocessor based appliance, a peer device or other common network node and the like, and typically can also include many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1750 refers to the hardware/software employed to connect the network interface 1748 to the system bus 1718. While communication connection 1750 is shown for illustrative clarity inside computer 1712, it can also be external to computer 1712. The hardware/software for connection to the network interface 1748 can also include, for exemplary purposes only, internal and external technologies such as, modems including regular telephone grade modems, cable modems and DSL modems, ISDN adapters, and Ethernet cards.

FIG. 18 is a schematic block diagram of a sample-computing environment 1800 (e.g., computing system) with which the subject matter of this disclosure can interact. The system 1800 includes one or more client(s) 1810. The client(s) 1810 can be hardware and/or software (e.g., threads, processes, computing devices). The system 1800 also includes one or more server(s) 1830. Thus, system 1800 can correspond to a two-tier client server model or a multi-tier model (e.g., client, middle tier server, data server), amongst other models. The server(s) 1830 can also be hardware and/or software (e.g., threads, processes, computing devices). The servers 1830 can house threads to perform transformations by employing this disclosure, for example. One possible communication between a client 1810 and a server 1830 may be in the form of a data packet transmitted between two or more computer processes.

The system 1800 includes a communication framework 1850 that can be employed to facilitate communications between the client(s) 1810 and the server(s) 1830. The client(s) 1810 are operatively connected to one or more client data store(s) 1820 that can be employed to store information local to the client(s) 1810. Similarly, the server(s) 1830 are operatively connected to one or more server data store(s) 1840 that can be employed to store information local to the servers 1830.

It is to be appreciated and understood that components (e.g., flow management light, flow management component, sensor component, instrument, component, network component, processor component, data store, . . . ), as described with regard to a particular system or method, can include the same or similar functionality as respective components (e.g., respectively named components or similarly named components) as described with regard to other systems or methods disclosed herein.

Embodiments of the disclosed subject matter can be a system, a method, an apparatus and/or a machine (e.g., computer) program product at any possible technical detail level of integration. The machine program product can include a machine (e.g., computer) readable storage medium (or media) having machine readable program instructions thereon for causing a processor to carry out aspects of the disclosed subject matter. The machine readable storage medium can be a tangible device that can retain and store instructions for use by an instruction execution device. The machine readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the machine readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A machine readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Machine readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives machine readable program instructions from the network and forwards the machine readable program instructions for storage in a machine readable storage medium within the respective computing/processing device. Machine readable program instructions for carrying out operations of various aspects of the disclosed subject matter can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The machine readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the machine readable program instructions by utilizing state information of the machine readable program instructions to customize the electronic circuitry, in order to perform aspects of the disclosed subject matter.

Aspects of the disclosed subject matter are described herein with reference to flowchart illustrations and/or block diagrams of methods, apparatus (systems), and machine program products according to embodiments of the disclosed subject matter. It will be understood that each block of the flowchart illustrations and/or block diagrams, and combinations of blocks in the flowchart illustrations and/or block diagrams, can be implemented by machine readable program instructions. These machine readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These machine readable program instructions can also be stored in a machine readable storage medium that can direct a computer, a programmable data processing apparatus, and/or other devices to function in a particular manner, such that the machine readable storage medium having instructions stored therein comprises an article of manufacture including instructions which implement aspects of the function/act specified in the flowchart and/or block diagram block or blocks. The machine readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the disclosed subject matter. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosed subject matter has been described above in the general context of machine (e.g., computer)-executable instructions of a machine program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the disclosed machine (e.g., computer)-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM)). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a light component of a flow management light device, wherein the light component is configured to provide illumination in an area associated with the flow management light device;
   a memory that stores machine-executable components; and
   a processor that executes the machine-executable components stored in the memory, wherein the machine-executable components comprise:
      an environment component, that determines environmental conditions and environmental characteristics associated with the area associated with the flow management light device, and
      an awareness component, that maps the environmental characteristics to characteristics of the flow management light device as mapping information and uses at least in part the mapping information to determine flow management objectives,
      a flow management component of the flow management light device, configured to determine a light profile for the flow management light device based at least in part on the characteristics of the flow management light device, the environmental conditions, and the flow management objectives, wherein the flow management component is further configured to control operation of the light component and instruments of an instrument component of the flow management light device based at least in part on the light profile.

2. The system of claim 1, wherein the flow management component is further configured to determine at least one action to perform in response to the environmental conditions associated with the area and facilitate performance of the at least one action by at least one of the light component or one or more of the instruments of the instrument component.

3. The system of claim 2, further comprising the instrument component configured to comprise the instruments, wherein respective instruments of the instrument component are configured to perform respective tasks, and wherein at least one instrument of the respective instruments is configured to perform at least one task to facilitate the performance of the at least one action.

4. The system of claim 1, further comprising:
   a sensor component comprising one or more sensors configured to sense the environmental conditions associated with the area and generate sensor data based at least in part on the sensing of the environmental conditions, wherein the flow management component is further configured to receive the sensor data from the sensor component, analyze the sensor data, and determine an environment profile associated with the area based at least in part on a first analysis result of the analysis of the sensor data.

5. The system of claim 4, wherein the flow management component is further configured to analyze light characteristics data relating to the characteristics of the flow management light device and the environment profile and determine the light profile associated with the flow management light device based at least in part on a second analysis result of the analysis of the characteristics and the environment profile.

6. The system of claim 1, wherein the executable components further comprise a network component configured to create a communication connection between the flow management light device and at least one other flow management light device, wherein the flow management component is further configured to communication with the at least one other flow management light device to coordinate operation of the flow management light device with at least one operation of the at least one other flow management light device, and wherein the communication connection is at least one of a wireline communication connection or a wireless communication connection.

7. The system of claim 1, wherein the flow management component is further configured to facilitate presenting a user interface that is configured to receive user input from a user to modify at least a portion of light profile data in the light profile that was generated by the flow management component.

8. The system of claim 1, wherein the flow management component is further configured to monitor and detect the environmental conditions associated with the area over a period of time, determine a context associated with the area based at least in part the environmental conditions over the period of time, and update the light profile associated with the flow management light device and an environment profile associated with the area based at least in part on the context.

9. The system of claim 8, wherein the flow management light device is configured to determine at least one action that is to be performed to respond to at least one environmental condition associated with the context based at least in part on the light profile, and, at a future time, in response to detecting an occurrence of an event relating to the context, facilitate performance of the at least one action by at least one of the light component or one or more of the instruments of the instrument component.

10. The system of claim 1, wherein the flow management light device is configured to comprise a housing component, wherein the housing component comprises the light component, the processor, the memory, the flow management component, and at least a portion of the instruments of the instrument component.

11. The system of claim 1, further comprising a light fixture component configured to comprise a socket component in which a base component associated with the light component is able to be inserted to connect the light component to the light fixture component, wherein the flow management component is configured to be included in the light fixture component.

12. A method, comprising:
determining, by a system comprising a processor, characteristics of an environment and environmental conditions associated with an area associated with a flow management light;
mapping, by the system, the characteristics of the environment to characteristics of the flow management light as mapping information;
determining, by the system, flow management objectives based at least in part on the mapping information;
determining, by the system, a light profile for the flow management light based on at least in part attributes of the flow management light, the environmental conditions, and the flow management objectives; and
controlling, by the system, operation of a light component and an instrument component of the flow management light based at least in part on the light profile.

13. The method of claim 12, further comprising:
determining, by the system, at least one action to perform in response to the environmental conditions associated with the area; and
performing, by the system, the at least one action, wherein the performing comprises at least one of performing a first action to adjust an illumination level of light emitted by the light component, performing a second action to present visual information or audio information to a user, or performing a third action to have an instrument of the instrument component perform a task that is responsive to the environmental conditions, and wherein the visual information or the audio information relates to the environmental conditions associated with the area.

14. The method of claim 12, further comprising:
detecting, by the system, the environmental conditions associated with the area in proximity to the flow management light;
generating, by the system, condition information based at least in part on the detecting of the environmental conditions;
analyzing, by the system, the condition information; and
determining, by the system, an environment profile associated with the area based at least in part on a first analysis result of the analyzing of the condition information.

15. The method of claim 14, further comprising:
analyzing, by the system, the environment profile and attribute information of the attributes of the flow management light; and
determining, by the system, the light profile associated with the flow management light based at least in part on a second analysis result of the analysis of the environment profile and the attribute information.

16. The method of claim 12, further comprising:
establishing, by the system, a communication connection between the flow management light and at least one other flow management light, wherein the communication connection is at least one of a wireline communication connection or a wireless communication connection;
communicating, by the system, information relating to respective operations of the flow management light and the at least one other flow management light between the flow management light and the at least one other flow management light; and
coordinating, by the system, operation of the flow management light with at least one operation of the at least one other flow management light.

17. The method of claim 12, further comprising:
monitoring, by the system, the environmental conditions associated with the area over a period of time;
detecting, by the system, the environmental conditions associated with the area over the period of time;
determining, by the system, a context associated with the area based at least in part the environmental conditions detected over the period of time;
updating the light profile associated with the flow management light and an environment profile associated with the area based at least in part on the context;
determining, by the system, at least one action to perform to respond to at least one condition associated with the context based at least in part on the light profile; and
at a subsequent time, in response to detecting an occurrence of an event relating to the context, facilitating, by the system, performing of the at least one action by at least one of the light component or an instrument of the instrument component.

18. A device, comprising:
a light component configured to provide illumination in an area associated with the device;
a sensor component configured to comprise one or more sensors configured to sense environmental conditions associated with the area and generate sensor data based at least in part on the sensing of the environmental conditions;
an instrument component configured to comprise instruments configured to perform respective tasks;
a memory that stores machine-executable components; and
a processor that executes the machine-executable components stored in the memory, wherein the machine-executable components comprise:
an environment component configured to determine the characteristics of an environment associated with the area associated with a flow management light device,
an awareness component configured to map the characteristics of the environment to characteristics of the flow management light device as mapping information and determine flow management objectives,
a flow management component configured to generate a light profile for the flow management light device based at least in part on characteristics of the device, the sensor data relating to the environmental conditions associated with the area, and flow management objectives, wherein the flow management component is further configured to manage operation of the light component and the instruments based at least in part on the light profile.

19. The device of claim 18, wherein the flow management component is further configured to determine at least one action to perform in response to the environmental conditions associated with the area and facilitate performance of the at least one action by at least one of the light component or one or more of the instruments.

20. The device of claim 19, wherein the executable components further comprise a network component configured to establish a communication connection between the device and at least one other device, wherein the communication connection is at least one of a wireline communication connection or a wireless communication connection, wherein the flow management component is further configured to utilize the communication connection to communicate with at least one other flow management component of the at least one other device to coordinate operation of the device with at least one operation of the at least one other device.

21. A system, comprising:
- a light component of a flow management light device, wherein the light component is configured to provide illumination in an area associated with the flow management light device;
- a memory that stores machine-executable components; and
- a processor that executes the machine-executable components stored in the memory, wherein the machine-executable components comprise:
  - an environment component, that determines environmental conditions and characteristics of an environment associated with the area associated with the flow management light device,
  - an awareness component that maps characteristics of the environment to characteristics of the flow management light device as mapping information, and uses the mapping information to determine flow management objectives,
  - a flow management component of the flow management light device, wherein the flow management component is configured to determine a light profile for the flow management light device based at least in part on characteristics of the flow management light device, the environmental conditions, and flow management objectives, wherein the flow management component is further configured to control operation of the light component and instruments of an instrument component of the flow management light device based at least in part on the light profile, wherein the flow management component can learn, using artificial intelligence, context of people or vehicle traffic at various times and control operations based on the learned context, and controls operations of the flow management light device.

* * * * *